United States Patent
Kubota et al.

[11] Patent Number: 6,147,726
[45] Date of Patent: Nov. 14, 2000

[54] REFLECTIVE DISPLAY USING MULTIPLE LIQUID CRYSTAL LAYERS FOR CONTROLABLE REFLECTION

[75] Inventors: Kanemitsu Kubota; Tomoko Koyama; Mutsumi Kimura, all of Suwa, Japan

[73] Assignee: Seiko Epson Corporation, Japan

[21] Appl. No.: 09/068,312

[22] PCT Filed: Aug. 28, 1997

[86] PCT No.: PCT/JP97/03017

§ 371 Date: Aug. 24, 1998

§ 102(e) Date: Aug. 24, 1998

[87] PCT Pub. No.: WO98/10328

PCT Pub. Date: Mar. 12, 1998

[30] Foreign Application Priority Data

Sep. 5, 1996 [JP] Japan .................................. 8-235618
Dec. 10, 1996 [JP] Japan .................................. 8-330075

[51] Int. Cl.$^7$ ............................. G02F 1/1347; G02F 1/13
[52] U.S. Cl. .............................. 349/74; 349/86; 349/187; 349/201
[58] Field of Search ................................. 349/73, 74, 75, 349/77, 78, 187, 201, 202, 86, 92

[56] References Cited

U.S. PATENT DOCUMENTS

| | | | |
|---|---|---|---|
| 5,523,188 | 6/1996 | Choi | 430/20 |
| 5,751,452 | 5/1998 | Tanaka et al. | 349/1 |
| 5,812,233 | 9/1998 | Walsh et al. | 349/194 |

FOREIGN PATENT DOCUMENTS

| | | |
|---|---|---|
| 3-112726 | 5/1991 | Japan . |
| 3-279903 | 12/1991 | Japan . |
| 4-37715 | 2/1992 | Japan . |
| 4-178623 | 6/1992 | Japan . |
| 4-371927 | 12/1992 | Japan . |
| 5-196943 | 8/1993 | Japan . |
| 6-222339 | 8/1994 | Japan . |
| 6-294952 | 10/1994 | Japan . |
| 7-92483 | 4/1995 | Japan . |
| 7-134213 | 5/1995 | Japan . |
| 7-143499 | 6/1995 | Japan . |
| 8-87003 | 4/1996 | Japan . |

OTHER PUBLICATIONS

"Three–Primary–Color Holographic Polymer Dispersed Liquid Crystal (HPDLC) Devices for Reflective Displays", M. Date, N. Naito, K., Tanaka, K. Kato, S. Sakai, NTT Interdisciplinary Res. Labs., Musashino, Japan, ASIA DISPLAY '95, pp. 603–606.

"9.1: Reflective Color LCDs Based on H–PDLC and PSCT Technologies", G.P. Crawford, T.G. Fiske, dpiX, A Xerox Company, Palo Alto, CA, L.D. Silverstein, VCD Sciences, Scottsdale, AZ, SID 96 DIGEST, pp. 99–102, 1996.

"Holographically Formed Liquid–Crystal/Polymer Device for Reflective Color Display", Kenji Tanaka, Kinya Kato, Shinji Tsuru, Shigenoubu Sakai, NTT Interdisciplinary Research Laboratories, Tokyo, Japan, Journal of the SID (Society for Information Display), Feb. 1, 1994, pp. 37–40.

Primary Examiner—Kenneth Parker
Attorney, Agent, or Firm—Harness, Dickey & Pierce, P.L.C.

[57] ABSTRACT

A display device including a composite multi-layer film obtained by alternately laminating films and liquid crystal layers a plurality of times is held between one pair of substrates, and a voltage is applied to the composite multi-layer film to control the reflection factor of the composite multi-layer film. In the display device comprising a composite multi-layer film obtained by alternately laminating films and liquid crystal layers, a voltage being applied to the composite multi-layer film to control the reflection factor of the composite multi-layer film, a refractive factor $n_{LC1(\lambda n)}$, in a major axis direction, and a refractive factor $n_{LC2(\lambda n)}$, in a minor axis direction, of a liquid crystal used in the liquid crystal layers with respect to light having a predetermined wavelength ($\lambda$n), and a refractive factor $n_{F1(\lambda n)}$ and a refractive factor $n_{F2(\lambda n)}$, in X- and Y-axis directions which are perpendicular to each other in the film surface, of the films with respect to light having the predetermined wavelength ($\lambda$n) are set in at least one of combinations of films and liquid crystal layers, which are adjacent to each other, of the films and the liquid crystal layers of the composite multi-layer film, to satisfy the following conditions [1] and [2]:

[1] $n_{LC1(\lambda n)} \geq n_{F1(\lambda n)}$, or $n_{LC1(\lambda n)} \approx n_{F1(\lambda n)}$, and

[2] $n_{LC2(\lambda n)} \approx n_{F2(\lambda n)}$, and $n_{LC2(\lambda n)} > n_{LC2(\lambda n)}$, $n_{F1(\lambda n)} > n_{F2(\lambda n)}$.

42 Claims, 49 Drawing Sheets

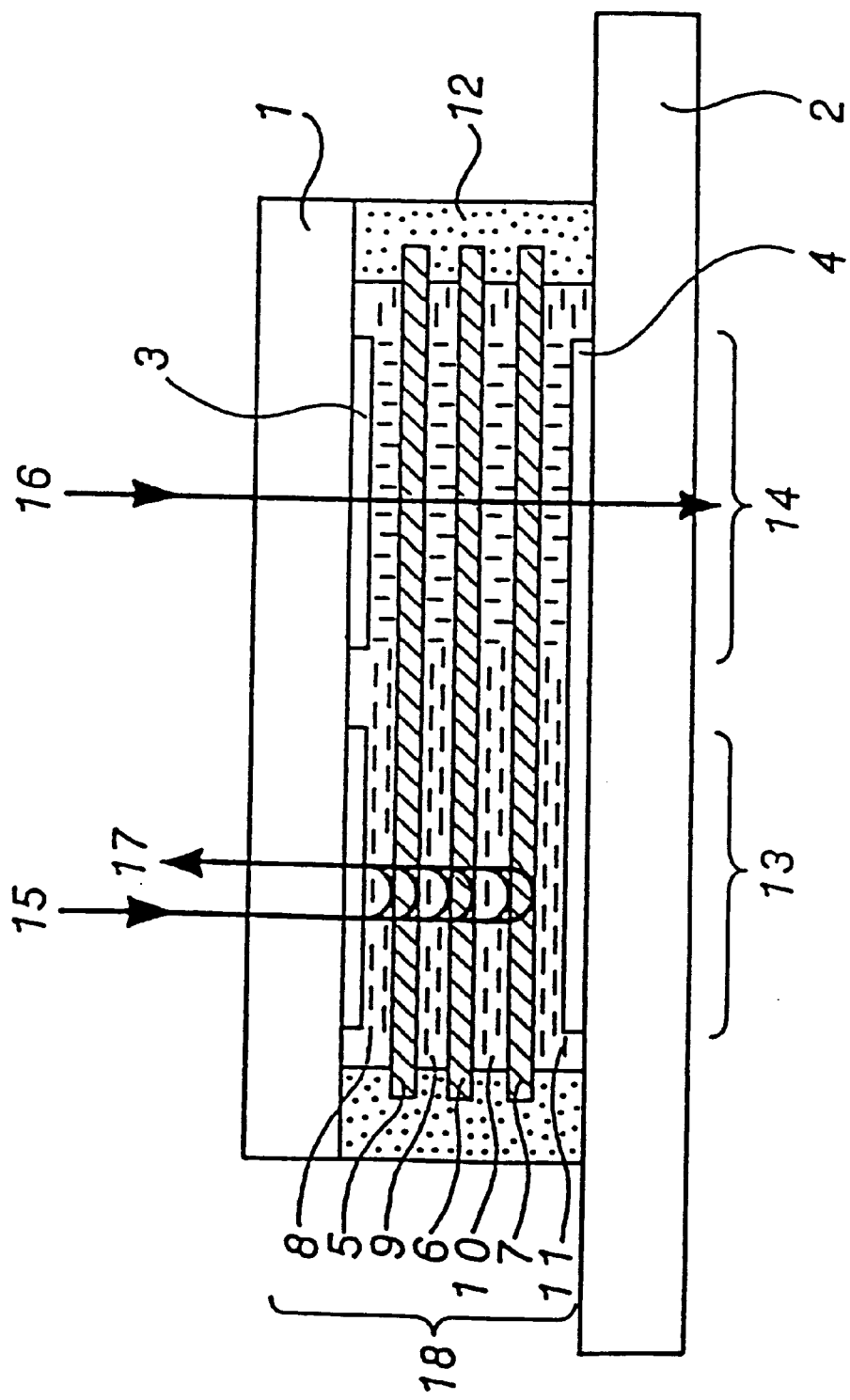

Fig. 2a
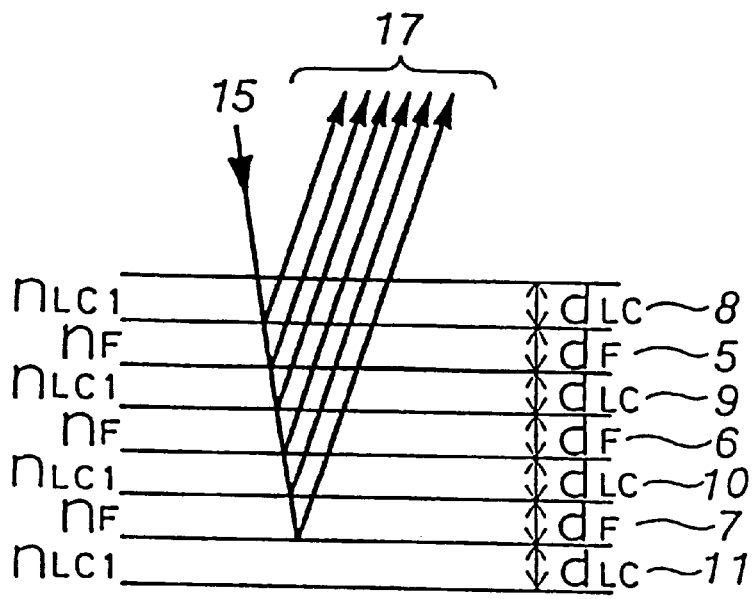
$$n_{LC1} \cdot d_{LC} \doteq n_F \cdot d_F \doteq 0.25 \lambda_0$$
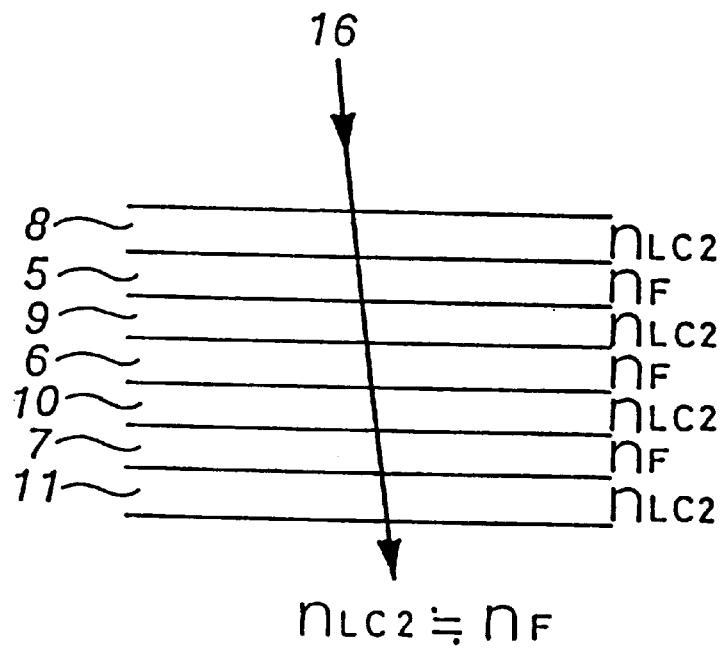
$$n_{LC2} \doteq n_F$$
Fig. 2b

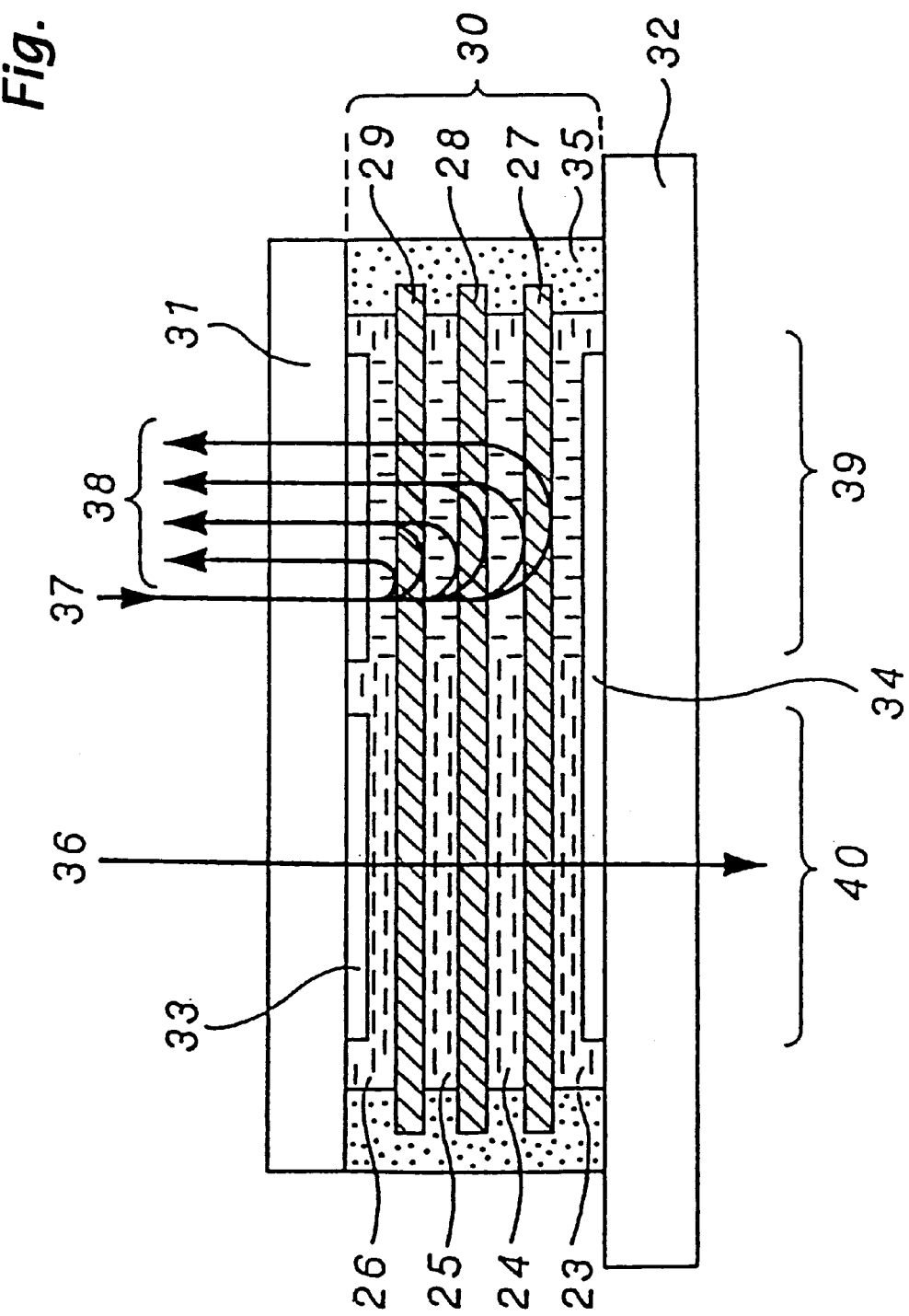

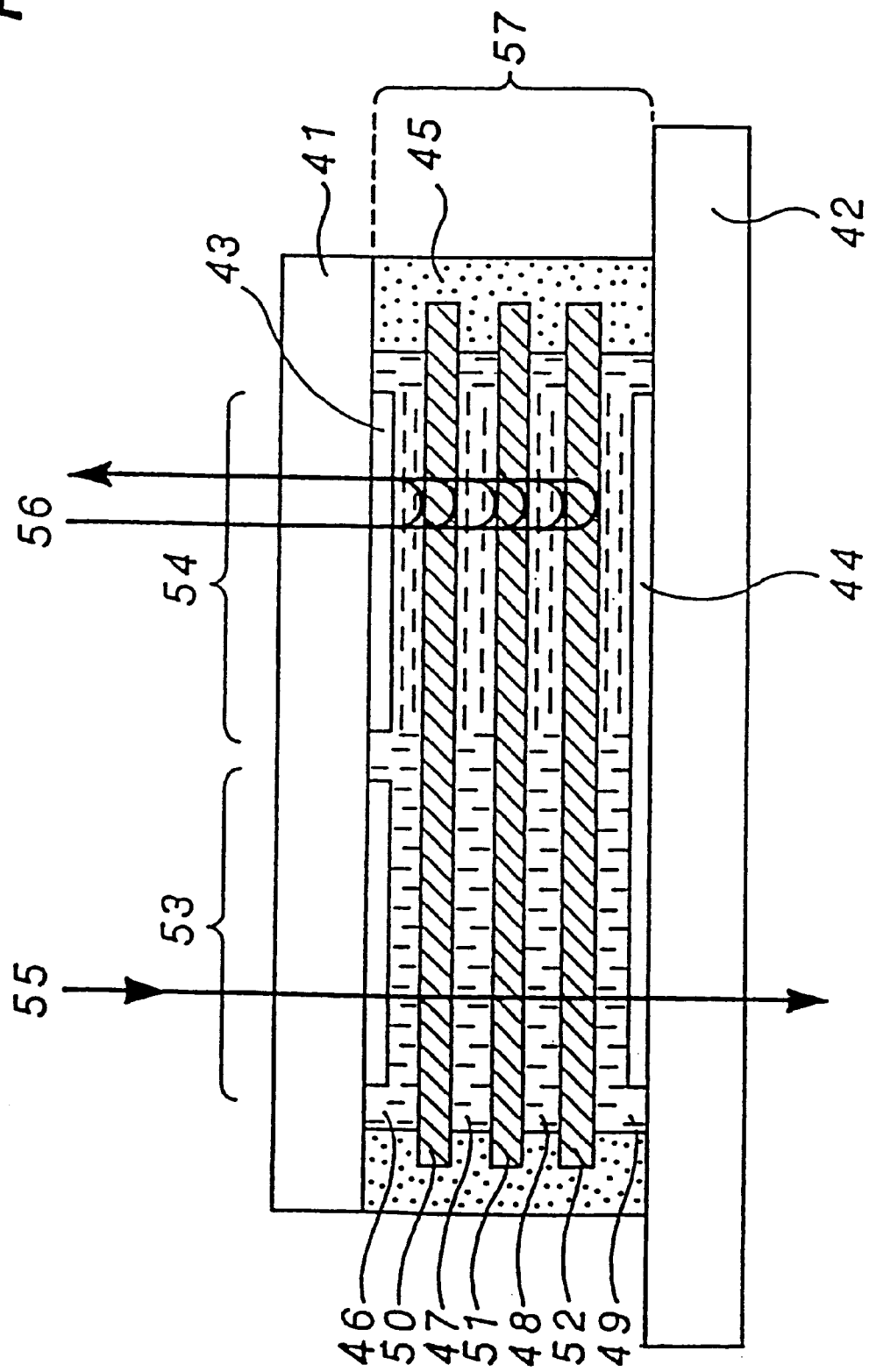

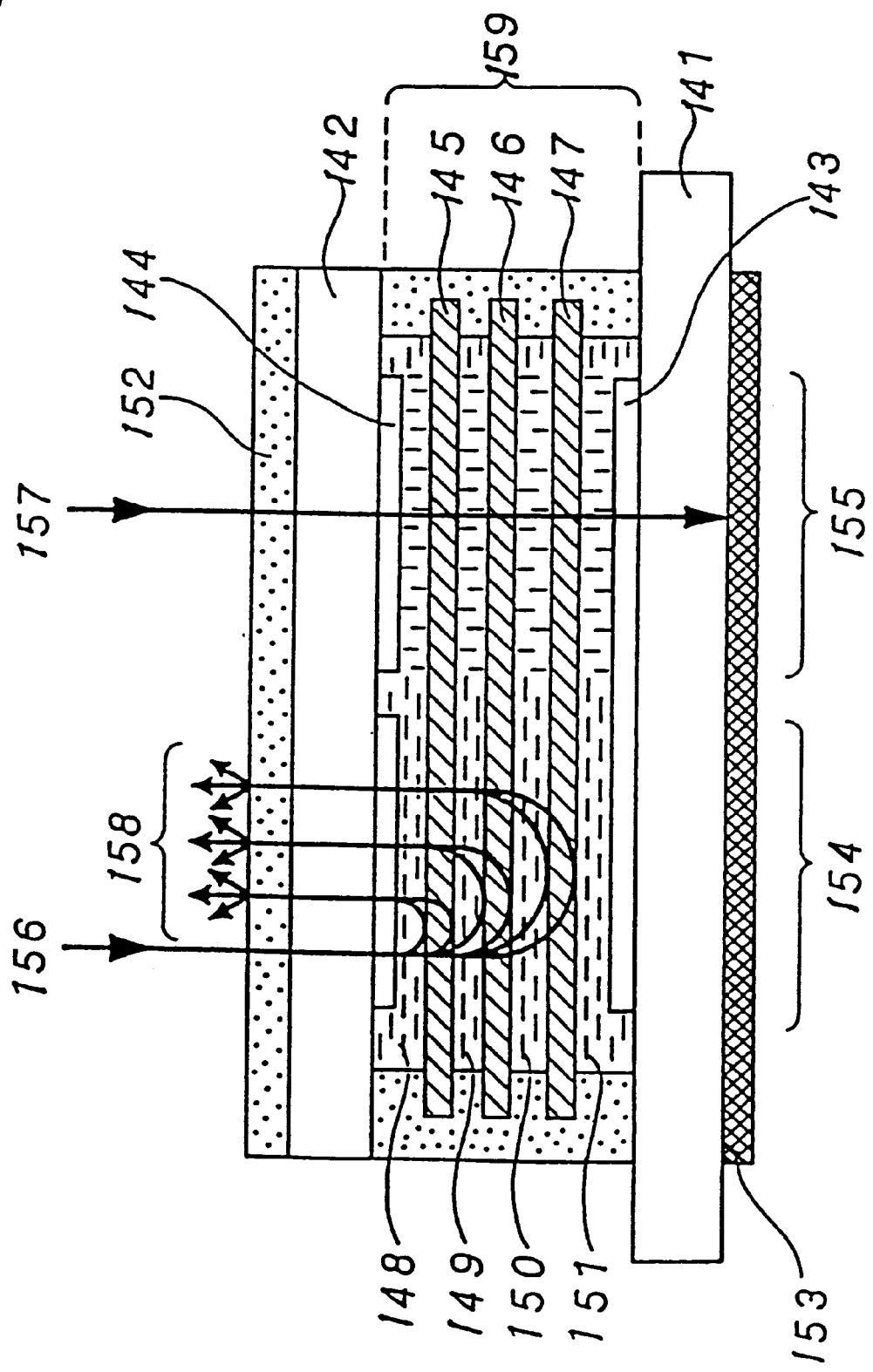

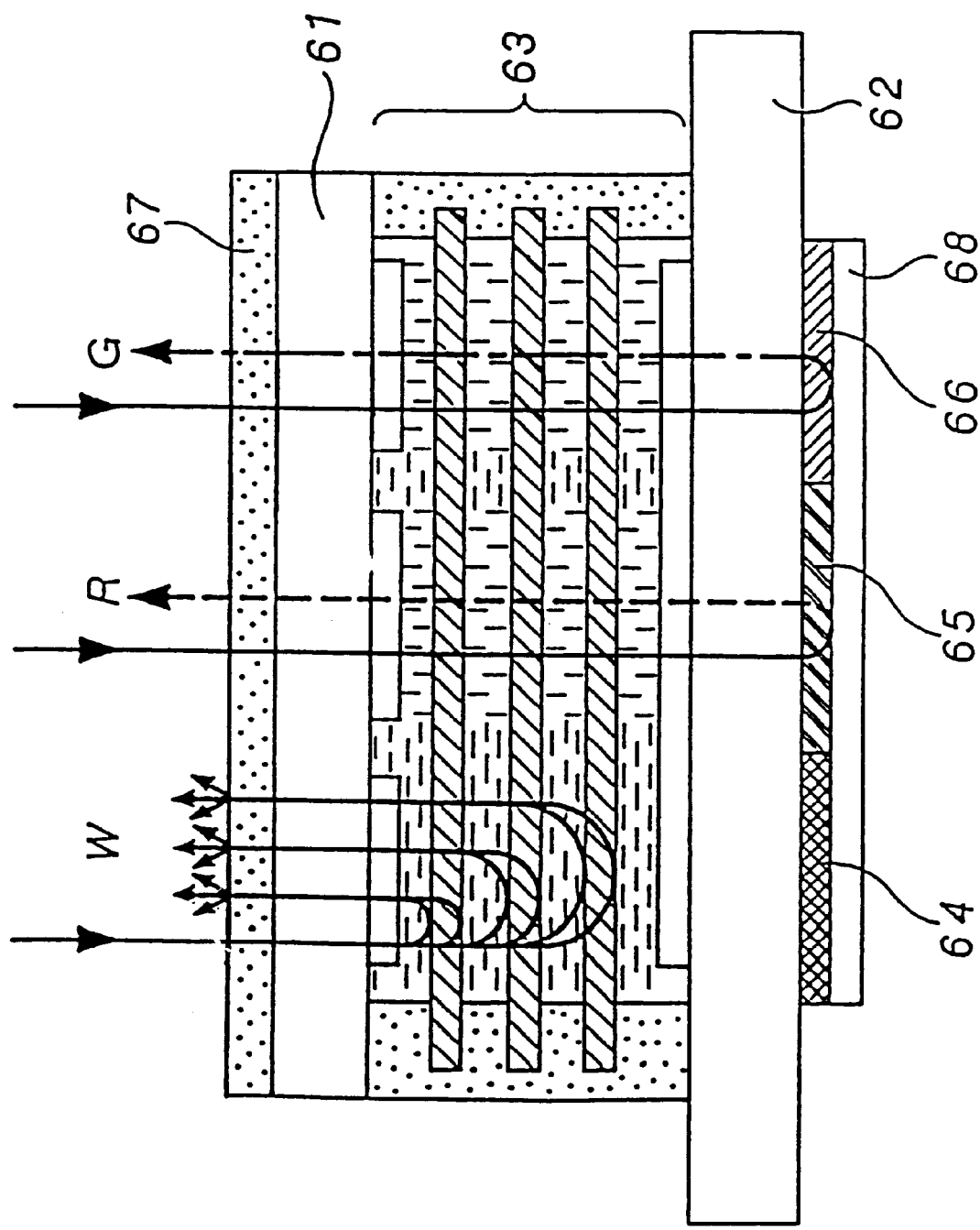

(0.5V)

(1.0 V)

(1.5 V)

(2.0 V)

(2.5 V)

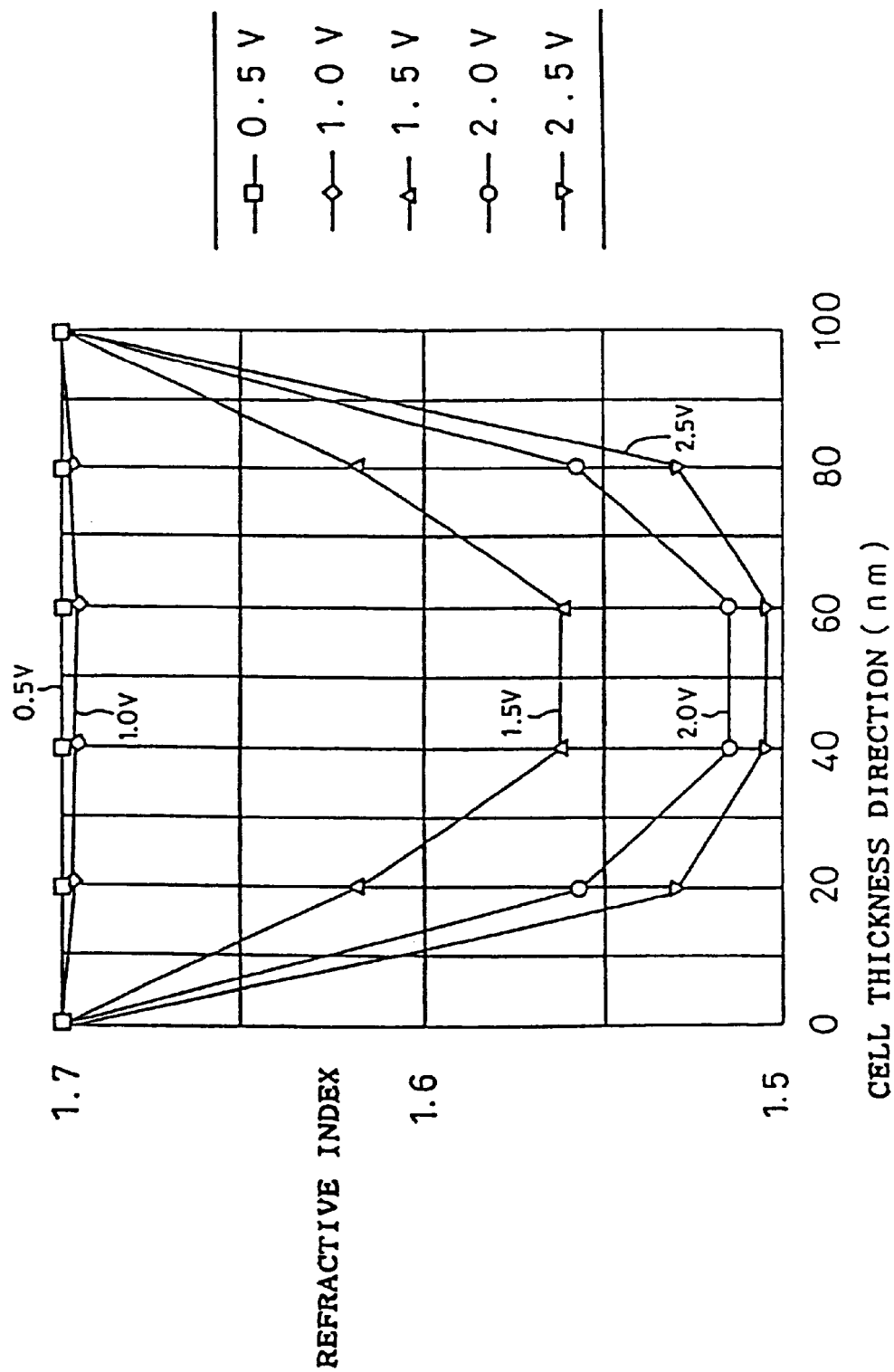

REFLECTIVE DISPLAY USING MULTIPLE LIQUID CRYSTAL LAYERS FOR CONTROLABLE REFLECTION

TECHNICAL FIELD

The present invention relates to a display device and, more particularly, to the structure of a liquid crystal device using a composite multi-layer consisting of a liquid crystal and films and a method of manufacturing the same. The present invention relates to a display device controlling reflection/transmission with the liquid crystal device.

BACKGROUND ART

A conventional reflective liquid crystal display device has been developed and spread as a display device operated with feeble power, and as information transmission medium such as a watch, a calculator, a cellular, a compact portable device, or various home electric products. As display modes, various types such as a TN (twisted nematic) type, an STN (super twisted nematic) type, and a ferroelectric type have been devised. However, all the devices use polarizing plates. Actually, since 60% of incident light to a liquid crystal element are absorbed by the polarizing plate, a dark screen is obtained. A resultant display is far from an ideal reflective display, e.g., a black display on a white background which can be easily seen.

In particular, a reflective color liquid crystal display device reflects a maximum of 10% or less of incident external light being incident on the display device to perform a display because of light absorption of the polarizing plate and a color filter. A resultant display is very dark, and is far from a vivid bright color display such as a display on print.

In recent years, as a method of solving the above drawback and realizing a bright color display without using a polarizing plate, a prior art 1 (Japanese Unexamined Patent Publication No. 6-294952) is proposed to attract attentions. In this propose, a mixture of a liquid crystal material and a polymer material consisting of a photo-set resin is inserted between a pair of substrates, and a laser beam is irradiated on the substrates in two directions, i.e., the upper and lower directions, to cause the interference pattern of the two laser beams to form strong/weak fringes of light in the mixture layer of the liquid crystal and the polymer material. The polymer photo-setting resin is photo-set in the form of layers according to the strong/weak fringe pattern to realize a multi-layer film consisting of polymer photo-setting resin layer/liquid crystal layer/polymer photo-setting resin layer/liquid crystal layer, . . . . Light having a specific wavelength range is interference-reflected according to the principle of composite multi-layer film interference reflection. When a voltage is applied to the multi-layer film by electrodes on the inner surfaces of the pair of substrates, the molecular axis direction of liquid crystal molecules in the liquid crystal layer changes. Accordingly, the refraction factor of the liquid crystal layer also changes. Therefore, the conditions of the interference reflection cannot be satisfied, and reflected light intensity also changes. In this way, light modulation can be performed by a voltage, the device functions as a display device. In the display device mentioned above, since any polarizing plate is not used, bright colors can be obtained. In addition, by changing the wavelength or irradiation angle of the irradiated laser beam, an interference pitch can be freely selected to realize arbitrary display colors. The display device, especially, as a reflective color display device, is more excellent than a conventional TN or STN reflective color display device.

However, as the drawback of the display device, as described in a prior art 2 (ASIA DISPLAY '95 P603–606), since a layer consisting of a photo-setting resin is formed with interference by two laser beams, the interference pitch is highly accurate, and the wavelength width of interference-reflected light is very narrow. Therefore, the display has vivid colors, but lacks brightness as a reflective display is obtained. In general, white is most desirable as a background color of the reflective display. For this reason, the conditions of interference reflection must be satisfied throughout a wide wavelength range of visible light. However, in the prior arts 1 and 2, it is very difficult to continuously change the interference pitches of the upper and lower layers, and a bright white display cannot be obtained without any problem. The second problem is as follows. That is, although a boundary surface between the photo-setting resin and a liquid crystal layer is desirably flat (planer) to improve the strength of interference reflection, the photo-setting resin and the liquid crystal layer are in contact with each other having small unevenness as described in the prior art 2. Therefore, all of incident light do not cause interference reflection, and part of the light is transmitted, so that a brighter reflective display device cannot be realized.

A prior art 3 (Japanese Unexamined Patent Publication No. 4-178623) as another prior art, is described as an example of a bright reflective color display device with interference reflection without using a polarizing plate. In this prior art, a liquid crystal layer and $SiO_2$ layer are laminated on each other, the thicknesses and refraction factors of the respective layers are set to fit the conditions of interference reflection to produce selective reflection of a specific wavelength. When a voltage is applied across upper and lower electrodes of the resultant structure, the refraction factor of the liquid crystal layer changes as described above, the conditions of interference reflection are not satisfied, and reflected light intensity changes. For this reason, a display function can be realized. The problems of this prior art are as follows. First, since a layer for causing interference reflection consists of only 3 layers, i.e., $SiO_2$/liquid crystal layer/$SiO_2$, sufficient intensity of interference-reflected light cannot be obtained, and almost incident light is transmitted to be absorbed in the lower light-absorbing layer. For this reason, a reflective display device having sufficient brightness cannot be realized. In order to improve the intensity of reflected light, a composite multi-layer consisting of at least 10 layers, i.e., $SiO_2$ film/liquid crystal layer/$SiO_2$ film/liquid crystal layer/$SiO_2$ film . . . is preferably used. However, in this prior art, it is very difficult to form the composite multi-layer film. More specifically, an $SiO_2$ film cannot be directly formed on the liquid crystal layer. As illustrated in this prior art, a spacer layer is temporarily formed on the entire surface of the liquid crystal layer, and the $SiO_2$ film is formed on the spacer layer. Thereafter, the spacer is removed by etching except only the peripheral portion, and then a liquid crystal is injected into the bubble portion from which the spacer is removed, thereby forming a liquid crystal layer. It is apparent that manufacture of a composite multi-layer film consisting of 10 or more layers with the above structure is not practical because of difficulty caused by the reason why an $SiO_2$ film cannot be directly formed on the liquid crystal layer. In addition, in this prior art, since a liquid crystal is injected into a bubble portion from which a spacer is removed by overetching, an alignment process for aligning the liquid crystal molecular axis direction cannot be performed, and the molecular axis direction of the injected liquid crystal may form various domains. In general, in order to improve the intensity of interference-reflected light, it is important to accurately control the thickness and the refraction factor of the liquid crystal layer. In this prior art, as described above, it is difficult to accurately control the refraction factor, and sufficient intensity of interference-reflected light cannot be obtained. A reflective display device having uniformity and brightness cannot be realized without any problem.

As described above, according to the conventional technique, the following problems are posed to realize a brighter reflective liquid crystal display device. That is, the conditions of interference reflection is difficult to be satisfied in the wide wavelength band of a visible light wavelength range, and all of incident light is not interference-reflected, but part of the light is transmitted. In addition, it is difficult to accurately control the refraction factor, sufficient intensity of interference reflection cannot be obtained. As a result, a reflective display device having uniformity and brightness cannot be realized without any problem.

The present invention has been made to solve the above problems, and its object is to provide a bright display device having uniformity and high intensity of reflected light, a display device which is easier to see and can realize a achromatic display having a black display image on a white background or a color display having high contrast, and a method in which a composite multi-layer film consisting of 10 or more layers required to realize the display devices can be more easily manufactured at high accuracy.

[Disclosure Of Invention]

The first embodiment of the present invention is characterized in that a composite multi-layer film obtained by alternately laminating films and liquid crystal layers a plurality of times is held between one pair of substrates, and a voltage is applied to the composite multi-layer film to control the reflection factor of the composite multi-layer film.

The second embodiment is characterized in that light-diffusing means is arranged outside one of the substrates, and light-absorbing means is arranged outside the other of the substrates.

The third embodiment a smectic liquid crystal, a nematic liquid crystal, a nematic polymer liquid crystal, a smectic polymer liquid crystal, or a mixture thereof.

The fourth embodiment is characterized in that the liquid crystal layer consists of a discotic liquid crystal or a mixture of a discotic liquid crystal and a nematic liquid crystal.

The fifth embodiment is characterized in that the liquid crystal layer consists of nematic liquid crystal molecules, and the major axis of the liquid crystal molecules is arranged in a direction almost parallel to the substrates or the film when no voltage is applied.

The sixth embodiment is characterized in that the liquid crystal layer consists of nematic liquid crystal molecules, and the major axis of the liquid crystal molecules is arranged in a direction almost perpendicular to the substrates or the film when no voltage is applied.

The seventh embodiment is characterized in that the light-absorbing means absorbs light in an arbitrary wavelength range or in a wavelength range of a visible light region which is transmitted through the composite multi-layer film.

The eighth embodiment is characterized in that a composite multi-layer film obtained by alternately laminating films and liquid crystal layers a plurality of times is held between one pair of substrates having electrodes formed on the inner surfaces of the substrates, at least one intermediate substrate having electrodes formed on both surfaces of the intermediate substrate is interposed in an intermediate portion of the composite multi-layer film, and light-diffusing means is arranged outside one of the substrates and light-absorbing means is arranged outside the other of the substrates, respectively.

The ninth embodiment is characterized in that the thicknesses of the liquid crystal layers and the films are set such that the composite multi-layer film reflects lights having at least one part of wavelengths of the incident visible light region when no voltage is applied.

The tenth invention is characterized in that the thicknesses of the liquid crystal layers and the films are set such that the composite multi-layer film reflects lights having at least one part of wavelengths of the incident visible light region when a voltage is applied.

The eleventh embodiment is characterized in that at least one refractive factor of the refractive factors of the major and minor axis directions of liquid crystal molecules in the liquid crystal layer is almost made equal to the refractive factor of the film.

The twelfth embodiment is characterized in that the plurality of composite multi-layer films in which the layer thicknesses of the films and the thicknesses of the liquid crystal layers are equal to each other in each composite multi-layer film and the thicknesses of the films and the thicknesses of the liquid crystal layers are different from each other in different composite multi-layer films are laminated, so that a plurality of wavelengths of incident lights are reflected.

The thirteenth embodiment is characterized in that the plurality of composite multi-layer films in which the layer thicknesses of the films and the thicknesses of the liquid crystal layers are equal to each other in each composite multi-layer film and the thicknesses of the films and the thicknesses of the liquid crystal layers are different from each other in different composite multi-layer films are laminated, so that the layer thicknesses of the liquid crystal layers and the films are set such that the plurality of composite multi-layer films reflect red light, green light, and blue light.

The fourteenth embodiment is characterized in that electrodes for independently applying a voltage are arranged on the composite multi-layer films, respectively.

The fifteenth embodiment is characterized in that the liquid crystal layer consists of nematic liquid crystal molecules, and at least a composite multi-layer film which is set to reflect light of a polarized component in an almost major axis direction of the nematic liquid crystal molecules or a direction almost perpendicular to the major axis direction is included.

The sixteenth embodiment is characterized in that the film is a film which is almost optically uniaxial or a film which is drawn.

The seventeenth embodiment is characterized by including at least a composite multi-layer film formed by following step; the composite multi-layer film is divided into two blocks, the liquid crystal molecular major axis direction of the liquid crystal layer of the first block is made to be almost perpendicular to the liquid crystal molecular major axis of the liquid crystal layer of the second block, and the first and second block are laminated.

The eighteenth embodiment is characterized in that electrodes for independently applying a voltage are arranged on the first and second blocks, respectively.

The nineteenth embodiment is characterized in that the material of the liquid crystal layer is coated on at least one surface of the film surfaces, a plurality of films on which the liquid crystal material is coated are laminated by a roller to be integrated with each other, and thus the composite multi-layer film is formed.

The twentieth embodiment is characterized in that, when the films are laminated by the roller, in a state wherein the liquid crystal layer is heated to a predetermined temperature to decrease the viscosity of the liquid crystal layer, the films are integrated with each other.

The twenty-first embodiment is characterized in that a uniaxial drawing process is performed to the films in advance to obtain alignment function for aligning liquid crystal molecules.

The twenty-second embodiment is characterized in that the material of the liquid crystal layer is coated on the film surfaces, a plurality of films on which the liquid crystal material is coated are laminated by a roller to be integrated with each other, and then a drawing process is performed to the resultant structure by a rolling roller to make the thickness of the film and the thickness of the liquid crystal layer equal to predetermined values, thereby forming the composite multi-layer film.

The twenty-third embodiment is characterized in that conductivity is given to the film.

The twenty-fourth embodiment is characterized in that the composite multi-layer film is constituted by laminating at least 10 layers of the liquid crystal layers and the films.

The twenty-fifth embodiment is characterized in that the composite multi-layer film is constituted by laminating at least 21 layers of the liquid crystal layers and the films.

The twenty-sixth embodiment is the display device which comprises a composite multi-layer film in which films and liquid crystal layers are alternately laminated, and controls the reflection factor of the composite multi-layer film by applying a voltage to the composite multi-layer film, and is characterized in that a refractive factor $n_{LC1(\lambda n)}$, in a major axis direction, and a refractive factor $n_{LC2(\lambda n)}$, in a minor axis direction, of a liquid crystal used in the liquid crystal layers with respect to light having a predetermined wavelength (?n) and a refractive factor $n_{F1(\lambda n)}$ and a refractive factor $n_{F2(\lambda n)}$, in X- and Y-axis directions which are perpendicular to each other in the film surface, of the films with respect to light having the predetermined wavelength ($\lambda$n) are set in at least one of combinations of films and liquid crystal layers, which are adjacent to each other, of the films and the liquid crystal layers of the composite multi-layer film, to satisfy the following conditions [1] and [2]:

[1] $n_{LC1(\lambda n)} \geq n_{F1(\lambda n)}$, or $n_{LC1(\lambda n)} \approx n_{F1(\lambda n)}$, and

[2] $n_{LC2(\lambda n)} \approx n_{F2(\lambda n)}$, and $n_{LC1(\lambda n)} > n_{LC2(\lambda n)}$, $n_{F1(\lambda n)} > n_{F2(\lambda n)}$.

According to this embodiment, when the conditions [1] and [2] are satisfied, a transmission state is set with respect to light of an X-axis direction component and light of a Y-axis direction component of the light having the predetermined wavelength ($\lambda$n). Reflection occurs when the refraction factor of the film and the refraction factor of the liquid crystal layer are different from each other. Since a liquid crystal generally changes in refraction factor when an applied voltage is changed, a reflection state can be set by changing the application state of the voltage, and light modulation can be performed by the voltage.

The twenty-seventh embodiment is characterized in that the $n_{F1(\lambda n)}$, $n_{LC2(\lambda n)}$, a thickness $d_{LC}$ of the liquid crystal layer, and a thickness $d_F$ of the film are set in at least one of the combinations of films and liquid crystal layers, which are adjacent to each other, to satisfy at least one of the following conditions [3] and [4]:

[3] $n_{F1(\lambda n)} \cdot d_F \approx (\frac{1}{4} + k/2) \cdot \lambda n$, and

[4] $n_{LC2(\lambda n)} \cdot d_{LC} \leq (\frac{1}{4} + m/2) \cdot \lambda n$, or $n_{LC2(\lambda n)} \cdot d_{LC} \approx (\frac{1}{4} + m/2) \cdot \lambda n$ (where k and m are 0 or integers).

According to this embodiment, reflection caused by the film with respect to the light of the X-axis direction component of the light having the predetermined wavelength ($\lambda$n) is strengthened when the condition [3] is satisfied. Reflection caused by the liquid crystal layer with respect to the light of the X-axis direction component of the light having the predetermined wavelength ($\lambda$n) is strengthened when the condition [4] is satisfied. With respect to the light of the Y-axis direction component of the light having the predetermined wavelength ($\lambda$n), a transmission state is set according to the condition [2].

The twenty-eighth embodiment is characterized in that the major axis of the liquid crystal molecules used in the liquid crystal layer is aligned (homogeneously aligned) in a direction almost horizontal with respect to the film and the X-axis direction, at least, near the film in applying no voltage, and the composite multi-layer film is set in a light transmission state in applying no voltage and set in a light reflection state in applying a voltage. According to this embodiment, the composite multi-layer film is set in a light transmission state with respect to both lights of the X-axis direction component and the Y-axis direction component of the light having the predetermined wavelength ($\lambda$n) in applying no voltage. Strong reflection can be obtained with respect to the light of the X-axis direction component of the light having predetermined wavelength ($\lambda$n) in applying a voltage, and a transmission state is set with respect to the light of the Y-axis direction component. As the liquid crystal layer, a layer having positive dielectric anisotropy ($\Delta\epsilon$) ($\Delta\epsilon > 0$) is preferably used.

The twenty-ninth embodiment is characterized in that the $n_{LC1(\lambda n)}$, $n_{LC2(\lambda n)}$, $n_{F1(\lambda n)}$, and $n_{F2(\lambda n)}$ are set in at least one of the combinations of films and liquid crystal layers, which are adjacent to each other, to satisfy the following conditions [5] and [6]:

[5] $n_{LC1(\lambda n)} \approx n_{F1(\lambda n)}$, and

[6] $n_{LC2(\lambda n)} \approx n_{F2(\lambda n)}$.

According to this invention, when the liquid crystal is aligned to rarely have a pretilt angle to the film in applying no voltage, a high transmission factor is given to the liquid crystal with respect to the light of the X-axis direction component and the light of the Y-axis direction component of the light having the predetermined wavelength ($\lambda$n) in applying no voltage.

The thirtieth embodiment is characterized in that the liquid crystal is aligned to rarely have a pretilt angle with respect to the film in applying no voltage.

The thirty-first embodiment is characterized in that the $n_{LC1(\lambda n)}$ and $n_{F1(\lambda n)}$ are set in at least one of the combinations of films and liquid crystal layers, which are adjacent to each other, to satisfy the following condition [7]:

[7] $n_{LC1(\lambda n)} > n_{F1(\lambda n)} \geq 0.96 \cdot n_{LC1(\lambda n)}$.

When the liquid crystal is aligned to have a predetermined pretilt angle with respect to the film in applying no voltage, the refraction factor of the liquid crystal layer in the X-axis direction is smaller than the refraction factor $n_{LC1(\lambda n)}$ of the liquid crystal in the major axis direction. For this reason, in the range of the condition [7], when $n_{LC1(\lambda n)}$ and $n_{F1(\lambda n)}$ are properly set depending on the pretilt angle, more preferably, when $n_{F1(\lambda n)}$ is made almost equal to an average refraction factor of the liquid crystal layer in the X-axis direction with respect to the light having the predetermined wavelength ($\lambda$n) in applying no voltage, the light of the X-axis direction component of the light having the predetermined wavelength ($\lambda$n) can be sufficiently transmitted through at least one combination of a film and a liquid crystal layer which are adjacent to each other. Therefore, in the display device of this invention, when the liquid crystal is aligned to have a pretilt angle, a high transmission factor is given with respect to the light of the X-axis direction component of the light having the predetermined wavelength ($\lambda$n) in applying no voltage. A transmission factor higher than that obtained under the condition [2] can be obtained with respect to the light of the Y-axis direction component.

The thirty-second embodiment is characterized in that the liquid crystal is aligned to have a predetermined pretilt angle, preferably an angle of from 1° to 40°, with respect to the film in applying no voltage.

The thirty-third embodiment is characterized in that the $n_{F1(\lambda n)}$ is made almost equal to an average refractive factor, in the X-axis direction, of the liquid crystal layer with respect to light having the predetermined wavelength ($\lambda$n) in applying no voltage, and the $n_{F2(\lambda n)}$ is made almost equal to an average refractive factor, in the Y-axis direction, of the liquid crystal layer with respect to light having the predetermined wavelength ($\lambda$n) in applying no voltage. With this arrangement, in applying no voltage, a high transmission factor can be obtained with respect to the light of the X-axis direction component and the light of the Y-axis direction component of the light having the predetermined wavelength ($\lambda$n).

The thirty-fourth invention is characterized in that the $n_{F1(\lambda n)}$, $n_{LC1(\lambda n)}$, $n_{LC2(\lambda n)}$, the thickness $d_{LC}$ of the liquid crystal layer, and the thickness $d_F$ of the film are set in at least one of the combinations of films and liquid crystal layers, which are adjacent to each other, to satisfy at least one of the following conditions [8] and [9]:

[8] $n_{F1(\lambda n)} \cdot d_F \approx (\frac{1}{4}+k/2) \cdot \lambda n$, and

[9] $n_{LC2(\lambda n)} \cdot d_{LC} \leq (\frac{1}{4}+m/2) \cdot \lambda n$ ? $\leq \{n_{LC2(\lambda n)}+0.6 \cdot (n_{LC1(\lambda n)}-n_{LC2(\lambda n)})\} \cdot d_{LC}$ (where k and m are 0 or integers).

According to this invention, reflection caused by the film with respect to the light of the X-axis direction component of the light having the predetermined wavelength ($\lambda$n) is strengthened when the condition [8] is satisfied. Although many liquid crystal molecules are not completely perpendicular to the film in applying a voltage, in the range of the condition [9], when $n_{LC2(\lambda n)}$ and $d_{LC}$ are properly set depending on an applied voltage, reflection caused by the liquid crystal layer with respect to the light of the X-axis direction component of the light having the predetermined wavelength ($\lambda$n) can be strengthened. With respect to light of the Y-axis direction component of the light having the predetermined wavelength ($\lambda$n), a transmission state is set according to the condition [2].

Thirty-fifth embodiment is characterized in that the major axis of the liquid crystal molecules used in the liquid crystal layer is aligned (homeotropically aligned) in a direction almost perpendicular to the film, at least, around the central portion of the liquid crystal layer in the direction of lamination in applying no voltage, and the composite multi-layer film is set in a light transmission state in applying a voltage and set in a light reflection state in applying no voltage. According to this embodiment, the composite multi-layer film is set in a light transmission state with respect to both lights of the X-axis direction component and the Y-axis direction component of the light having the predetermined wavelength ($\lambda$n) in applying a voltage. Strong reflection can be obtained with respect to the light of the X-axis direction component of the light having predetermined wavelength ($\lambda$n) in applying no voltage, and a transmission state is set with respect to the light of the Y-axis direction component. As the liquid crystal layer, a layer having negative dielectric anisotropy ($\Delta\epsilon$) ($\Delta\epsilon<0$) is preferably used.

The thirty-sixth embodiment is characterized in that the $n_{LC1(\lambda n)}$, $n_{LC2(\lambda n)}$, and $n_{F1(\lambda n)}$ are set in at least one of the combinations of films and liquid crystal layers, which are adjacent to each other, to satisfy the following condition [10]:

[10] $n_{LC1(\lambda n)} > n_{F1(\lambda n)} \geq n_{LC1(\lambda n)} - 0.6 \cdot (n_{LC1(\lambda n)} - n_{LC2(\lambda n)})$.

According to the thirty-fifth embodiment although a light transmission state is set with respect to the light of the X-axis direction component of the light having the predetermined wavelength ($\lambda$n) in applying a voltage, many liquid crystal molecules are not completely horizontal with respect to the film in applying a voltage. For this reason, according to the thirty-sixth embodiment, in the range of the condition [10], when $n_{LC1(\lambda n)}$ and $n_{F1(\lambda n)}$ are properly set depending on the applied voltage, more preferably, when $n_{F1(\lambda n)}$ is made almost equal to an average refraction factor of the liquid crystal layer in the X-axis direction with respect to the light having the predetermined wavelength ($\lambda$n) in applying a voltage, the light of the X-axis direction component of the light having the predetermined wavelength ($\lambda$n) can be sufficiently transmitted through at least one combination of a film and a liquid crystal layer which are adjacent to each other. With respect to light of the Y-axis direction component of the light having the predetermined wavelength ($\lambda$n), a transmission state is set according to the condition [2].

The thirty-seventh embodiment is characterized in that the $n_{F1(\lambda n)}$ is made almost equal to an average refractive factor in the X-axis direction, of the liquid crystal layer with respect to light having the predetermined wavelength in applying a voltage.

The thirty-eighth embodiment is characterized in that the $n_{F1(\lambda n)}$, $n_{LC2(\lambda n)}$, the thickness $d_{LC}$ of the liquid crystal layer, and the thickness $d_F$ of the film are set in at least one of the combinations of films and liquid crystal layers, which are adjacent to each other, to satisfy at least one of the following conditions [11] and [12]:

[11] $n_{F1(\lambda n)} \cdot d_F \approx (\frac{1}{4}+k/2) \cdot \lambda n$, and

[12] $n_{LC2(\lambda n)} \cdot d_{LC} \approx (\frac{1}{4}+m/2) \cdot \lambda n$ (where k and m are 0 or integers).

According to this embodiment, reflection caused by the film with respect to the light of the X-axis direction component of the light having the predetermined wavelength ($\lambda$n) is strengthened when the condition [11] is satisfied. Reflection caused by the liquid crystal layer with respect to the light of the X-axis direction component of the light having the predetermined wavelength ($\lambda$n) is strengthened when the condition [12] is satisfied. With respect to the light of the Y-axis direction component of the light having the predetermined wavelength (λn), a transmission state is set according to the condition [2]. In this display device, when the major axis of liquid crystal molecules used in the liquid crystal layer is aligned in a direction almost perpendicular to the film near the film in applying no voltage, reflection caused by at least one of the film and the liquid crystal layer with respect to the light of the X-axis direction component of the light having the predetermined wavelength (λn) is strengthened.

The thirty-ninth embodiment is characterized in that the major axis of the liquid crystal molecules used in the liquid crystal layer is aligned in a direction almost perpendicular to the film near the film in applying no voltage.

The fortieth embodiment is characterized in that the $n_{LC2(\lambda n)}$ and $d_{LC}$ are set in at least one of the combinations of films and liquid crystal layers, which are adjacent to each other, to satisfy the following conditions [13] and [14]:

[13] $n_{F1(\lambda n)} \cdot d_F \approx (\frac{1}{4}+k/2) \cdot \lambda n$, and

[14] $n_{LC2(\lambda n)} \cdot d_{LC} < (\frac{1}{4}+m/2) \cdot \lambda n?? \leq 1.12 n_{LC2(\lambda n)} \cdot d_{LC}$ (where k and m are 0 or integers).

According to this embodiment, reflection caused by the film with respect to the light of the X-axis direction component of the light having the predetermined wavelength (λn) is strengthened when the condition [13] is satisfied. When the major axis of liquid crystal molecules used in the liquid crystal layer is aligned at a predetermined angle from a direction perpendicular to the film near the film in applying no voltage, the refraction factor of the liquid crystal layer in the X-axis direction is larger than the refraction factor $n_{LC2(\lambda n)}$ of the liquid crystal in the minor axis direction. For this reason, in the range of the condition [14], when $n_{LC2(\lambda n)}$ and $d_{LC}$ are properly set depending on an inclination of the liquid crystal molecules from the vertical direction in applying no voltage, reflection caused by the liquid crystal layer with respect to the light of the X-axis direction component of the light having the predetermined wavelength (λn) in applying no voltage can be strengthened. With respect to the light of the Y-axis direction component of the light having the predetermined wavelength (λn), a transmission state is set according to the condition [2].

The forty-first embodiment is characterized in that the major axis of the liquid crystal molecules used in the liquid crystal layer is aligned to be inclined at a predetermined angle, preferably an angle of from 1° to 40°, from a direction perpendicular to the film near the film in applying no voltage.

The forty-second embodiment is a display device which comprises a composite multi-layer film in which films and liquid crystal layers are alternately laminated, and controls the reflection factor of the composite multi-layer film by applying a voltage to the composite multi-layer film, and is characterized in that a refractive factor $n_{LC1(\lambda n)}$, in a major axis direction, and a refractive factor $n_{LC2(\lambda n)}$, in a minor axis direction, of a liquid crystal used in the liquid crystal layers with respect to light having a predetermined wavelength (λn) and a refractive factor $n_{F1(\lambda n)}$ and a refractive factor $n_{F2(\lambda n)}$, in X- and Y-axis directions which are perpendicular to each other in the film surface, of the films with respect to light having the predetermined wavelength (λn) are set in at least one of combinations of films and liquid crystal layers, which are adjacent to each other, of the films and the liquid crystal layers of the composite multi-layer film, to satisfy the following conditions [15] and [16]:

[15] $n_{F1(\lambda n)} \geq n_{LC2(\lambda n)}$, or $n_{F1(\lambda n)} \approx n_{LC2(\lambda n)}$, and

[16] $n_{LC2(\lambda n)} \approx n_{F2(\lambda n)}$, and $n_{LC1(\lambda n)} > n_{LC2(\lambda n)}$.

According to this embodiment the composite multi-layer film is set in a transmission state with respect to both the lights of the X-axis direction component and the Y-axis direction component of the light having the predetermined wavelength (λn) when the conditions [15] and [16] are satisfied. Reflection occurs when the refraction factor of the film and the refraction factor of the liquid crystal layer are different from each other. Since a liquid crystal generally changes in refraction factor when an applied voltage is changed, a reflection state can be set by changing the application state of the voltage, and light modulation can be performed by the voltage.

The forty-third embodiment is characterized in that the $n_{F1(\lambda n)}$, $n_{LC1(\lambda n)}$, a thickness $d_{LC}$ of the liquid crystal layer, and a thickness $d_F$ of the film are set in at least one of the combinations of films and liquid crystal layers, which are adjacent to each other, to satisfy at least one of the following conditions [17] and [18]:

[17] $n_{F1(\lambda n)} \cdot d_F \approx (\frac{1}{4}+k/2) \cdot \lambda n$, and

[18] $n_{LC1(\lambda n)} \cdot d_{LC} \geq (\frac{1}{4}+m/2) \cdot \lambda n$, or $n_{LC1(\lambda n)} \cdot d_{LC} \approx (\frac{1}{4}+m/2) \cdot \lambda n$ (where k and m are 0 or integers).

According to this embodiment, reflection caused by the film with respect to the light of the X-axis direction component of the light having the predetermined wavelength (λn) is strengthened when the condition [17] is satisfied. Reflection caused by the liquid crystal layer with respect to the light of the X-axis direction component of the light having the predetermined wavelength (λn) is strengthened when the condition [18] is satisfied. With respect to the light of the Y-axis direction component of the light having the predetermined wavelength (λn), a transmission state is set according to the condition [16].

The forty-fourth embodiment is characterized in that the major axis of the liquid crystal molecules used in the liquid crystal layer is aligned (homogeneously aligned) in a direction almost horizontal with respect to the film and aligned in the X-axis direction, at least, near the film in applying no voltage, and the composite multi-layer film is set in a light transmission state in applying a voltage and set in a light reflection state in applying no voltage. According to the present invention, the composite multi-layer film is set in a light transmission state with respect to both lights of the X-axis direction component and the Y-axis direction component of the light having the predetermined wavelength (λn) in applying a voltage. Strong reflection can be obtained with respect to the light of the X-axis direction component of the light having predetermined wavelength (λn) in applying no voltage, and a transmission state is set with respect to the light of the Y-axis direction component. As the liquid crystal layer, a layer having positive dielectric anisotropy (Δε) (Δε>0) is preferably used.

The forty-fifth embodiment is characterized in that the $n_{LC1(\lambda n)}$, $n_{LC2(\lambda n)}$, and $n_{F1(\lambda n)}$ are set in at least one of the combinations of films and liquid crystal layers, which are adjacent to each other, to satisfy the following condition [19]:

[19] $n_{LC2(\lambda n)} < n_{F1(\lambda n)} \leq n_{LC2(\lambda n)} + 0.6(n_{LC1(\lambda n)} - n_{LC2(\lambda n)})$.

According to the forty-fourth embodiment, although a light transmission state is set with respect to the light of the X-axis direction component of the light having the predetermined wavelength (λn) in applying a voltage, in many case, liquid crystal molecules are not completely horizontal with respect to the film in applying a voltage. In this case, the refraction factor of the liquid crystal layer in the X-axis direction is larger than the refraction factor $n_{LC2(\lambda n)}$ of the liquid crystal in the minor axis direction. For this reason, as in the forty-fifth embodiment, in the range of the condition [19], when $n_{LC2(\lambda n)}$ and $n_{F1(\lambda n)}$ are properly set depending on the applied voltage, more preferably, when $n_{F1(\lambda n)}$ is made almost equal to an average refraction factor of the liquid crystal layer in the X-axis direction with respect to the light having the predetermined wavelength (λn) in applying a voltage, the light of the X-axis direction component of the light having the predetermined wavelength (λn) can be sufficiently transmitted through at least one combination of a film and a liquid crystal layer which are adjacent to each other. A transmission factor higher than that obtained under the condition [16] can be obtained with respect to the light of the Y-axis direction component.

The forty-sixth embodiment is characterized in that the $n_{F1(\lambda n)}$ is made almost equal to an average refractive factor, in the X-axis direction, of the liquid crystal layer with respect to light having the predetermined wavelength in applying a voltage.

The forty-seventh embodiment is characterized in that the $n_{F1(\lambda n)}$, $n_{LC1(\lambda n)}$, the thickness $d_{LC}$ of the liquid crystal layer, and the thickness $d_F$ of the film are set in at least one of the combinations of films and liquid crystal layers, which are adjacent to each other, to satisfy at least one of the following conditions [20] and [21]:

[20] $n_{F1(\lambda n)} \cdot d_F \approx (\frac{1}{4}+k/2) \cdot \lambda n$, and

[21] $n_{LC1(\lambda n)} \cdot d_{LC} \approx (\frac{1}{4}+m/2) \cdot \lambda n$ (where k and m are 0 or integers).

According to this embodiment, reflection caused by the film with respect to the light of the X-axis direction component of the light having the predetermined wavelength (λn) is strengthened when the condition [20] is satisfied. Reflection caused by the liquid crystal layer with respect to the light of the X-axis direction component of the light having the predetermined wavelength (λn) is strengthened when the condition [21] is satisfied. With respect to the light of the Y-axis direction component of the light having the predetermined wavelength (λn), a transmission state is set according to the condition [16]. In this display device, when the liquid crystal is aligned to rarely have a pretilt angle to the film in applying no voltage, reflection caused by at least one of the film and the liquid crystal layer with respect to the light of the X-axis direction component of the light having the predetermined wavelength (λn) in applying no voltage is strengthened.

The forty-eighth embodiment is characterized in that the liquid crystal is aligned to rarely have a pretilt angle to the film in applying no voltage.

The forty-ninth embodiment is characterized in that the $n_{LC1(\lambda n)}$ and $d_{LC}$ are set in at least one of the combinations of films and liquid crystal layers, which are adjacent to each other, to satisfy the following conditions [22] and [23]:

[22] $n_{F1(\lambda n)} \cdot d_F \approx (\frac{1}{4}+k/2) \cdot \lambda n$, and

[23] $n_{LC1(\lambda n)} \cdot d_{LC} > (\frac{1}{4}+m/2) \cdot \lambda n \geq 0.96 n_{LC1(\lambda n)} \cdot d_{LC}$ (where k and m are 0 or integers).

According to this embodiment, reflection caused by the film with respect to the light of the X-axis direction component of the light having the predetermined wavelength (λn) is strengthened when the condition [22] is satisfied. When the liquid crystal is aligned to have a predetermined pretilt angle to the film in applying no voltage, the refraction factor of the liquid crystal layer in the X-axis direction is smaller than the refraction factor $n_{LC1(\lambda n)}$ of the liquid crystal in the major axis direction. For this reason, in the range of the condition [23], when $n_{LC1(\lambda n)}$ and $d_{LC}$ are properly set depending on the pretilt angle, reflection caused by the liquid crystal layer with respect to the light of the X-axis direction component of the light having the predetermined wavelength (λn) can be strengthened. With respect to the light of the Y-axis direction component of the light having the predetermined wavelength (λn), a transmission state is set according to the condition [16].

The fiftieth embodiment is characterized in that the liquid crystal is aligned to have a predetermined pretilt angle, preferably an angle of from 1° to 40°, to the film in applying no voltage.

The fifty-first embodiment is characterized in that the major axis of the liquid crystal molecules used in the liquid crystal layer is aligned (homeotropically aligned) in a direction almost perpendicular to the film, at least, near the central portion of the liquid crystal layer in the direction of lamination in applying no voltage, and the composite multi-layer film is set in a light transmission state in applying no voltage and set in a light reflection state in applying a voltage. According to this embodiment, the composite multi-layer film is set in a light transmission state with respect to both lights of the X-axis direction component and the Y-axis direction component of the light having the predetermined wavelength (λn) in applying no voltage. Strong reflection can be obtained with respect to the light of the X-axis direction component of the light having predetermined wavelength (λn) in applying a voltage, and a transmission state is set with respect to the light of the Y-axis direction component. As the liquid crystal layer, a layer having negative dielectric anisotropy (Δε) (Δε<0) is preferably used.

The fifty-second embodiment is characterized in that the $n_{LC1(\lambda n)}$, $n_{LC2(\lambda n)}$, $n_{F1(\lambda n)}$, and $n_{F2(\lambda n)}$ are set in at least one of the combinations of films and liquid crystal layers, which are adjacent to each other, to satisfy the following condition [24]:

[24] $n_{F1(\lambda n)} \approx n_{LC2(\lambda n)} \approx n_{F2(\lambda n)}$, and $n_{LC1(\lambda n)} > n_{LC2(\lambda n)}$.

According to this embodiment, when the major axis of liquid crystal molecules used in the liquid crystal layer is aligned in a direction almost perpendicular to the film near the film in applying no voltage, a high transmission factor is given with respect to the light of the X-axis direction component and the light of the Y-axis direction component of the light having the predetermined wavelength (λn) in applying no voltage.

The fifty-third embodiment is characterized in that the major axis of the liquid crystal molecules used in the liquid crystal layer is aligned in a direction almost perpendicular to the film near the film in applying no voltage.

The fifty-fourth embodiment is characterized in that the $n_{LC2(\lambda n)}$ and $n_{F1(\lambda n)}$ are set in at least one of the combinations of films and liquid crystal layers, which are adjacent to each other, to satisfy the following condition [25]:

[25] $n_{LC2(\lambda n)} < n_{F1(\lambda n)} \leq 1.12 \cdot n_{LC2(\lambda n)}$.

When the major axis of liquid crystal molecules used in the liquid crystal layer is aligned at a predetermined angle from a direction perpendicular to the film near the film in applying no voltage, the refraction factor of the liquid crystal layer in the X-axis direction is larger than the refraction factor $n_{LC2(\lambda n)}$ of the liquid crystal in the minor axis direction. For this reason, in the range of the condition [25], when $n_{LC2(\lambda n)}$ and $n_{F1(\lambda n)}$ are properly set depending on an inclination of the liquid crystal molecules from the vertical direction in applying no voltage, more preferably, when $n_{F1(\lambda n)}$ is made almost equal to an average refraction factor of the liquid crystal layer in the X-axis direction with respect to the light having the predetermined wavelength ($\lambda$n) in applying no voltage, the light of the X-axis direction component of the light having the predetermined wavelength ($\lambda$n) can be sufficiently transmitted through at least one combination of a film and a liquid crystal layer which are adjacent to each other in applying no voltage. Therefore, in the display device of this invention, when the major axis of the liquid crystal molecules used in the liquid crystal layer is aligned at a predetermined angle from a direction perpendicular to the film near the film in applying no voltage, a high transmission factor is given in applying no voltage with respect to the light of the X-axis direction component of the light having the predetermined wavelength ($\lambda$n). A transmission factor higher than that obtained under the condition [16] can be obtained with respect to the light of the Y-axis direction component.

The fifty-fifth embodiment is characterized in that the major axis of the liquid crystal molecules used in the liquid crystal layer is aligned to be inclined at a predetermined angle, preferably an angle of from 1° to 40°, from a direction perpendicular to the film near the film in applying no voltage.

The fifty-sixth embodiment is characterized in that the $n_{F1\lambda n}$ is made almost equal to an average refractive factor, in the X-axis direction, of the liquid crystal layer with respect to light having the predetermined wavelength ($\lambda$n) in applying no voltage, and the $n_{F2(\lambda n)}$ is made almost equal to an average refractive factor, in the Y-axis direction, of the liquid crystal layer with respect to light having the predetermined wavelength ($\lambda$n) in applying no voltage. With this arrangement, in applying no voltage, a high transmission factor can be obtained with respect to the light of the X-axis direction component and the light of the Y-axis direction component of the light having the predetermined wavelength ($\lambda$n).

The fifty-seventh embodiment is characterized in that the $n_{F1(\lambda n)}$, $n_{LC1(\lambda n)}$, $n_{LC2(\lambda n)}$, the thickness $d_{LC}$ of the liquid crystal layer, and the thickness $d_F$ of the film are set in at least one of the combinations of films and liquid crystal layers, which are adjacent to each other, to satisfy at least one of the following conditions [26] and [27]:

[26] $n_{F1(\lambda n)} \cdot d_F \approx (1/4 + k/2) \cdot \lambda n$, and

[27] $n_{LC1(\lambda n)} \cdot d_{LC} \geq (1/4 + m/2) \cdot \lambda n \geq \{n_{LC1(\lambda n)} - 0.6 \cdot (n_{LC1(\lambda n)} - n_{LC2(\lambda n)})\} \cdot d_{LC}$ (where k and m are 0 or integers).

According to this embodiment, reflection caused by the film with respect to the light of the X-axis direction component of the light having the predetermined wavelength ($\lambda$n) is strengthened when the condition [26] is satisfied. Although in many case, liquid crystal molecules are not completely perpendicular to the film in applying a voltage, in the range of the condition [27], when $n_{LC1(\lambda n)}$ and $d_{LC}$ are properly set depending on an applied voltage, reflection caused by the liquid crystal layer with respect to the light of the X-axis direction component of the light having the predetermined wavelength ($\lambda$n) can be strengthened. With respect to light of the Y-axis direction component of the light having the predetermined wavelength ($\lambda$n), a transmission state is set according to the condition [16].

The fifty-eighth embodiment is characterized in that the $n_{F1(\lambda n)}$, $d_F$, and $\lambda$n are set to satisfy the following condition [28]:

[28] $(1/8 + k/2) \cdot \lambda n \leq n_{F1(\lambda n)} \cdot d_F \leq (3/8 + k/2) \cdot \lambda n$ (where k is 0 or an integer).

The fifty-ninth embodiment is characterized in that the $n_{F2(\lambda n)}$, $d_F$, and $\lambda$n are set to satisfy the following condition [29]:

[29] $(1/8 + k/2) \cdot \lambda n \leq n_{F2(\lambda n)} \cdot d_F \leq (3/8 + k/2) \cdot \lambda n$ (where k is 0 or an integer).

The sixtieth embodiment is characterized in that the $\lambda$n, $n_{LC2(\lambda n)}$, and $d_{LC}$ are set to satisfy the following condition [30]:

[30] $(1/8 + m/2) \cdot \lambda n \leq n_{LC2(\lambda n)} \cdot d_{LC} \leq (3/8 + m/2) \cdot \lambda n$ (where m is 0 or an integer).

The sixty-first embodiment is characterized in that the $\lambda$n, $n_{LC1(\lambda n)}$, and $d_{LC}$ are set to satisfy the following condition [31]:

[31] $(1/8 + m/2) \cdot \lambda n \leq n_{LC1(\lambda n)} \cdot d_{LC} \leq (3/8 + m/2) \cdot \lambda n$ (where m is 0 or an integer).

As in the display devices of the fifty-eighth to sixty-first embodiments, even if a wavelength to be reflected is offset from the predetermined wavelength $\lambda$n by about $(1/8)\lambda$n, only the central wavelength of reflection is offset, and reflection itself occurs.

The sixty-second embodiment is characterized in that the plurality of films and the plurality of liquid crystal layers of the composite multi-layer film are designed to satisfy a condition described in one of the twenty-sixth to sixty-first inventions. As described above, in order to satisfy a condition described in one of the twenty-sixth to sixty-first inventions in the plurality of films and plurality of liquid crystal layers of the composite multi-layer film, it is preferable that the refraction factor $n_{LC1(\lambda n)}$, in the major axis direction, of the refraction factor used in the liquid crystal layer with respect to the light having the predetermined wavelength ($\lambda$n), the refraction factor $n_{LC2(\lambda n)}$ in the minor axis direction, and the thickness $d_{LC}$ of the liquid crystal layer are almost the same in the plurality of liquid crystal layers, and that the refraction factor $n_{F1(\lambda n)}$, in the X-axis direction, of the film with respect to the light having the predetermined wavelength ($\lambda$n), the refraction factor $n_{F2(\lambda n)}$ in the Y-axis direction, and the thickness $d_F$ of the film are the same in the plurality of films.

The sixty-third embodiment is characterized in that at least two composite multi-layer films which satisfy a condition described in one of the twenty-sixth to sixty-second embodiments with respect to the P and S waves of light having the predetermined wavelength ($\lambda$n) are laminated, and a voltage is applied to the laminated composite multi-layer films to control the reflection factors of the laminated composite multi-layer film.

According to this embodiment, transmission and reflection can be controlled with respect to both P and S waves of the light having the predetermined wavelength ($\lambda$n), a display device having a higher contrast can be realized.

The sixty-fourth embodiment is characterized in that a plurality of composite multi-layer films which satisfy a condition described in one of the twenty-seventh to sixty-second embodiments with respect to a plurality of different predetermined wavelengths (λn=λ1, λ2, ..., λL) are laminated, and a voltage is applied to the plurality of laminated composite multi-layer films to control the reflection factors of the plurality of laminated composite multi-layer film.

The sixty-fifth embodiment is characterized in that a plurality of composite multi-layer films which satisfy a condition described in one of the twenty-sixth to sixty-second embodiments with respect to the P and S waves of lights having a plurality of different predetermined wavelengths (λn=λ1, λ2, ..., λL) are laminated, and a voltage is applied to the plurality of laminated composite multi-layer films to control the reflection factors of the plurality of laminated composite multi-layer film.

In these display devices of the sixty-fourth and sixty-fifth embodiments, the plurality of composite multi-layer films comprise a plurality of films and a plurality of liquid crystal layers, and it is preferable that the refraction factor $n_{LC1(\lambda n)}$, in the major axis direction, of the liquid crystal used in the liquid crystal layer with respect to the light having the predetermined wavelength (λn), the refraction factor $n_{LC2(\lambda n)}$, in the minor axis direction, and the thickness $d_{LC}$ of the liquid crystal layer are almost the same in the plurality of liquid crystal layers in the same composite multi-layer film and are different in the different composite multi-layer films, and that the refraction factor $n_{F1(\lambda n)}$, in the X-axis direction, of the film with respect to the light having the predetermined wavelength (λn), the refraction factor $n_{F2(\lambda n)}$, in the Y-axis direction, and the thickness $d_F$ of the film are almost the same in the plurality of liquid crystal layers in the same composite multi-layer film and are different in the different composite multi-layer films.

The sixty-sixth embodiment is characterized in that the $n_{LC1(\lambda n)}$ and $n_{LC2(\lambda n)}$ are set with respect to the predetermined wavelength (λn) to satisfy the following condition [32]:

[32] $n_{LC1(\lambda n)}/n_{LC2(\lambda n)} \geq 1.10$.

The sixty-seventh embodiment is characterized in that the $n_{LC1(\lambda n)}$ and $n_{LC2(\lambda n)}$ are set with respect to the plurality of different predetermined wavelengths (λn=λ1, λ2, ..., λL) to satisfy the following condition [33]:

[33] $n_{LC1(\lambda n)}/n_{LC2(\lambda n)} \geq 1.10$.

When the birefringence factor of the liquid crystal is given by $n_{LC1(\lambda n)}/n_{LC2(\lambda n)} \geq 1.10$ as described above, even if the number of films and the number of liquid crystal layers are reduced, a high reflection factor can be obtained.

The sixty-eighth embodiment is characterized in that the sum of the number of films and the number of liquid crystal layers of the composite multi-layer film or the sum of the number of films and the number of liquid crystal layers of the plurality of laminated composite multi-layer films is set to be not less than 100. When the sum of the number of films and the number of liquid crystal layers is set to be 100 or more, a display device having a high reflection factor can be obtained.

The sixty-ninth embodiment is characterized in that the lights having the plurality of different predetermined wavelength (λn=λ1, λ2, ..., λL) are lights having 3 to 12 different predetermined wavelengths (λn=λ1, λ2, ..., λL, 3≦L≦12), the $n_{LC1(\lambda n)}$ and $n_{LC2(\lambda n)}$ are set with respect to the lights having the 3 to 12 different predetermined wavelengths (λn=λ1, λ2, ..., λL, 3≦L≦12) to satisfy the following condition [34]:

[34] $n_{LC1(\lambda n)}/n_{LC2(\lambda n)} \geq 1.10$, and the sum of the number of films and the number of liquid crystal layers of the plurality of laminated composite multi-layer films is set to be about 100 to 400.

The seventieth embodiment is characterized in that the lights having the 3 to 12 different predetermined wavelengths (λn=λ1, λ2, ..., λL) are lights having different predetermined wavelengths (λn=λ1, λ2, ..., λL, 3≦L≦12, where L is a multiple of three) whose number is a multiple of three. In the display devices of the seventieth and seventy-first embodiments, reflection conditions are satisfied for, e.g., red light, green light, and blue light, respectively, so that a white display can be easily realized.

The seventy-first embodiment is characterized in that the lights having the plurality of different predetermined wavelength (λn=λ1, λ2, ..., λL) are lights having 4 to 8 different predetermined wavelengths (λn=λ1, λ2, ..., λL, where 4≦L≦8), the $n_{LC1(\lambda n)}$ and $n_{LC2(\lambda n)}$ are set with respect to the lights having the 4 to 8 different predetermined wavelengths (λn=λ1, λ2, ..., λL, 4≦L≦8) to satisfy the following condition [35]:

[35] $n_{LC1(\lambda n)}/n_{LC2(\lambda n)} \geq 1.13$, and the sum of the number of films and the number liquid crystal layers of the plurality of laminated composite multi-layer films is set to be about 100 to 300.

The seventy-second embodiment is characterized in that the lights having the plurality of different predetermined wavelengths (λn=λ1, λ2, ..., λL) are visible lights.

The seventy-third embodiment is characterized in that light having at least one wavelength of the lights having the plurality of different predetermined wavelengths (λn=λ1, λ2, ..., λL) is used as light having a wavelength in an infrared region. When the display device is obliquely viewed, a reflection wavelength shifts to a short wavelength side. Therefore, when a reflection wavelength range from the front distinct vision is enlarged to the infrared range, white reflection can be realized even if the display is viewed in any direction, i.e., viewed from the front or obliquely viewed. The reflection wavelength is preferably shifted to about 1,200 nm.

BRIEF DESCRIPTION OF DRAWINGS

FIG. 1 is a view for explaining the first invention of a display device according to the present invention.

FIGS. 2A–2B are views for explaining a display principle according to the present invention.

FIG. 3 is a view for explaining the second embodiment of the display device according to the present invention.

FIG. 4 is a view for explaining the third embodiment of the display device according to the present invention.

FIG. 5 is a view for explaining the fourth embodiment of the display device according to the present invention.

FIG. 6 is a view for explaining the fifth embodiment of the display device according to the present invention.

FIG. 17 is a view for explaining the relationship between the direction of cell thickness and the refraction factor of a liquid crystal in the fourteenth to twenty-first embodiments of the display device according to the present invention by using an applied voltage as a parameter.

FIG. 19 is a view for explaining the display device according to the fourteenth embodiment of the present invention, in which

FIG. 23 is a view for explaining the display device according to the fifteenth embodiment of the present invention, in which

FIG. 27 is a view for explaining the display device according to the sixteenth embodiment of the present invention, in which

FIG. 31 is a view for explaining the display device according to the seventeenth embodiment of the present invention, in which

FIG. 35 is a view for explaining the display device according to the eighteenth embodiment of the present invention, in which

FIG. 39 is a view for explaining the display device according to the nineteenth embodiment of the present invention, in which

FIG. 43 is a view for explaining the display device according to the twentieth embodiment of the present invention, in which

BEST MODE FOR CARRYING OUT THE INVENTION

Figure 7:
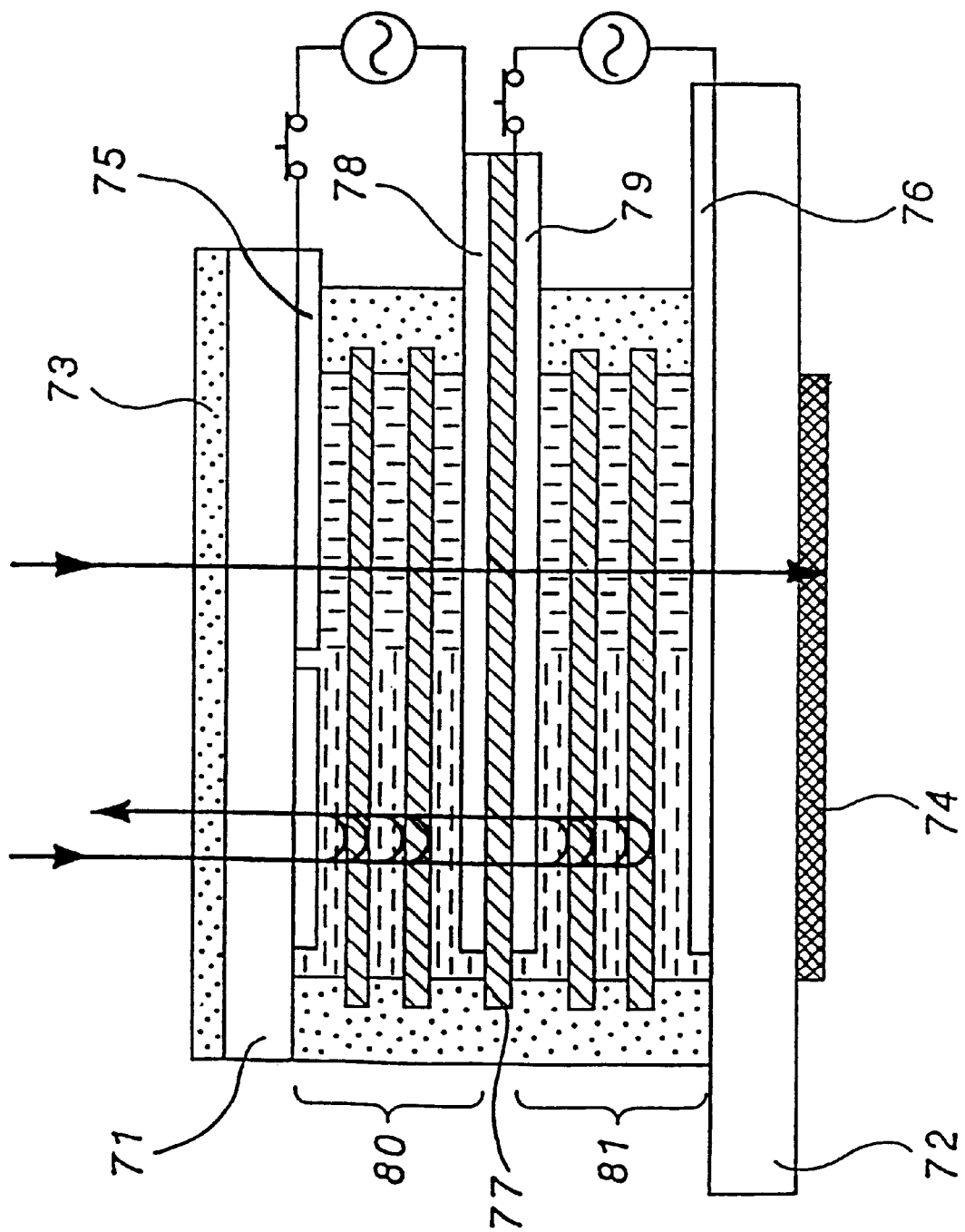
FIG. 7 is a view for explaining the sixth embodiment of the display device according to the present invention.

Embodiments of the present invention will be described below with reference to the accompanying drawings.

(First Embodiment)

FIG. 1 is a view showing the basic structure of a display device according to the present invention and a display principle of the display device. That is, FIG. 1 is a view showing the basic structure of a light modulation element for controlling reflection/transmission. Reference numerals 1 and 2 denote upper and lower substrates constituted by transparent plastic plates, transparent plastic films, or transparent glass plates, and 3 and 4 denote transparent electrode layers which are formed on the upper and lower substrates 1 and 2, respectively, and consist of an indium oxide, a tin oxide, or a mixture thereof. Reference numerals 8, 9, 10, and 11 denote liquid crystal layers, and 5, 6, and 7 denote plastic films (to be referred to as films hereinafter). The liquid crystal layers 8, 9, 10, and 11 and the plastic films 5, 6, and 7 are alternately laminated to constitute a composite multi-layer film 18. Reference numeral 12 denotes a peripheral sealing member 12 for adhering to fix adhesively fixing the upper and lower substrates 1 and 2. The elements described above basically constitute the display device according to the present invention. In this embodiment, a nematic liquid crystal having positive dielectric anisotropy is used in the liquid crystal layers 8, 9, 10, and 11, and the major axis of the liquid crystal molecules is aligned in almost parallel to the surfaces of the plastic films 5, 6, and 7.

FIGS. 2(a) and 2(b) are views showing the display principle of the present invention, and show the plastic films 5, 6, and 7 and the liquid crystal layers 8, 9, 10, and 11 which are extracted from the display device. Therefore, the films and liquid crystal layers shown in FIG. 1 correspond to the reference numerals in FIG. 2. FIG. 2(a) is a view showing a state of a region indicated by 13 in FIG. 1, i.e., a region where no voltage is applied across the upper and lower electrodes 3 and 4. (More specifically, FIG. 2(a) may show a region in a state wherein a voltage equal to or lower than the threshold voltage of the liquid crystal is applied. This state may be regarded as a no-voltage applied state in each of the following examples and each of the following embodiments.) Here, the liquid crystal molecules are aligned in almost horizontal with respect to the film surface, and the refraction factor of the liquid crystal layer in the major axis direction of liquid crystal molecules is $n_{LC1}$. FIG. 2(b) is a view showing a state of a region indicated by 14 in FIG. 1, i.e., a region where a voltage is applied across the upper and lower electrodes 3 and 4. (More specifically, FIG. 2(b) may show a region in a state wherein a saturated voltage of the liquid crystal is applied. This state may regarded as a voltage applied state in each of the following examples and each of the following embodiments.) Here, the liquid crystal molecules are aligned in almost perpendicular to the film surface, and the refraction factor of the liquid crystal layer is $n_{LC2}$ in the minor axis direction of liquid crystal molecules. According to the general properties of a nematic liquid crystal, the refraction factor of a liquid crystal layer changes depending on the presence/absence of voltage application, and the following condition is satisfied:

$$n_{LC1} > n_{LC2} \qquad (1)$$

For this reason, a liquid crystal material and a film material are selected to satisfy equation (2):

$n_{LC2} \approx n_F$ ($n_F$ is the refraction factor of film) . . . (2), and these materials are used in the liquid crystal layers 8, 9, 10, and 11 and the plastic films 5, 6, and 7. In this case, as shown in FIG. 2(b), there is no refraction factor difference on the boundary between the liquid crystal layer and the film in the voltage applied region 14, and incident light 16 is transmitted through the liquid crystal layers and the films without being refracted.

Actually, as described above, the liquid crystal molecules are not aligned in a direction perpendicular to the film surface in all the liquid crystal layer, the liquid crystal molecules being close to the film surface are aligned to have a direction component horizontal with respect to the film surface. Therefore, at this time, the average refraction factor in each liquid crystal layer is not $n_{LC2}$, but a larger refraction factor $<<n_{LC2}>> (<<n_{LC2}>>>n_{LC2})$. In this case, when the refraction factor $n_F$ of the film is set to $<<n_{LC2}>>$, i.e., when $$<<n_{LC2}>>=n_F \qquad (2)'$$

the incident light 16 is transmitted through the liquid crystal layers and the films with the highest intensity.

More preferably, slight birefringence (The refraction factor in the X-axis direction is represented by $n_{F1}$, and the refraction factor in the Y-axis direction is represented by $n_{F2}$. Here, the X-axis direction is the major axis direction of the liquid crystal molecules adjacent to the film, and the Y-axis direction is the minor axis direction of the liquid crystal moleculars.) is given to the film, and the following equations are satisfied:

$$<<n_{LC2}>>=n_{F1} \qquad (2)''$$

$$n_{LC2}=n_{F2} \qquad (2)'''$$

In this case, most of the incident light 16 is transmitted through the liquid crystal layers and the films except for reflection loss caused by the front and rear surfaces.

In the no-voltage applied region 13, as described in letter 1 (see Applied Optics II written by Tadao Tsuruta, 4-3-3 (II)), the thicknesses of the liquid crystal layers 8, 9, 10, and 11 and the thicknesses of the plastic films 5, 6, and 7 are set to satisfy the following equations (3) and (4):

$n_{LC1} \cdot d_{LC} = (\frac{1}{4}+m/2)\lambda 0$ ($d_{LC}$ denotes the thicknesses of the liquid crystal layers 8, 9, 10, and 11; $\lambda 0$ denote the wavelengths of the incident lights 15 and 16; and m is 0 or an integer) . . . (3), and $n_F \cdot d_F = (\frac{1}{4}+k/2)\lambda 0$ ($d_F$ denotes the thicknesses of the plastic films 5, 6, and 7; and k is 0 or an arbitrary integer) . . . (4).

In this case, as shown in FIGS. 1 and 2(a), the incident light 15 having the wavelength $\lambda 0$ is interference-reflected with the highest intensity.

The intensity of reflected light 17 increases as the number of liquid crystal layers and films increases, in other words, as the number of layers of a composite multi-layer film increases. Although the sum of the number of films and the number of liquid crystal layers drawn in the drawings of this embodiment is 7, the sum of the number of films and the number of liquid crystal layers is preferably 10 or more.

As described above, the nematic liquid crystal material having positive dielectric anisotropy and the film material are selected to satisfy equations (2) and (2)' or equations (2)'' and (2)''', the thickness of the liquid crystal layer and the thickness of the film are combined to satisfy equation (3) and (4), and the liquid crystal layers and the films are laminated such that the total number of liquid crystal layers and films is preferably set to 10 or more. In this case, light modulation element can be performed such that incident light is transmitted in applying a voltage and reflected in applying no voltage. It is understood that the resultant device functions as a display device. In the display device, it is apparent that a bright display device effectively using light without using a polarizing plate which absorbs light can be obtained. In addition, it is apparent that the display device is better than a conventional display device in interference reflection intensity and brightness because the boundary surface between a film and a liquid crystal layer is flat.

In the first embodiment described above, although a nematic liquid crystal material is used as the material of the liquid crystal layer, any material having birefringence, liquid crystal molecules whose direction changes depending on an electric field, and a refraction factor which changes depending on the direction of the liquid crystal molecules may be used as the material of the liquid crystal layer. In addition to a nematic liquid crystal, a material such as a smectic liquid crystal, a chiral smectic liquid crystal, a polymer liquid crystal obtained by connecting nematic liquid crystal molecules or smectic liquid crystal molecules in the form of a polymer chain, or a mixture of the above liquid crystal and the polymer liquid crystal can be used as the material of the liquid crystal layer.

In particular, when a discotic liquid crystal described in letter 2 (see Liquid Crystal, basic edition, co-written by Mitsuji Okano and Shunsuke Kobayashi, Baihukan, 1.3) is used, since this liquid crystal has birefringence having a negative optical uniaxial property, the refraction factor with respect to incident light becomes uniform in a polarizing direction when the liquid crystal molecules are aligned in a direction horizontal with respect to the film surface. For this reason, stronger multi-layer interference reflection can be obtained. In this case, only the discotic liquid crystal itself may be controlled with respect to a molecular direction by an electric field. However, when a liquid crystal obtained by mixing a nematic liquid crystal and a discotic liquid crystal is used, the viscosity also decreases, and the direction of the molecular axis can be easily changed by the electric field.

When this embodiment is used as a reflective display device, a light-absorbing layer may be arranged outside the lower substrate 2. In this case, a display device in which light having the wavelength $\lambda 0$ is displayed in a no-voltage applied region, transmitted light is absorbed by a voltage applied region to obtain a black display, and high contrast can be obtained without a polarizing plate can be realized.

(Second Embodiment)

The second embodiment of the display device according to the present invention will be described below with reference to FIG. 3. Reference numerals 31 and 32 denote upper and lower substrates which have transparent electrode films 33 and 34 formed on the opposing surfaces of the upper and lower substrates 31 and 32, respectively. Reference numerals 23, 24, 25, and 26 denote liquid crystal layers, and reference numerals 27, 28, and 29 denotes films. As shown in FIG. 3, the liquid crystal layers and the films have a structure in which the liquid crystal layers are alternately laminated on the films, and forms a composite multi-layer film 30 as a whole. Reference numeral 35 denotes a peripheral sealing member, consisting of an epoxy resin or the like, for fixing the upper and lower substrates to each other. In this embodiment, a nematic liquid crystal material having positive dielectric anisotropy is used in the liquid crystal layers 23, 24, 25, and 26 and aligned in a direction almost horizontal with respect to each film surface.

The birefringence factors of the nematic liquid crystal material is represented by $n_{LC1}'$ (major axis direction of liquid crystal molecules) and $n_{LC2}'$ (minor axis direction of liquid crystal molecules). These factors are set to satisfy $n_{LC1}' > n_{LC2}'$. The films 27, 28, and 29 are films having uniaxial birefringence, and the refraction factors of the films 27, 28, and 29 are set as follows. That is, when a refraction factor in the X-axis direction is represented by $n_{F1}'$, and a refraction factor in the Y-axis direction is represented by $n_{F2}'$, $n_{F1}' > n_{F2}'$. It is generally known that, when a film is subjected to a drawing process, many film materials exhibit uniaxial birefringence in which an optical axis refraction factor in the drawing direction is large, and an optical axis refraction factor in a direction perpendicular to the drawing direction is small. In this case, the drawing direction serves as the X axis, and the direction perpendicular to the X axis serves as the Y axis. The nematic liquid crystal molecules are aligned in a direction horizontal with respect to the surfaces of the films 27, 28, and 29, and the major axis direction of the molecules is parallel to the X-axis direction of the film.

In this embodiment, conditions are set such that incident light 36 having a wavelength λ0 is transmitted through a no-voltage applied region 40. More specifically, a liquid crystal material and a film material are selected such that the following equations are satisfied with respect to the wavelength λ0:

$$n_{LC1}' \approx n_{F1}' \quad (5)$$

$$n_{LC2}' \approx n_{F2}' \quad (5)'$$

In order to cause incident light 37 having the wavelength λ0 to interference-reflected by a voltage applied portion with the highest intensity, the thickness ($d_{LC}'$) of each liquid crystal layer and the thickness ($d_F'$) of each film are set according to the letter 1 to satisfy the following conditions:

$$n_{LC2}' \cdot d_{LC}' \approx (\tfrac{1}{4}+m/2)\lambda 0 \quad (6)$$

$$n_{F1}' \cdot d_F' \approx (\tfrac{1}{4}+k/2)\lambda 0 \quad (6)'$$

($d_{LC}'$ and $d_F'$ are the thicknesses of the liquid crystal layers 23, 24, 25, and 26 and the films 27, 28, and 29, respectively; and k and m are 0 or arbitrary integers). In this case, the no-voltage applied region 40 transmits the incident light 36 having the wavelength λ0, and a voltage applied region 39 reflects the incident light 37 to generate reflected light 38.

As described above, in this embodiment, in order to increase the intensity of reflected light to obtain a bright display device, the number of liquid crystal layers and films of the composite multi-layer film 30 is preferably set to at least 10 or more. As described above, in this embodiment, in the display device for reflecting incident light in applying a voltage and transmitting incident light in applying no voltage, a pattern display reversed to the pattern display in the first embodiment can be obtained.

When this embodiment is used as a reflective display device, a light-absorbing layer may be arranged outside the upper and lower substrate 32. In this case, transmitted light is absorbed in the no-voltage applied region to obtain a black display, and light having the wavelength λ0 is displayed in the voltage applied region. As a result, a display device which can obtain high contrast without a polarizing plate can be realized.

(Third Embodiment)

FIG. 4 shows the third embodiment of the present invention. Reference numerals 41 and 42 denote upper and lower substrates; 43 and 44, transparent electrodes formed on opposing surfaces of the upper and lower substrates 41 and 42, respectively; and 45, a peripheral sealing member, consisting of an epoxy resin or the like, for fixing the upper and lower substrates. Reference numerals 46, 47, 48, and 49 denote liquid crystal layers. The liquid crystal layers 46, 47, 48, and 49 and films 50, 51, and 52 are alternately laminated to form a composite multi-layer film 57. In this embodiment, a nematic liquid crystal material is used in the liquid crystal layers 46, 47, 48, and 49, the molecular alignment of the nematic liquid crystal material is set such that the major axis of the liquid crystal molecules is aligned in a direction almost perpendicular (homeotropic alignment) to the surfaces of the upper and lower substrates 41 and 42 and the films 50, 51, and 52. When a liquid crystal material having negative dielectric anisotropy is selected as the nematic liquid crystal, in a voltage applied region 54 in which a saturated voltage is applied across the upper and lower electrodes 43 and 44, the liquid crystal molecules are aligned in a direction almost horizontal with respect to the surfaces of the upper and lower substrates 41 and 42 and the films 50, 51, and 52. It is assumed that the refraction factor of the nematic liquid crystal material in the major axis direction of the molecules is represented by $n_{LC1}''$, and that the refraction factor in the minor axis direction is represented by $n_{LC2}''$. In this case, the refraction factors are set to satisfy $n_{LC1}'' > n_{LC2}''$. It is assumed that the materials of the liquid crystal layers 46, 47, 48, and 49 and the material of the films 50, 51, and 52 are selected to satisfy the following equation (7), with respect to the wavelength λ0 of incident lights 55 and 56, $$n_{LC2}'' \approx n_{F1}'' \approx n_{F2}'' \quad (7)$$

($n_{F1}''$ and $n_{F2}''$ are refraction factors of the films 50, 51, and 52 in the X- and Y-axis directions). In this case, in a no-voltage applied region (more specifically, a region in which a voltage lower than the threshold voltage of the liquid crystal is applied) 53, there is no difference between the refraction factors on the boundary surfaces of the films and the liquid crystal layers, and thus incident light 55 having the wavelength λ0 is almost transmitted.

In this embodiment, as described above, it is effective for obtaining transmitted light having the highest intensity that an average refraction factor $<<n_{LC2}''>>$ in each of the liquid crystal layers 46, 47, 48, and 49 with respect to the incident light 55 is made equal to the refraction factor of the film.

In addition, when the thickness of the liquid crystal layer and the thickness of the film are set to satisfy the following equations (8) and (8)' with respect to the incident light having the wavelength λ0:

$$n_{LC1}'' \cdot d_{LC}'' \approx (\tfrac{1}{4}+m/2)\lambda 0 \quad (8)$$

$$n_{F1}'' \cdot d_F'' \approx (\tfrac{1}{4}+k/2)\lambda 0 \quad (8)'$$

($d_{LC}''$ and $d_F''$ are the thicknesses of the liquid crystal layers 46, 47, 48, and 49 and the films 50, 51, and 52, respectively; and k and m are 0 or arbitrary integers).

The incident light 56 having the wavelength λ0 is interference-reflected by the composite multi-layer film 57 in the voltage applied region 54 with higher intensity. In this manner, switching of reflection/transmission of incident light can be performed depending on the presence/absence of voltage application, and it is understood that the resultant device functions as a display device.

When this embodiment is used as a reflective display device, a light-absorbing layer may be arranged outside the upper and lower substrate 42. In this case, transmitted light is absorbed in the no-voltage applied region to obtain a black display, light having the wavelength λ0 is displayed in the voltage applied region. As a result, a display device which can obtain high contrast without a polarizing plate can be realized.

Although three embodiments have been described above, a bright display device in which the wavelength range of the interference reflection wavelength (λ0) is increased in width is desirably used as a display device.

In order to obtain white reflected light which is most desirable, composite multi-layer films which satisfy the above interference reflection conditions in the wavelength ranges of red, green, blue and the like may be prepared, and a laminated composite multi-layer film obtained by laminating the above composite multi-layer films may be used. When the thicknesses of the liquid crystal layers and the films are continuously changed, and a composite multi-layer film preferably constituted by 100 or more layers is used, a bright display device can be realized. In addition, especially, a discotic liquid crystal is used in place of the nematic liquid crystal used in the above embodiment, the refraction factor of light is kept almost uniform (refraction factor is almost uniform with respect to polarized lights of incident light). For this reason, a bright display device having higher reflectance can be obtained. In the equations (2), (2)', (5), (5)', and (7), one refraction factor of a liquid crystal layer and the refraction factor of the film are made equal to each other with respect to the wavelength λ0, so that the liquid crystal layer and the film transmit incident light. However, the refraction factors are preferably realized to satisfy the equations described above throughout the visible wavelength range. For this purpose, it is important for selection of materials that the wavelength dispersion of the refraction factor of the film material and the wavelength dispersion of the refraction factor of the liquid crystal material are made as equal to each other as possible. However, in general, the wavelength dispersions of the liquid crystal and the film are difficult to be made equal to each other. In this case, the following method is realistic. That is, the film material is fixed, the refraction factor of the liquid crystal material is adjusted by a component mixing ratio to satisfy equations (2), (2)', (5), (5)', and (7) for each interference reflection wavelength.

(Fourth Embodiment)

The fourth embodiment of a bright reflective display device according to the present invention will be described below with reference to FIG. 5. Reference numerals 148, 149, 150, and 151 denote liquid crystal layers, and reference numerals 145, 146, and 147 denote film layers. The liquid crystal layers and the film layers are alternately laminated to form a composite multi-layer film 159. In the composite multi-layer film 159, the refraction factors and thicknesses of the liquid crystal layers 148, 149, 150, and 151 and the film layers 145, 146, and 147 are set to almost satisfy the equations (1), (2), (2)', (3), and (4) as described in the first embodiment. Reference numeral 152 denotes a light-diffusing portion constituted by a light-diffusing layer or a light-diffusing plate formed on the upper portion the upper substrate 142. Reference numeral 153 denotes a light-absorbing portion constituted by a light-absorbing layer or a light-absorbing plate formed on the lower portion of the lower substrate 141. The operation of this embodiment is as follows. That is, light 156 being incident on a no-voltage applied region 154 is interference-reflected as described in the first embodiment, the reflected light is diffused by the light-diffusing portion 152 into diffused light 158, and the diffused light 158 is emitted outside the device. Therefore, the obtained light is not reflected light obtained from a mirror surface, but diffused reflected light such as reflected light obtained from a paper surface, which can be easily seen. On the other hand, in a voltage applied region 155, incident light 157 is directly transmitted, as described in the first embodiment, and reachs the light-absorbing portion 153 to be absorbed by the light-absorbing portion 153. For this reason, the color of the light-absorbing portion 153 is observed in the voltage applied region 155.

In this embodiment, the thicknesses of the liquid crystal layers 148, 149, 150, and 151 are made equal to each other, and the thicknesses of the film layers 145, 146, and 147 are made equal to each other. For this reason, transmission/reflection cannot be controlled by a voltage with respect to only light having the limited wavelength λ0. However, in order to satisfy the above interference reflection conditions throughout the visible wavelength range, the following method may be used. That is, the composite multi-layer film of the above embodiment is arranged to satisfy the respective interference reflection conditions for each of respective narrow wavelength ranges (λ0, λ1, λ2, . . . , λn) constituting the wide visible wavelength range, and n composite multi-layer films having different wavelengths which causes interference reflection are laminated. The combination of the thicknesses of the liquid crystal layers and the thicknesses of the films is changed depending on the progress direction of light, and the total number of layers is increased. More specifically, as described above, composite multi-layer films which satisfy the interference reflection conditions in the wavelength ranges of red, green, blue, and the like are prepared, and a laminated composite multi-layer film obtained by laminating these composite multi-layer films is used as the composite multi-layer film 159. In this way, a black display can be obtained on a white background (or a white display on a black background). In this case, as a matter of course, the light-absorbing portion 153 must be black.

According to the fourth embodiment, when a plurality of composite multi-layer films which satisfy interference reflection conditions corresponding to the wavelength ranges of visible light are used, the reflective display device which can achieve high interference reflection intensity and a bright white/black display appearance because no light is absorbed by a polarizing plate unlike a conventional display device and because the boundary surface between the liquid crystal layer and the film layer is flat unlike the display devices described in prior arts 1 and 2. In addition, the above laminated composite multi-layer film obtained by laminating a plurality of composite multi-layer films having different interference pitches can be easily obtained by the method described above.

(Fifth Embodiment)

FIG. 6 shows the fifth embodiment and an example wherein characters and graphics having many colors such as black, red, and blue are displayed on a white white background.

Reference numerals 61 and 62 denote the upper and lower substrates having transparent electrodes formed on the inner surfaces, and reference numeral 63 denotes a composite multi-layer film obtained by alternately laminating liquid crystal layers and film layers. As described in the fourth embodiment, the combination of the thicknesses of the liquid crystal layers and the films are made different from each other in the vertical direction of the composite multi-layer film 63, and are set to satisfy the interference reflection conditions with respect to lights having wavelengths in the entire visible region. The composite multi-layer film 63 almost satisfy equations (1), (2), (2)', (3) and (4) described in the first embodiment. In FIG. 6, only seven layers are drawn as the liquid crystal layers and the film layers all together for a lack of space on the drawing. However, in order to perform sufficient interference reflection throughout the visible wavelength range, composite multi-layer films which respectively interference-reflects a plurality of wavelengths within the visible region are arranged for the wavelengths to be reflected, and the composite multi-layer films are laminated. Therefore, the sum of the number of liquid crystal layers and the number of film layers is preferably set to at least 100 or more. Reference numerals 64, 65, and 66 denote light-absorbing portions which are constituted by light-absorbing layers or light-absorbing plates having different colors, i.e., black, red, and green. The members 64, 65, and 66 may be black, red, and green filters, and a reflecting layer 68 may be arranged under these filters. Reference numeral 67 denotes a light-diffusing portion. In this embodiment, in a no-voltage applied region, the composite multi-layer film 63 interference-reflects light having a visible wavelength range to exhibits almost white W. On the other hand, in a voltage applied region, incident light is directly transmitted and absorbed by the light-absorbing portions (filter portions) 64, 65, and 66 having different colors and arranged under the composite multi-layer film 63. Light of a wavelength range transmitted through the filter portions and reflected by the reflecting layer 68 appears as displays having different colors (in FIG. 6, red light and green light are reflected). Since the black light-absorbing portion 64 absorbs light transmitted through the composite multi-layer film, a black display is obtained in this portion in applying a voltage. Therefore, black, red, and green images are displayed on a white white background on the same display surface, and graphics/characters can be displayed. In addition, when the light-absorbing portions 64, 65, and 66 are replaced with red, blue, and green light-absorbing portions every pixel, it is apparent that a full-color reflective display device can be realized.

The light-absorbing portions may be arranged as red, blue, and green color filters inside the lower substrate. In this case, the reflecting layer may be arranged such that the electrode of the lower substrate 62 is formed as a reflecting electrode, and the reflecting layer may be arranged outside the lower substrate.

(Sixth Embodiment)

FIG. 7 shows the sixth embodiment of the present invention. Reference numerals 71 and 72 denote upper and lower substrates having transparent electrodes formed on the inner surfaces; 74, a light-absorbing portion; and 73, a light-diffusing portion. Reference numerals 80 and 81 denote composite multi-layer films obtained by alternately laminating liquid crystal layers and film layers. As described above, the refraction factors and thicknesses of the liquid crystal layers and the film layers are set to satisfy the interference reflection conditions in a desired wavelength range in applying no voltage. Reference numeral 77 denotes a film layer. This film layer may consist of the same material as that of the films constituting the composite multi-layer films 80 and 81 or of a different material, or may have a thickness which is equal to or different from the thickness of the films constituting the composite multi-layer films 80 and 81. Transparent electrode layers 78 and 79 are formed on the upper and lower surfaces of the film layer 77. In this manner, voltages can be independently applied to the two upper and lower composite multi-layer films 80 and 81. For this reason, a drive voltage can be reduced to about half. In the above case, one film layer 77 having a transparent electrode layer is sandwiched as an intermediate portion. However, when a plurality of film layers 77 are sandwiched, the drive voltage can be more reduced, and it is apparent that the display can be driven by a semiconductor IC drive having low voltage resistance. Referring to FIG. 7, the arrangement connected to the electrodes 75 and 78 and the arrangement connected to the electrodes 76 and 79 indicate drive circuits (these arrangements are the same as in the following embodiments). The two drive circuits may independently drive two composite multi-layer films. When the composite multi-layer films are independently driven, reflection intensity can be controlled in two steps. The number of composite multi-layer films which are independently driven may be larger than two. In this case, the reflection intensity can be controlled in many levels, and grayshade can be performed. As in this embodiment, the arrangement in which an intermediate film having an electrode is interposed between the composite multi-layer films can be combined with all the embodiments described above.

As described above, according to the present invention, since a film layer is used as one of display function member, an electrode layer can be easily inserted into the intermediate portion, and the display device can be driven by a low voltage. In addition, as described in the following embodiments, a reflective color display device can be easily realized.

(Seventh Embodiment)

Figure 8:
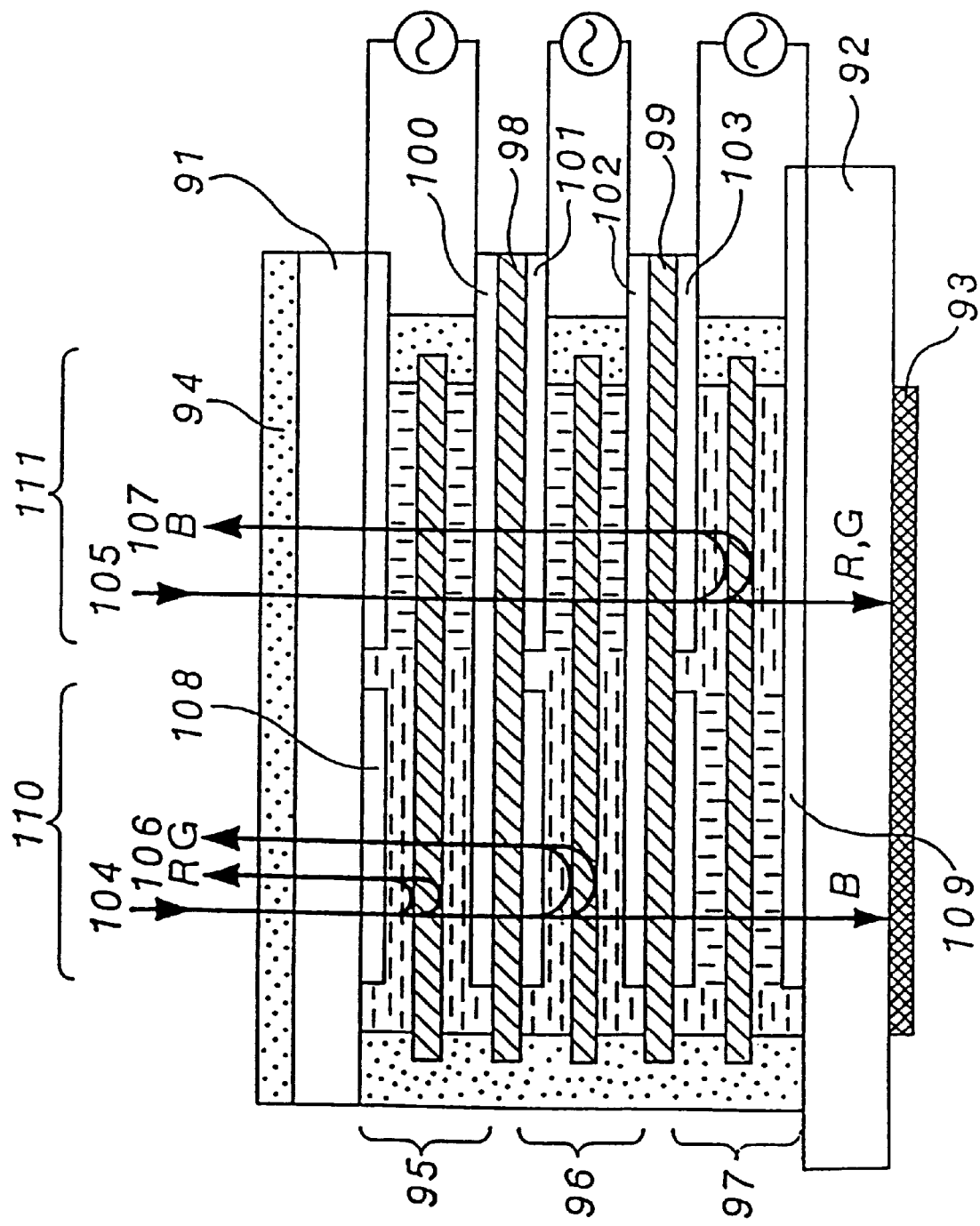
FIG. 8 is a view for explaining the seventh embodiment of the display device according to the present invention.

FIG. 8 shows the seventh embodiment according to the present invention and a concrete example of a bright reflective color display device. Reference numerals 91 and 92 denote upper and lower substrates which have transparent electrode films 108 and 109 formed on the opposing surfaces of the upper and lower substrates 91 and 92, respectively. Reference numeral 93 denotes a black light-absorbing portion 93, and reference numeral 94 denotes a light-diffusing portion. Reference numeral 95 denotes a composite multi-layer film constituted by a composite multi-layer film constituted by liquid crystal layers and film layers as described above. The refraction factors and thicknesses of the liquid crystal layers and the film layers are set according to the method described above such that the liquid crystal layers and the film layers selectively interference-reflect red light in applying no voltage and transmit red light in applying a voltage. In FIG. 8, the composite multi-layer film 95 is shown as a three-layer structure. Actually, the composite multi-layer film 95 constituted by 10 or more layers is preferably used to obtain preferable interference reflection. Similarly, in composite multi-layer films 96 and 97, the refraction factors and thicknesses of the liquid crystal layers and the film layers are set such that the liquid crystal layers and the film layers selectively interference-reflect green and blue lights in applying no voltage and transmits these lights in applying a voltage. Reference numerals 98 and 99 denote intermediate film substrates which have transparent electrodes 100 and 101 and transparent electrodes 102 and 103 formed on the upper and lower surfaces of the intermediate film substrates 98 and 99, respectively. In this embodiment, as described above, a laminated composite multi-layer film constituted by three composite multi-layer films, i.e., the red light selective reflecting layer 95, the green light selective reflecting layer 96, and the blue light selective reflecting layer 97 is arranged, and the intermediate film substrates 98 and 99 are inserted between the composite multi-layer films of respective colors. In this case, voltages can be independently applied to the composite multi-layer films 95, 96, and 97, and red, green, and blue displays can be freely controlled. As shown in FIG. 8, since no voltage is applied to the red light selective reflecting layer 95 and the green light selective reflecting layer 96 in a display region 110, the red light selective reflecting layer 95 and the green light selective reflecting layer 96 interference-reflect color lights, respectively. Since a voltage is applied to the blue light selective reflecting layer 97, blue light is directly transmitted through the blue light selective reflecting layer 97 to be absorbed by the black light-absorbing portion 93 under the blue light selective reflecting layer 97. Therefore, red and green lights are reflected, and yellow light is obtained as reflected light 106. On the other hand, in a display region 111, voltages are applied to the red light selective reflecting layer 95 and the green light selective reflecting layer 96, and red and green lights are transmitted through the red light selective reflecting layer 95 and the green light selective reflecting layer 96, respectively, and absorbed by the black light-absorbing portion 93. Blue light is interference-reflected by the blue light selective reflecting layer 97 in applying no voltage. For this reason, the display region 111 exhibits blue.

As described above, in this embodiment, the red light selective reflecting layer 95 for selectively reflecting red light, the green light selective reflecting layer 96 for selectively reflecting green light, and the blue light selective reflecting layer 97 for selectively reflecting blue light are laminated, and the intermediate film substrates 98 and 99 are arranged to sandwich the respective composite multi-layer films. For this reason, transmission/reflection factors can be independently controlled for respective colors. In this embodiment, a white image can be obtained when no voltage is applied to the three composite multi-layer films 95, 96, and 97. That is, red, blue, and green lights are reflected by the composite multi-layer films to obtain a white image. A black image is obtained when a voltage is applied to the three composite multi-layer films 95, 96, and 97. In this case, incident light is transmitted through the composite multi-layer films and absorbed by the black light-absorbing portion 93 to obtain a black image. Therefore, a bright full-color reflective display device which can freely display a black image on a white background, as a matter of course, a red, blue, or green images, or an image of a mixture of these colors can be realized. In the case described above, although composite multi-layer films corresponding to red, green, and blue are used, a combination such as a combination of cyan, magenta, and yellow can be freely selected, as a matter of course.

(Eighth Embodiment)

Figure 9:
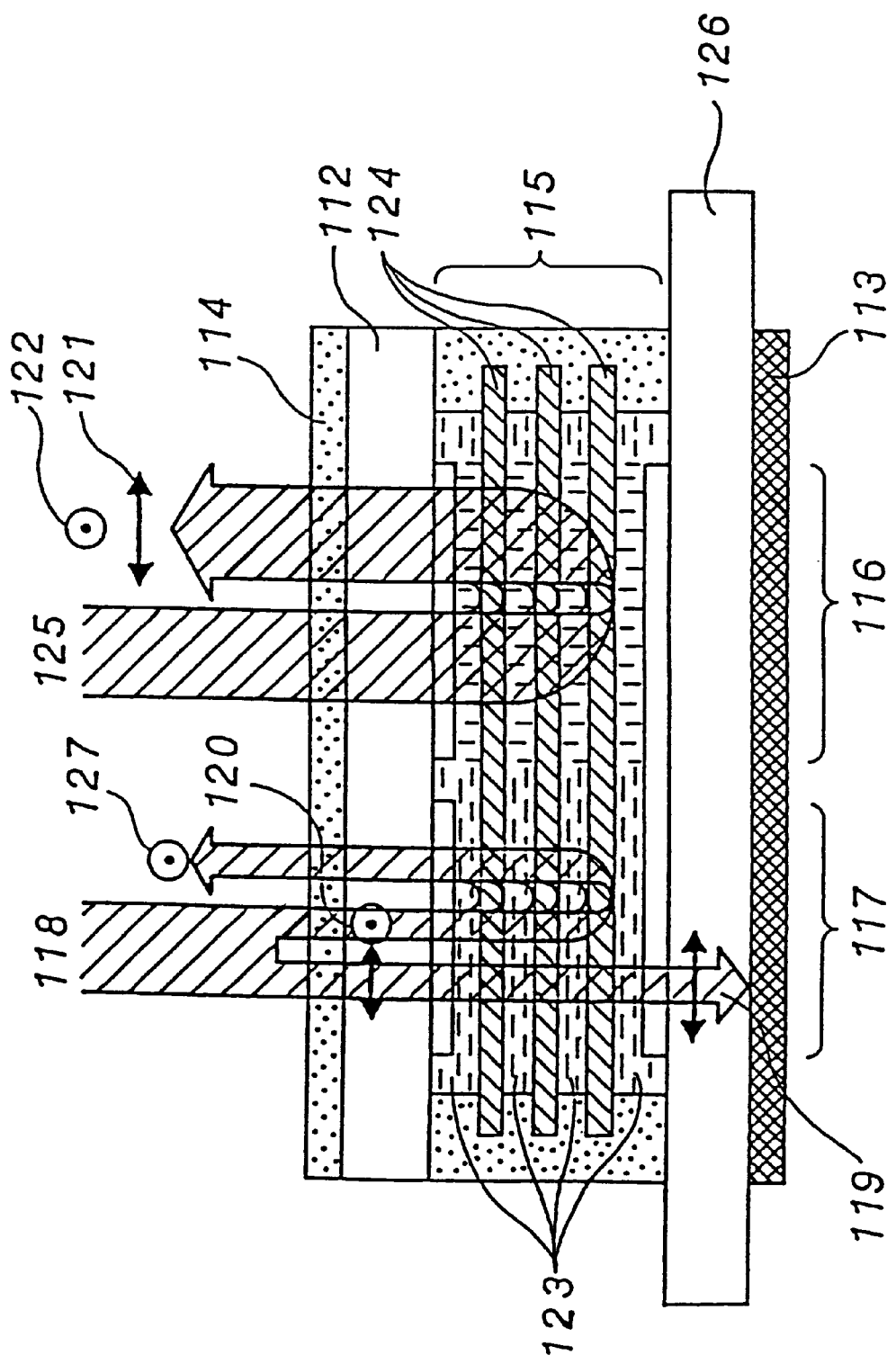
FIG. 9 is a view for explaining the eighth embodiment of the display device according to the present invention.

FIG. 9 shows the eighth embodiment of the present invention. Reference numerals 112 and 126 denote upper and lower substrates having transparent electrodes formed on the inner surfaces; 113, a black light-absorbing portion; 114, a light-diffusing portion; and 115, a composite multi-layer film which is constituted by a structure in which nematic liquid crystal layers 123 and film layers 124 are alternately laminated. Here, as the liquid crystal layer 123, a liquid crystal layer in which, in applying no voltage, the major axis direction of liquid crystal molecules is uniformed, and a molecular axis is uniformed almost horizontal with respect to the surface of the film layer 124 (homogeneous alignment) is used. The described method of aligning the major axis of liquid crystal molecules to be aligned in a direction horizontal with respect to the substrate surface can be achieved by a method which is generally used as a method of manufacturing a liquid crystal display device and obtained by combining a polyimide resin and a rubbing step. However, in this embodiment, as will be described later, when a drawn film is used as the film layer 124, liquid crystal molecules on the film layer are naturally aligned such that the major axis of the liquid crystal molecules is uniformed in the drawing direction. Even if a special aligunient process is not performed, a liquid crystal layer having the above alignment can be realized. In the above nematic liquid crystal layer, a refraction factor in the major axis direction of the liquid crystal molecules is different from a refraction factor in the minor axis direction of the liquid crystal molecules. Now, when the liquid crystal molecules are aligned in a no-voltage applied region 117 such that the major axis of the liquid crystal molecules is parallel to the drawing surface, the refraction factor of the liquid crystal layer with respect to an incident polarized component parallel to the drawing surface is different from the refraction factor of the liquid crystal layer with respect to an incident polarized component perpendicular to the drawing surface. In this embodiment, a liquid crystal material and a film material are selected such that a refraction factor ($n_{LC1}$) in the liquid crystal molecular major axis direction and the refraction factor ($n_F$) of the film are equal to each other. For this reason, a polarized component 119, parallel to the drawing surface, of incident light 118 is transmitted through the composite multi-layer film 115 and absorbed by the light-absorbing portion 113 formed on the lower portion of the display device. On the other hand, the refraction factor $n_{LC2}$ of the nematic liquid crystal layer 123 with respect to a polarized component 120 perpendicular to the drawing surface satisfies ($n_{LC1} > n_{LC2}$), and is different from the refraction factor ($n_F$) of the film layer. Here, when the thickness ($d_F$) of the film layer and the thickness ($d_{LC}$) of the liquid crystal layer are set to satisfy the following equations (9) and (9)':

$$n_F \cdot d_F \approx (\tfrac{1}{4}+k/2)\lambda \qquad (9)$$

$$n_{LC2} \cdot d_{LC} \approx (\tfrac{1}{4}+m/2)\lambda \qquad (9)'$$

($\lambda$ is the wavelength of incident light, and k and m are 0 or arbitrary integers), the composite multi-layer film satisfies the interference reflection conditions with respect to light having the wavelength $\lambda$, and reflects the light as reflected light 127. On the other hand, in a voltage applied region 116, the liquid crystal molecules of the nematic liquid crystal layer 123 are aligned in a direction almost perpendicular to the surface of the film layer 124, and the refraction factor of the film layer 124 when viewed from incident light 125 is ($n_{LC3}$) with respect to all the incident polarization surfaces. According to the general properties of a nematic liquid crystal, the following equation (10) is satisfied:

$$n_{LC3} \approx n_{LC2} \qquad (10)$$

According to equation (9), the incident light 125 having the wavelength $\lambda$ is entirely reflected to obtain reflected lights 121 and 122.

The interference reflection conditions function to light having the wavelength $\lambda$. However, as described above, when a laminated composite multi-layer film obtained by laminating a plurality of composite multi-layer films having different combinations of liquid crystal layer thicknesses and film layer thicknesses is used in place of the composite multi-layer film 115, a bright display device with a white background which has a large interference reflection waveform width and covers the entire visible wavelength range can be realized.

(Ninth Embodiment)

Figure 10:
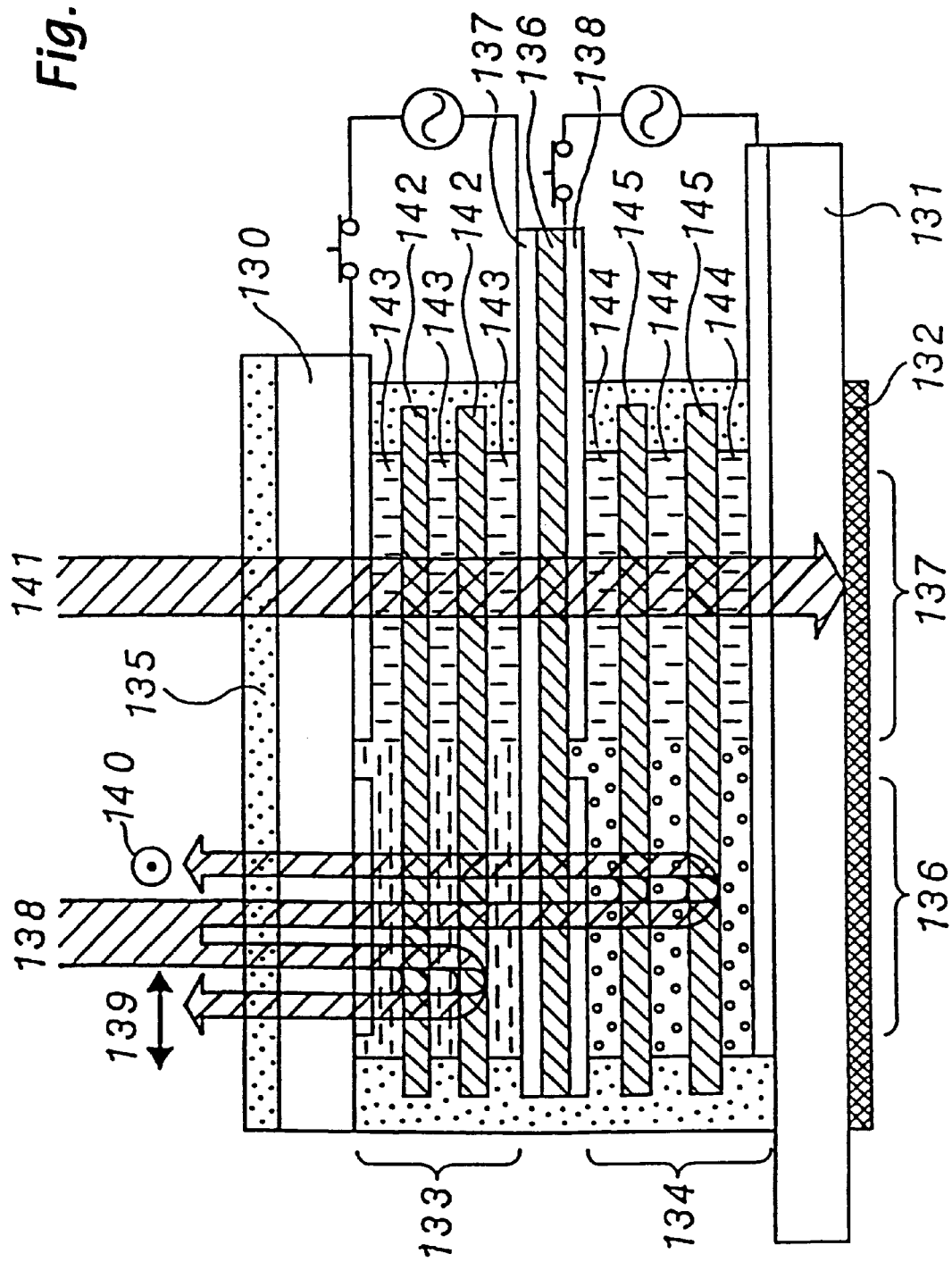
FIG. 10 is a view for explaining the ninth embodiment of the display device according to the present invention.

FIG. 10 shows the ninth embodiment of the present invention. Reference numerals 130 and 131 denote upper and lower substrates having transparent electrodes formed on the inner surfaces; 132, a black light-absorbing portion; and 135, a light-diffusing portion. Reference numeral 133 denotes a composite multi-layer film having a structure in which nematic liquid crystal layers (to be referred to nematic liquid crystal layers in the this embodiment) 143 having positive dielectric anisotropy and film layers 142 are alternately laminated. Reference numeral 134 denotes another composite multi-layer film having a laminated structure obtained by laminating nematic liquid crystal layers 144 and films 145.

In this embodiment, in applying no voltage, the major axis direction of the liquid crystal molecules of the liquid crystal layer 143 is homogeneously aligned to be almost horizontal with respect to the surface of the film 142 and almost parallel to the drawing surface. On the other hand, in the liquid crystal layer 144, in applying no voltage, the major axis direction of the liquid crystal molecules is homogeneously aligned in a direction almost horizontal with respect to the surface of each film 145 but in a direction almost perpendicular to the drawing surface, i.e., a direction almost perpendicular to the liquid crystal molecular major axis of the liquid crystal layer 143.

The nematic liquid crystal layer has birefringence. Now, the refraction factor of the nematic liquid crystal layer with respect to polarized light parallel to the major axis of liquid crystal molecules is represented by $n_{LC1}$, and the liquid crystal with respect to polarized light perpendicular to the major axis is represented by $n_{LC2}$.

In addition, as the refraction factors of the films 142 and 145, the refraction factor in the X-axis direction is represented by $n_{F1}$, and the refraction factor in the Y-axis direction is represented by $n_{F2}$ ($n_{F1} \leq n_{F2}$). Here, the X-axis direction is made almost equal to the major axis direction of the liquid crystal molecules which are homogeneously aligned. When the refraction factors $n_{F1}$ and $n_{F2}$ of the film are set to satisfy the following equations:

$$n_{F2} \approx n_{LC2} \tag{11}$$

$$n_{LC2} \leq n_{F1} > n_{LC1} \tag{11}'$$

incident light 141 is transmitted through the composite multi-layer films 133 and 134.

As described above, liquid crystal molecules are not aligned in a direction perpendicular to the film surface in the entire liquid crystal layer. Liquid crystal molecules adjacent to the film surface are aligned to have a direction component horizontal with respect to the film surface. Therefore, the average refraction factor of the liquid crystal layers at this time is not $n_{LC2}$, but is larger than $n_{LC2}$ and smaller than $n_{LC1}$. Therefore, when the refraction factor $n_{F1}$ of the film in the X-axis direction is made equal to an average refraction factor $<<n_{LC2}>>$ of the liquid crystal layer in the X-axis direction in applying a voltage with respect to the incident light 141, the incident light 141 is transmitted through the liquid crystal layer with the highest intensity.

As reflection conditions in applying no voltage, the refraction factors and thicknesses of the liquid crystal layers 143 and 144 and the refraction factors and thicknesses of the film layers 142 and 145 are set to satisfy equations (11), (11)', (12), and (12)':

$$n_{LC1} \cdot d_{LC} \approx (\tfrac{1}{4} + m/2)\lambda \tag{12}$$

$$n_{F1} \cdot d_F \approx (\tfrac{1}{4} + k/2)\lambda \tag{12}'$$

($d_{LC}$ is the thicknesses of the liquid crystal layers 143 and 144, $d_F$ is the thicknesses of the film layers 142 and 145, $\lambda$ is the wavelengths of incident lights 138 and 141, and k and m are 0 or arbitrary integers).

In this case, according to the above description, as shown in FIG. 10, in no-voltage applied region 136, the polarized component, which is parallel to the drawing surface, of the incident light 138 having the wavelength $\lambda$ is reflected by the composite multi-layer film 133 (reflected light 139). A polarized component, which is perpendicular to the drawing surface, of the incident light 138 is transmitted through the composite multi-layer film 133 because equation (11) is satisfied. The polarized component reaches the composite multi-layer film 134, and is reflected by interference reflection according to equations (12) and (12)' to obtain reflected light 140. Therefore, the incident light 138 having the wavelength $\lambda$ is entirely reflected by a no-voltage applied region 136. Here, as described above, the number of layers of the composite multi-layer films 133 and 134 is increased, and a plurality of composite multi-layer films having different combinations of layer thicknesses are laminated to form a laminated composite multi-layer film. In this case, a reflected light wavelength range can be enlarged, and white reflected light can be obtained.

In a voltage applied region 137, since liquid crystal molecules constituting the liquid crystal layers 143 and 144 consist of a nematic liquid crystal material having positive dielectric anisotropy, the major axis of the liquid crystal molecules is uniformed in the direction perpendicular to the surfaces of the films 142 and 145. Therefore, equations (11) and (11)' are satisfied with respect to all polarized lights, and the incident light 141 is transmitted through the composite multi-layer films 133 and 134 to be absorbed by the black light-absorbing portion 132 formed on the lower portion of the display device. As a matter of course, in order to increase the transmission factor, it is importantly considered that the refraction factors of the liquid crystal layers and the film layers must be adjusted to satisfy equations (11) and (11)' with respect to the entire visible wavelength range.

As described above, according to this embodiment, an almost perfect black display can be displayed on a white white background which diffuses and reflects most of all the polarized lights of incident light (a white white display on a black background can also be displayed). A bright reflective display device which can display an image as if a black image is drawn on a sheet of white paper can be obtained.

Two composite multi-layer films which satisfy the interference reflection conditions with respect to two polarization axes perpendicular and parallel to the drawing surface respectively, described in the ninth embodiment are paired to form a double composite multi-layer film. It is easily understood that, when the double composite multi-layer film is used in place of each of the composite multi-layer films described in the first to seventh embodiment, a display device having higher contrast can be realized.

In FIG. 10, as in the sixth embodiment, a film 136 having upper and lower electrode layers 137 and 138 is inserted into the intermediate portion between the composite multi-layer films 133 and 134 as an intermediate electrode layer, so that a display operation can be performed at a lower voltage.

Although the present invention has been described with reference to the nine embodiments, as a film material used in the present invention, any film material which is transparent and can be shaped into a thin film can be used. For example, the film material can be selected from various resins such as a polyethylene naphthalate resin, a polyester resin, a polycarbonate resin, a cellulose-based resin, and a polyether-sulfone-based resin which have various refraction factors. As the liquid crystal material, as described above, any liquid crystal material such as a nematic liquid crystal, a smectic liquid crystal, a polymer liquid crystal containing these liquid crystal molecules, and a mixture of these liquid crystals whose liquid crystal molecular axis can be changed by applying an electric field to change the refraction factor of the liquid crystal layer can be used. However, as described above, a discotic liquid crystal is preferably used because the discotic liquid crystal has high interference reflection performance when the discotic liquid crystal is aligned in a direction parallel to the layer surface (a mixture of the discotic liquid crystal and the above liquid crystals may be used).

In the nine embodiments described above, the major axis of liquid crystal molecules constituting the liquid crystal layer used in these embodiments is dislocated in an axis direction crossing the horizontal/vertical direction at about 90° depending on the presence/absence of voltage application between the upper and lower substrates. As the absolute value of a difference between refraction factors depending on the presence/absence of a voltage applied to the liquid crystal layer is large, interference reflection performance is high. Even if the number of layers of a composite multi-layer film is small, high display performance can be obtained. However, actually, a molecular axis dislocation of 90°, obtained by the presence/absence of an applied voltage, of all the liquid crystal molecules is ideal. Depending on the applied voltage, it is estimated that the number of cases in which an average dislocation is 80° or less is larger than the number of cases in which a dislocation is 90°. However, according to the spirit and scope of the present invention, when the refraction factors of liquid crystal layers constituting the composite multi-layer film are changed by applying a voltage, even if the molecular axis dislocation is 80° or less, interference reflection intensity can be compensated by increasing the number of layers constituting the composite multi-layer film. For this reason, it is apparent the display performance described in each of the embodiments can be obtained.

With respect to a voltage for display driving, as described above, a plurality of substrates having electrodes are inserted into the intermediate portion of a composite multi-layer film, and voltages are applied to the composite multi-layer films which are consequently divided. In this case, display driving can be performed at a lower voltage. However, as another method, a method of giving slight conductivity to film layers is effectively used as a means for achieving display driving at a lower voltage.

More specifically, when a general film which has no conductivity, a voltage (V) applied to the entire area of the liquid crystal layer is given by the following equation (13):

$$V \approx \{\epsilon_F/(\epsilon_{LC}+\epsilon_F)\} \cdot V0 \qquad (13)$$

$\epsilon_F$: dielectric constant of film $\epsilon_{LC}$: dielectric constant of liquid crystal layer V0: voltage applied across upper and lower electrodes In general, the dielectric constant ($\epsilon_{LC}$) of the liquid crystal layer is 10 to 15, and the dielectric constant of the film layer is 3 to 4. For this reason, the voltage (V) applied to the entire area of the liquid crystal layer is about 0.2 V0 which is ⅕ of V0. Therefore, as described above, when slight conductivity is given to the film layer, V≈V0 can be satisfied, and the voltage applied across the upper and lower electrodes is almost directly applied to the liquid crystal layer. As a method of giving conductivity to the film layer, a conductive plastic such as a polyacetylene-based plastic or a polyparaphenylene-based plastic is mixed with the film to realize the above effect.

The arrangement of the present invention has been described with reference to various embodiments. However, the contents described in the embodiments can be performed such that the contents are appropriately combined to each other in other embodiments, as a matter of course. Concrete methods of manufacturing display devices according to the above embodiments, in particular, a method of manufacturing the composite multi-layer film will be described below.

(Tenth Embodiment)

Figure 11:
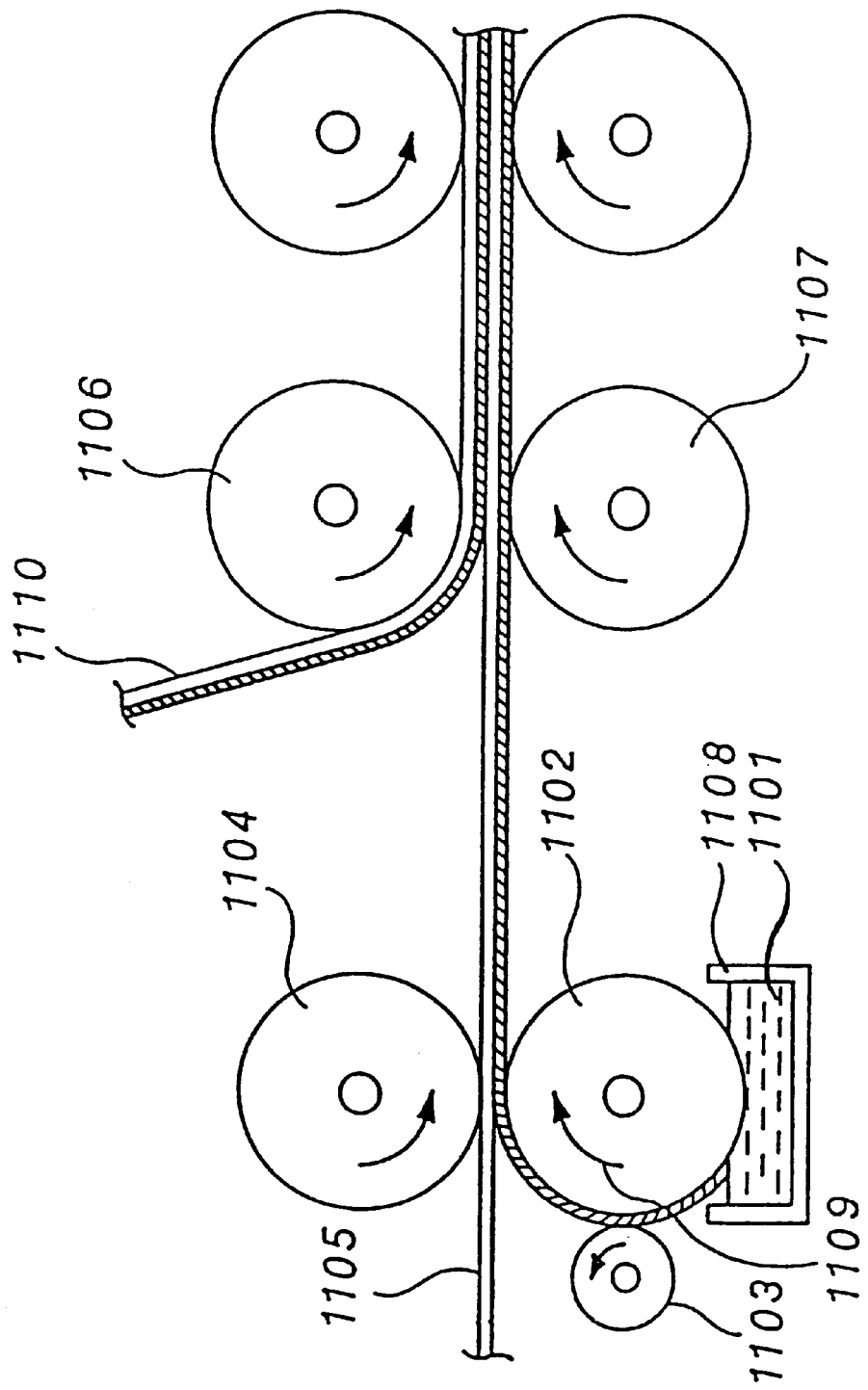
FIG. 11 is a view for explaining a method of manufacturing a composite multi-layer film used in the display device according to the present invention.

FIG. 11 shows the embodiment of a method of manufacturing the composite multi-layer film described above. Reference numeral 1101 denotes a liquid crystal material which is held in a vessel 1108. Reference numeral 1102 denotes a first roller which is rotated in the direction indicated by an arrow 1109. The first roller 1102 winds the liquid crystal material 1101 in the rotating direction while the liquid crystal material 1101 is uniformly coated on the surface of the first roller. Reference numeral 1103 denotes a second roller which is arranged to keep the thickness of the coated liquid crystal layer constant, and is attached as needed. Reference numeral 1105 denotes plastic film (to be referred to a film hereinafter) material serving as a material constituting the composite multi-layer film. At the connection point between the first roller 1102 and a third roller 1104, the liquid crystal material 1101 is uniformly coated on the surface of the plastic film material 1105. The thickness of the liquid crystal layer can be controlled by adjusting the gap between the first roller 1102 and the third roller 1104. As a method of controlling the layer thickness, a method of precisely controlling the viscosity of the liquid crystal material can be used. For this reason, the precise management of the thickness of the liquid crystal layer can be performed by temperature management of the liquid crystal layer or viscosity management performed by the mixture system between the liquid crystal material and a solvent. As a matter of course, when the combination of the liquid crystal material and a solvent is used, the process of removing the solvent must be performed after the liquid crystal layer is coated.

By using a method similar to the above method, a film 1110 on which a liquid crystal layer is coated and the above film 1105 are laminated between a fourth roller 1106 and a fifth roller 1107 to form a composite four-layer film. It is apparent that, when the same operation as described above is repeated, 10 or more composite multi-layer films can be easily manufactured.

The above is an example of a basic manufacturing method. However, as a matter of course, when the thicknesses of the liquid crystal layers are uniformed, and further, when the number of rollers is increased to prevent bubbles from being folded when films are adhered to each other, or when a liquid crystal which is heated by a uniform heat source to decrease the viscosity of the liquid crystal is coated on a film to be adhered to the film by rollers, a composite multi-layer film which is more suitable for the object can be obtained. However, it can be easily understood that the existing process of manufacturing a multi-layer film having high precision is used as a reference.

As the film thicknesses required for the films and the liquid crystal layers constituting the composite multi-layer film in the above embodiment, ¼ of the visible wavelength, i.e., a very small thickness of about 0.1 μm to 0.2 μm is required. For this purpose, a film having a thickness of 0.2 μm or less as shown in FIG. 11 is used. In coating the liquid crystal layer, the liquid crystal layer is coated while the viscosity of the liquid crystal layer is decreased by a high temperature or while the liquid crystal layer is solved in a solvent to have low viscosity, so that a very thin liquid crystal layer can also be obtained. When the method shown in FIG. 12 is used, the composite multi-layer film can be easily obtained.

(Eleventh Embodiment)

Figure 12:
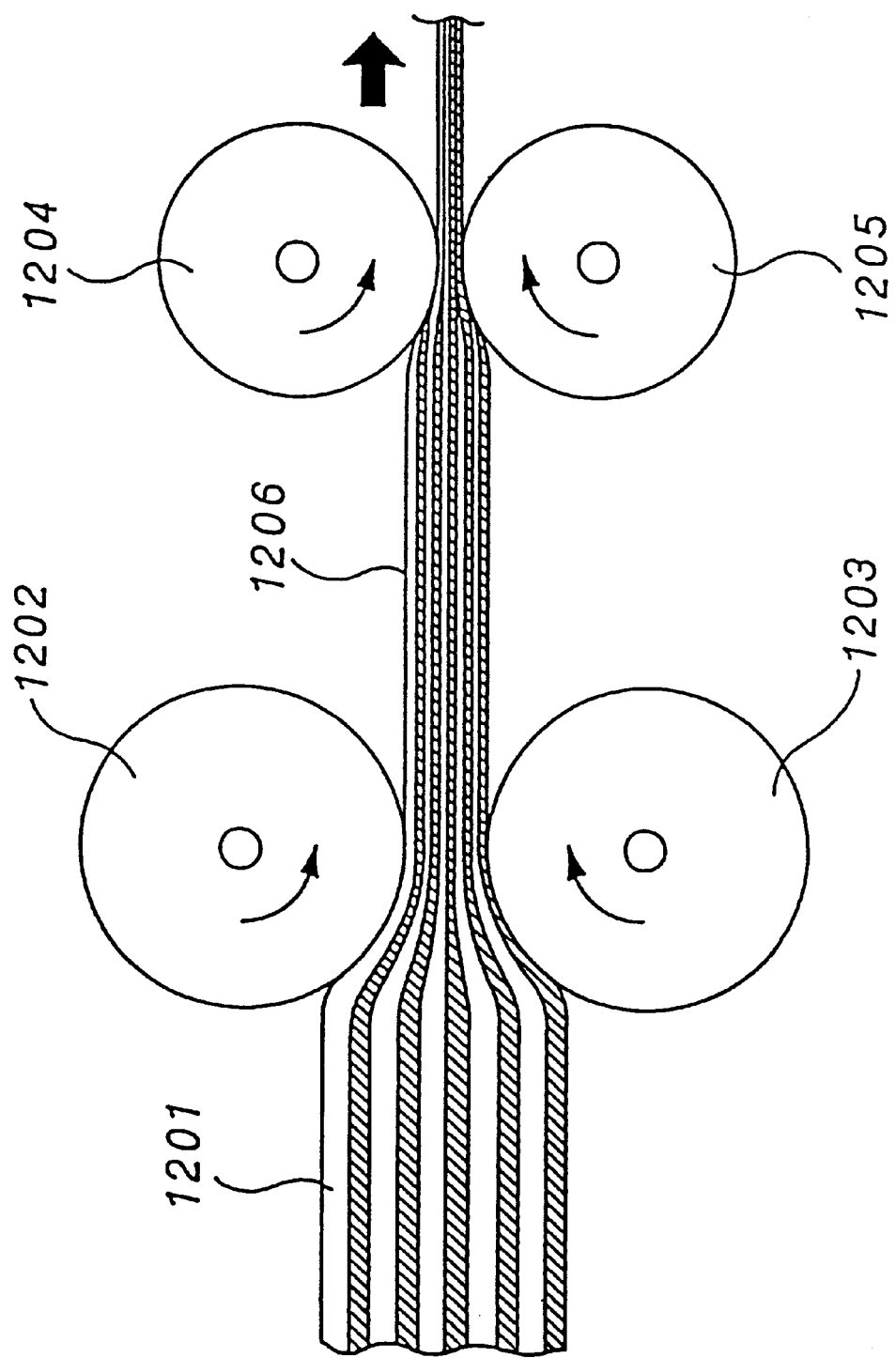
FIG. 12 is a view for explaining another method of manufacturing a composite multi-layer film used in the display device according to the present invention.

FIG. 12 shows another embodiment of a method of manufacturing the composite multi-layer film. Reference numeral 1201 denotes a composite multi-layer film which is formed by the method in FIG. 11 and has a relatively large thickness (e.g., the thicknesses of a film and a single liquid crystal layer are 1 μm or more), and the composite multi-layer film is drawn by first-stage rolling rollers 1202 and 1203. A drawn composite multi-layer film 1206 is drawn by second-stage rolling rollers 1204 and 1205. When the drawing process is performed many times as described above, the liquid crystal layers and films of the composite multi-layer film 1201 gradually decrease in thickness, and a desired thin layer can be easily obtained. The composite multi-layer film formed as described above is cut to have a predetermined size. The resultant structure is sandwiched between the upper and lower substrates 1 and 2 together with a liquid crystal material as shown in FIG. 1, and the peripheral portion of the structure is sealed by an epoxy-based adhesive agent. In this case, a display device having the composite multi-layer film shown in FIG. 1 can be relatively easily completed.

In each of the embodiments of the present invention, when a plastic film (to be referred to as a film hereinafter) on which a liquid crystal layer is coated is used as a unit composite film of the composite multi-layer film, and 10 or more unit composite films are laminated by rollers or the like, the composite multi-layer film can be extremely easily realized. As a result, a reflective display device which has a flat boundary surface between a film and a liquid crystal layer and high interference reflection intensity can be provided.

The thickness of the film can be freely selected, and the thickness of the liquid crystal layer can be relatively easily managed at a high precision by a roll coat method and control of liquid crystal viscosity by a temperature and a solvent or the like in execution of the roll coat method. For this reason, the wavelength range of interference reflection can be easily set. In addition, the composite multi-layer film in which the thicknesses of the film layer and the liquid crystal layer are managed can be easily changed in thickness in units of layers, and can satisfy the interference reflection conditions in a wide wavelength range. A bright reflective display device having arbitrary colors and a white background can be easily realized.

In order to cause the composite multi-layer film to satisfy the interference reflection conditions in the visible wavelength range, as the thicknesses of the film and the liquid crystal layer, a very thin film thickness of 0.2 μm or less is required. However, when the following method is used as a manufacturing method, a composite multi-layer film having a desired thickness can be very easily realized, and precise film thickness control can be performed. That is, a relatively thick (1 μm or more) film is used, a liquid crystal material is coated on the film by the roll coat method or the like, and a large number of films on which the liquid crystal material is coated are laminated by rollers or the like to form a relatively thick composite multi-layer film. Thereafter, the composite multi-layer film is subjected to a drawing process by rolling rollers in many steps. In addition, this drawing process also has a function of uniforming the molecular axis direction of a film polymeric polymer, and this function is also effective for uniforming the alignment direction of the liquid crystal molecules of the liquid crystal layer coated on the film. As a result, a liquid crystal layer which has a uniform liquid crystal molecular major axis and a uniform refraction factor can be obtained. For this reason, the wavelength of interference-reflected light can be easily controlled at a high precision, and a uniform and bright reflective display device can be obtained. As a matter of course, when an alignment material such as polyimide is coated on the film and then dried, and a general rotation brush rubbing method is used in conventional manufacture of a liquid crystal display device, liquid crystal molecules can be uniformly aligned in a desired direction.

Furthermore, since a film is used as one of base materials of the composite multi-layer film, a transparent electrode can also be easily formed on the film. When a film having an electrode layer is inserted into the intermediate portion of the composite multi-layer film, the display device can be driven at a lower voltage. Films each having the electrode layer are sandwiched by blocks of composite multi-layer films which perform selective interference reflection for red, green, blue, or the like to form a plurality of blocks, and the blocks are laminated to be integrated. In this manner, these blocks can independently perform display driving, and a reflective full-color display device can be realized.

The relationship between the number of liquid crystal layers and films which are laminated in a composite multi-layer film and a refraction factor and the like will be described below with reference to the following examples.

(Twelfth Embodiment)

Figure 13A:
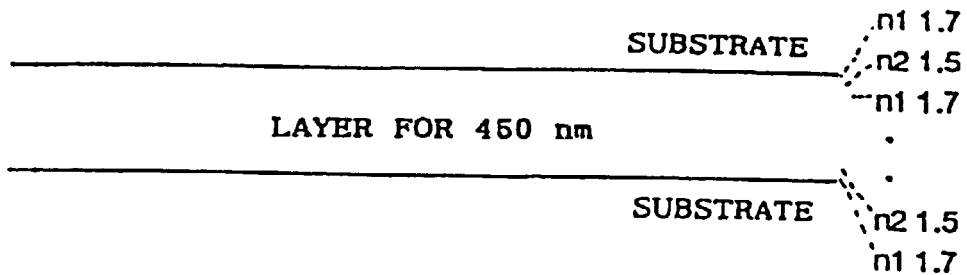
FIGS. 13A–13B are views for explaining the relationship between the number of layers of a composite multi-layer film and an interference reflectance in the fourteenth embodiment of the display device according to the present invention.
Figure 13B:
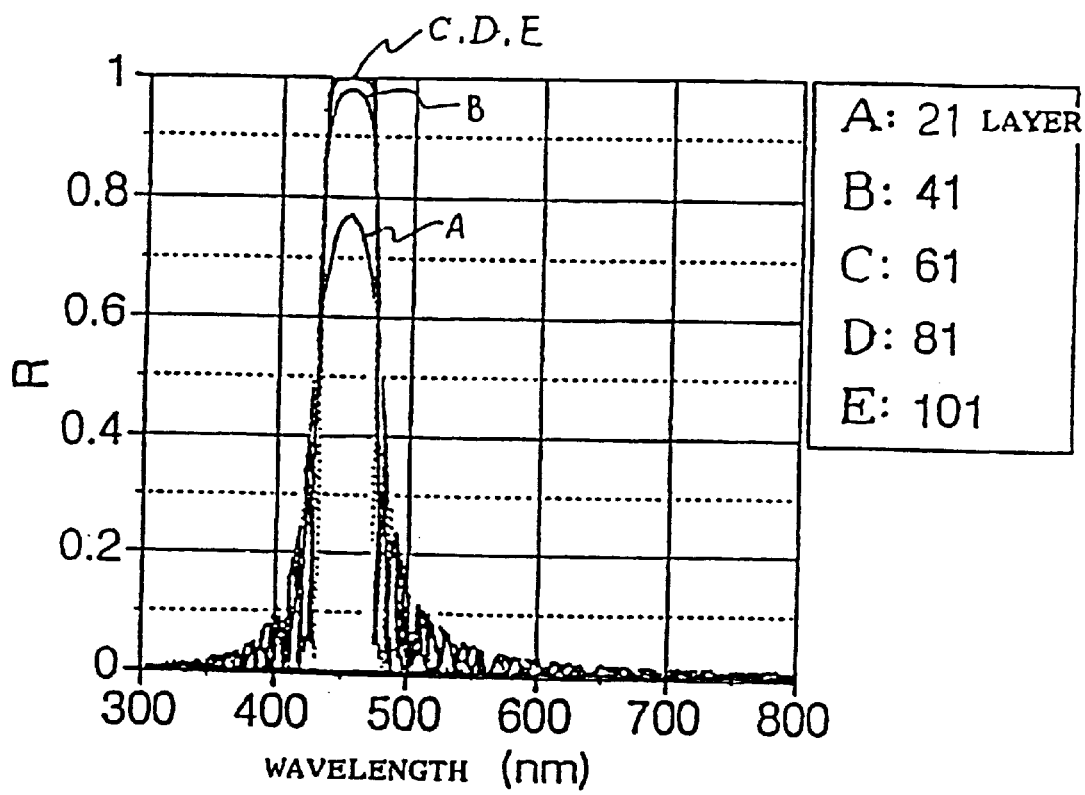

FIG. 13 shows an example of a composite multi-layer film which interference-reflects the wavelength of incident light of 450 nm. FIG. 13(*a*) is a view showing typical laminated layers of a composite multi-layer film, and FIG. 13(*b*) is a graph showing results obtained by measuring an interference reflection factor at approximately 450 nm while the number of laminated layers is changed. A liquid crystal (refraction factor n, in the major axis direction of liquid crystal molecules=1.7, and refraction factor $n_2$ in the minor axis direction=1.5) was used, and a polyethylene resin (refraction factor $n_F$=1.5) was laminated between substrates as a film as shown in FIG. 13(*a*). Alignment of liquid crystal molecules in applying no voltage is set to be almost horizontal with respect to the substrates, and liquid crystal layers whose alignment direction was set to be perpendicular to the drawing surface and liquid crystal layers whose alignment direction was set to be parallel to the drawing surface were arranged such that the numbers of these liquid crystal layers were almost equal to each other. The thicknesses of the liquid crystal layer and the film layer were set to satisfy equations (3) and (4) with respect to a wavelength of 450 nm. In FIG. 13(*b*), the abscissa indicates a wavelength, and the ordinate indicates a refraction factor. Reference symbol A indicates a refraction factor obtained in a case wherein a composite multi-layer film is constituted by liquid crystal layers and film layers such that the number of liquid crystal layers and film layers is 21 (The number of layers is an odd number because liquid crystal layers are arranged on both the sides of the composite multi-layer film and because the number of liquid crystal layers is larger than the number of films by one in the combination of liquid crystal layers and films. The number of layers is each of the number of layers of the composite multi-layer film having liquid crystal layers in which liquid crystal molecules are aligned in the direction perpendicular to the drawing surface and the number of layers of the composite multi-layer film having liquid crystal layers in which liquid crystal molecules are aligned in the direction horizontal with respect to the drawing surface, and the total number of layers is twice the above number of layers.); B, a refraction factor in the case of 41 layers; C, a refraction factor in the case of 61 layers; D, a refraction factor in the case of 81 layers; and E, a refraction factor in the case of 101 layers. In applying no voltage, the liquid crystal molecules of the liquid crystal layer are aligned in a direction parallel to the film surface, and the refraction factor of the liquid crystal layer is $n_1=1.7$ which is different from the refraction factor of 1.5 of the film. For this reason, the liquid crystal layer selectively interference-reflects light having a wavelength of 450 nm. As is apparent from FIG. 13(b), the number of layers of the composite multi-layer film is preferably set to be 21 or more, more preferably, 41 or more, still more preferably, 61 or more.

(Thirteenth Embodiment)

Figure 14A:
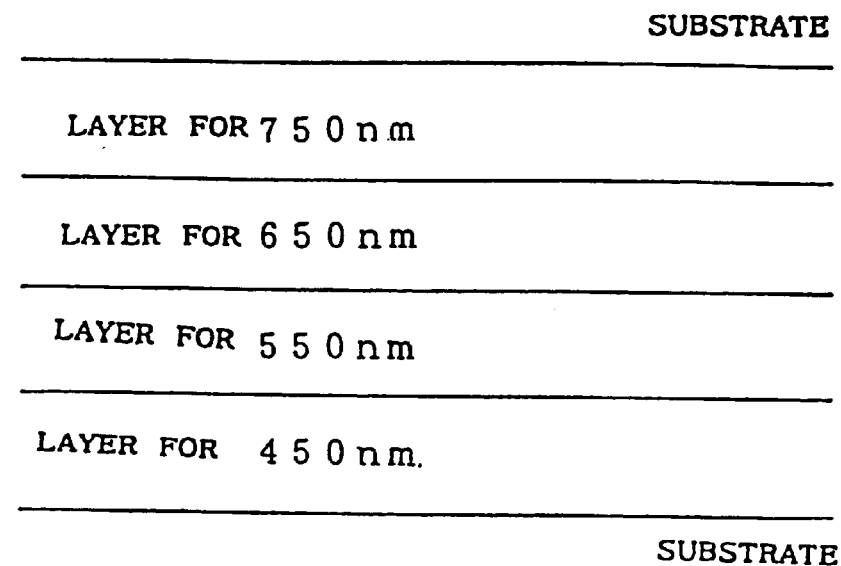
FIGS. 14A–14B are views for explaining the relationship between the number of layers of a composite multi-layer film and an interference reflectance in the fifteenth embodiment of the display device according to the present invention.
Figure 14B:
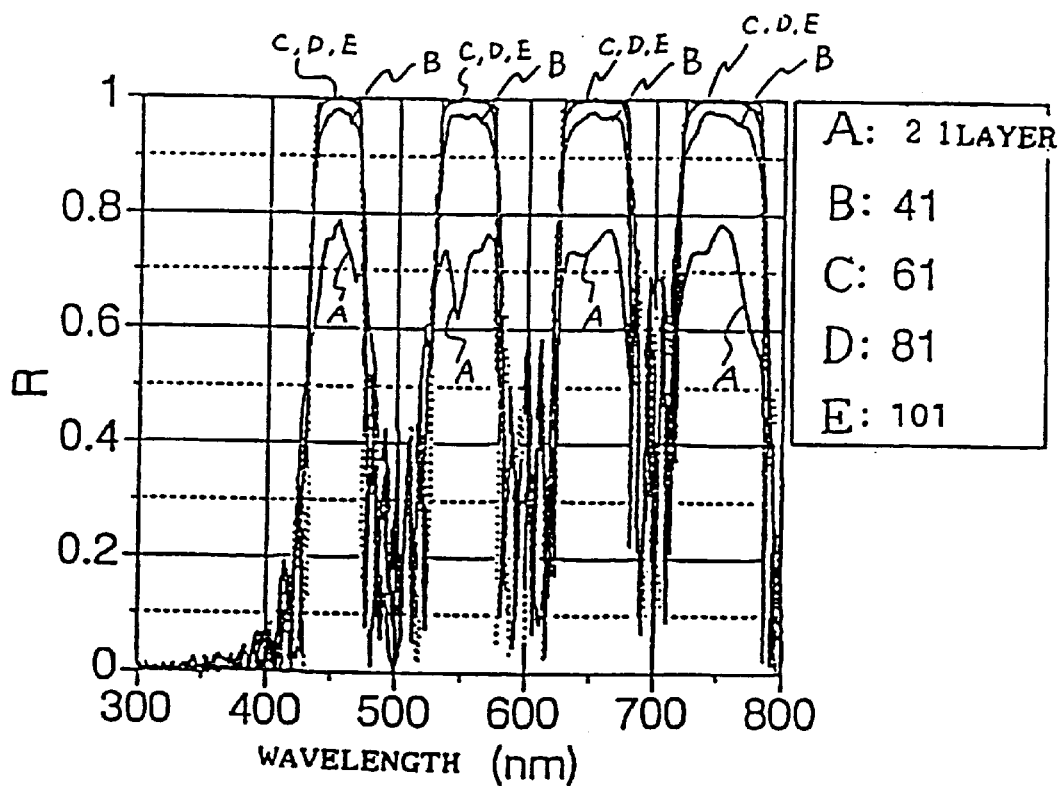
Figure 15A:
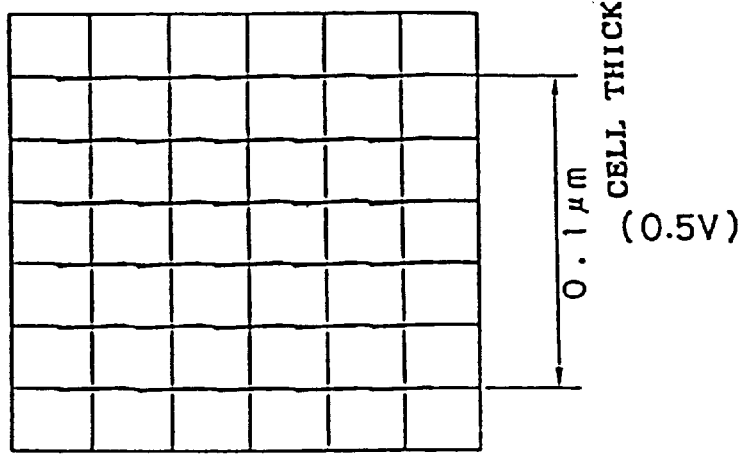
FIGS. 15A–15C are views for explaining the relationships between applied voltages and the alignment states of liquid crystal molecules in the fourteenth to twenty-first embodiments of the display device according to the present invention.
Figure 15B:
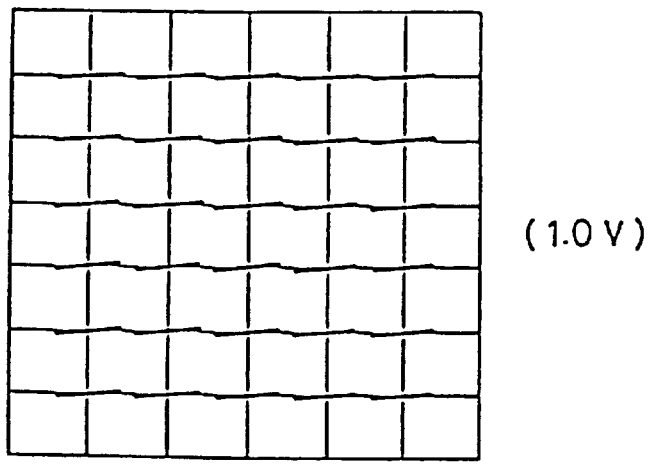
Figure 15C:
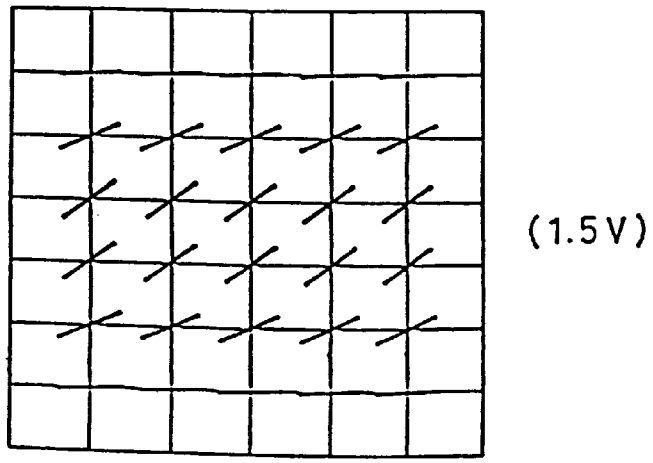
Figure 16A:
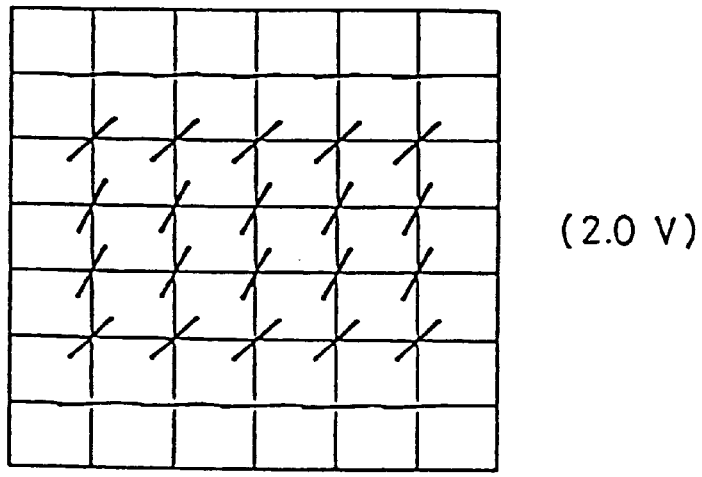
FIGS. 16A–16B are views for explaining the relationships between applied voltages and the alignment states of liquid crystal molecules in the fourteenth to twenty-first embodiments of the display device according to the present invention.
Figure 16B:
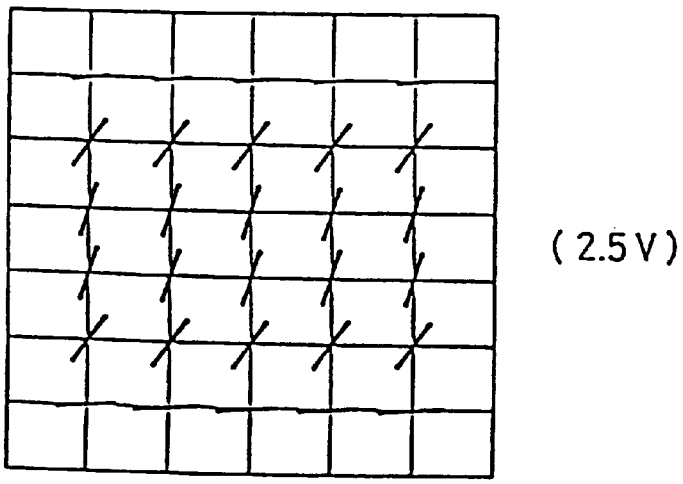

FIG. 14 shows an example wherein composite multi-layer films which respectively interference-reflect incident lights having wavelengths of 450 nm, 550 nm, 650 nm, and 750 nm are further laminated. FIG. 14(a) is a view showing a typical laminated layers of the composite multi-layer films corresponding to the four wavelengths, and FIG. 14(b) is a graph showing results obtained by measuring an interference reflection factor at approximately the respective wavelengths while the number of laminated layers is changed. A liquid crystal (refraction factor $n_1$ in the major axis direction of liquid crystal molecules=1.7, and refraction factor $n_2$ in the minor axis direction=1.5) was used, and a polyethylene resin (refraction factor $n_F$=1.5) was laminated between substrates as a film as shown in FIG. 14(a). Alignment of liquid crystal molecules in applying no voltage is set to be alnost horizontal with respect to the substrates, and liquid crystal layers whose alignment direction was set to be perpendicular to the drawing surface and liquid crystal layers whose alignment direction was set to be parallel to the drawing surface were arranged such that the numbers of these liquid crystal layers were almost equal to each other. The thicknesses of the liquid crystal layer and the film layer of the composite multi-layer films corresponding to the four wavelengths were set to satisfy equations (3) and (4) with respect to a wavelength of 450 nm, a wavelength of 550 nm, a wavelength of 650 nm, and a wavelength of 750 nm. In FIG. 14(b), the abscissa indicates a wavelength, and the ordinate indicates a refraction factor. The four composite multi-layer films corresponding to the respective wavelengths have a composite multi-layer film including a liquid crystal layer whose alignment is set in the direction perpendicular to the drawing surface and a composite multi-layer film including a liquid crystal layer whose alignment is set in a direction horizontal with respect to the drawing surface. Reference symbols A to E in FIG. 14(b) denote the numbers of composite multi-layer films including liquid crystal layers whose alignments are set in the direction perpendicular to the drawing surface and the numbers of composite multi-layer films including liquid crystal layers whose alignment are set in the direction horizontal with respect to the drawing surface. Therefore, the total number of layers is approximately 8 times the numbers of layers A to E. Reference symbol A indicates a refraction factor obtained in a case wherein a composite multi-layer film is constituted by liquid crystal layers and film layers such that the number of liquid crystal layers and film layers is 21 (The number of layers is an odd number because liquid crystal layers are arranged on both the sides of the composite multi-layer film and because the number of liquid crystal layers is larger than the number of films by one in the combination of liquid crystal layers and films.); B, a refraction factor in the case of 41 layers; C, a refraction factor in the case of 61 layers; D, a refraction factor in the case of 81 layers; and E, a refraction factor in the case of 101 layers. In applying no voltage, the liquid crystal molecules of the liquid crystal layer are almost horizontally aligned, and the refraction factor of the liquid crystal layer is $n_1=1.7$ which is different from the refraction factor of 1.5 of the film. For this reason, the liquid crystal layer selectively interference-reflects lights having respective wavelengths. As is apparent from FIG. 14(b), the number of layers of the composite multi-layer film is preferably set to be 21 or more, more preferably, 41 or more, still more preferably, 61 or more.

(Fourteenth Embodiment)

As the fourteenth to twenty-first embodiments, the relationship between the refraction factors of the film and liquid crystal layer of a composite multi-layer film, the number of films, the number of liquid crystal layers, and the reflection factors of the films and the liquid crystal layers was examined with respect to display devices having various structures.

FIGS. 15A to 15C and FIGS. 16A and 16B are views for explaining a general relationship between an applied voltage and the alignment state of liquid crystal molecules in the display devices according to the fourteenth embodiment to the twenty-first embodiment. FIGS. 15A, 15B, and 15C and FIGS. 16A and 16B show typical alignment states of a liquid crystal when voltages of 0.5 V, 1.0 V, 1.5 V, 2.0 V, and 2.5 V are applied to the liquid crystal layer, respectively. In the fourteenth embodiment to twenty-first embodiment, a nematic liquid crystal having positive dielectric anisotropy was used as a liquid crystal used in the liquid crystal layer, and a structure which was designed such that the liquid crystal was aligned (homogeneous alignment) in a direction horizontal with respect to the film or the substrate in applying no voltage was employed. In this state, simulation for the reflection factor of the display device was performed. In the display device having the above structure, when an applied voltage is increased as shown in FIGS. 15A to 15C and FIGS. 16A to 16B, the liquid crystal is gradually inclined. However, this inclination is not uniform in the direction of cell thickness, i.e., the inclination is small at a portion near the film or the substrate, and is large at the central portion of the cell. Therefore, as shown in FIG. 17, in the cell, the liquid crystal has a refraction factor distribution depending on an applied voltage in the direction of cell thickness. In the fourteenth to twenty-first embodiments, a reflection factor was simulated on the assumption that the liquid crystal layer had such a refraction factor distribution. The refraction factor distribution in FIG. 17 is obtained when the cell thickness is 0.1 μm.

Figure 18A:
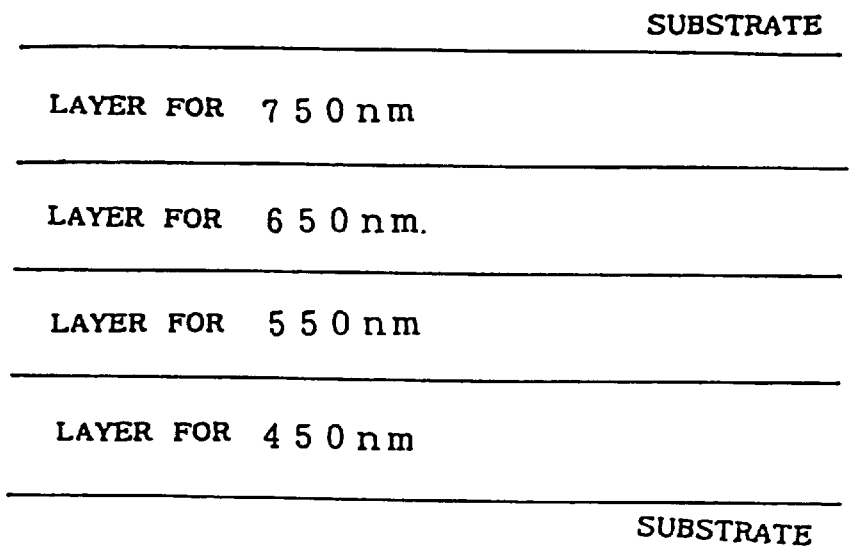
FIGS. 18A–18B are views for explaining the structure of the display device according to the fourteenth embodiment of the present invention.

FIG. 18 is a view for explaining the structure of the display device according to the fourteenth embodiment of the present invention. In this display device according to the fourteenth embodiment, as shown in FIG. 18A, four composite multi-layer films which interference-reflect incident lights having wavelengths of 450 nm, 550 nm, 650 nm, and 750 nm are laminated.

Figure 18B:
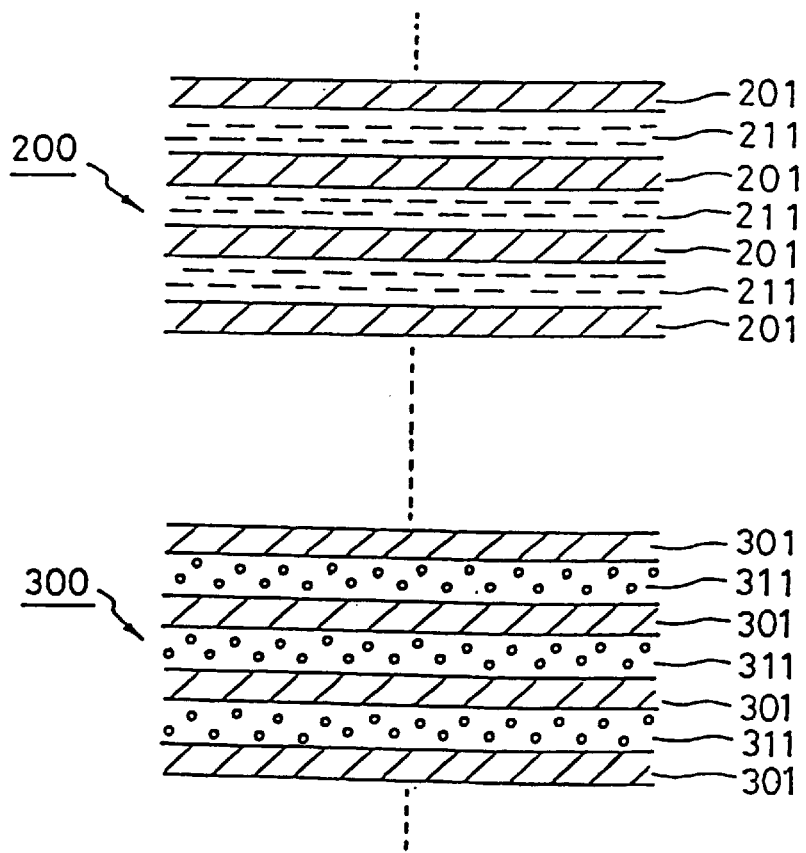

The composite multi-layer films which interference-reflect lights having the wavelengths, as shown in FIG. 18B, comprises a composite multi-layer film 200 for the P wave and a composite multi-layer film 300 for the S wave. In the composite multi-layer film 200 for the P wave, films 201 and liquid crystal layers 211 were alternately laminated. In each of the liquid crystal layers 211, the alignment direction of the major axis of liquid crystal molecules in applying no voltage was set to be almost horizontal with respect to the films 201 and parallel to the drawing surface. In the composite multi-layer film 300 for the S wave, films 301 and liquid crystal layers 311 were alternately laminated. In each of the liquid crystal layers 311, the alignment direction of the major axis of liquid crystal molecules was set to be almost horizontal with respect to the films 301 and perpendicular to the drawing surface. In the composite multi-layer films which interference-reflected lights having the respective wavelengths, the number of films 201 and liquid crystal layers 211 of the composite multi-layer film 200 for the P wave was set to be equal to the number of films 301 and the liquid crystal layers 311 of the composite multi-layer film 300 for the S wave. Also, between the composite multi-layer films which interference-reflected lights having the respective wavelengths, the number of films 201 and liquid crystal layers 211 of the composite multi-layer film 200 for the P wave was set to be equal to the number of films 301 and the liquid crystal layers 311 of the composite multi-layer film 300 for the S wave. The structure of the composite multi-layer film which interference-reflects lights having the respective wavelength in the fourteenth embodiment is the same as that in each of the fifteenth to twentieth embodiments.

In the fourteenth embodiment, the refraction factor in the major axis direction of liquid crystal molecules was set to be $n_{LC1}=1.7$, and the refraction factor in the minor axis direction was set to be $n_{LC2}=1.5$. (Here, the X-axis direction is the major axis direction of the liquid crystal molecules adjacent to the film, and the Y-axis direction is the minor axis direction of the liquid crystal molecules.) The thicknesses of the liquid crystal layers and films of the composite multi-layer films which interference-reflected lights having the four wavelengths were set to satisfy equation (3) and (4) with respect to the wavelength of 450 nm, a wavelength of 550 nm, a wavelength of 650 nm, and a wavelength of 750 nm.

Figure 19A:
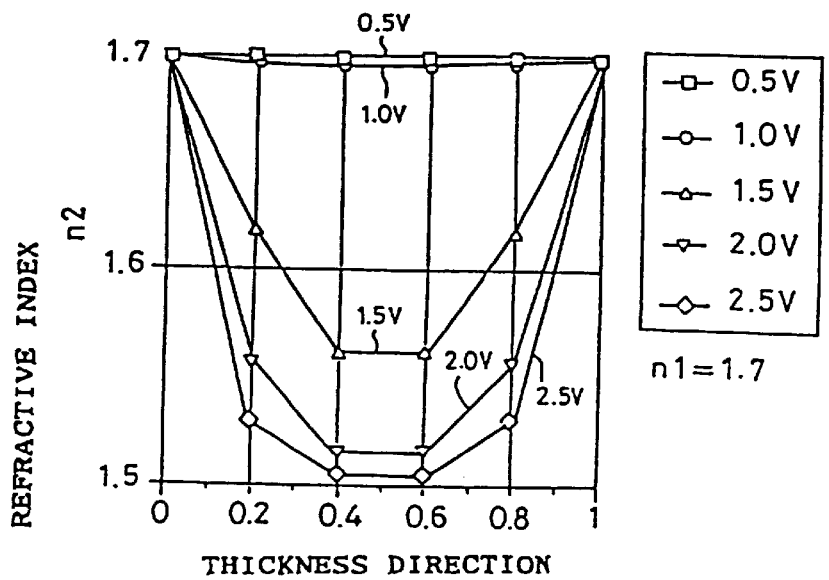
FIG. 19A is a graph for explaining the relationship between the direction of cell thickness and the refraction factor of a liquid crystal in the display device according to the fourteenth embodiment by using an applied voltage as a parameter.
Figure 19B:
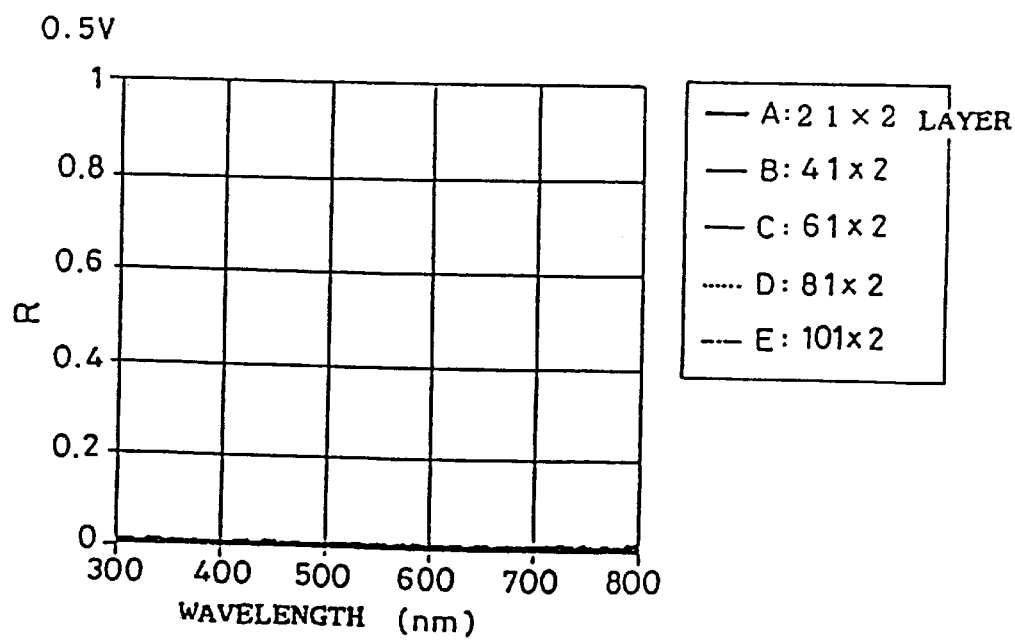
FIG. 19B is a graph for explaining the relationship between the number of layers of a composite multi-layer film and an interference reflectance in the display device according to the fourteenth embodiment.
Figure 20A:
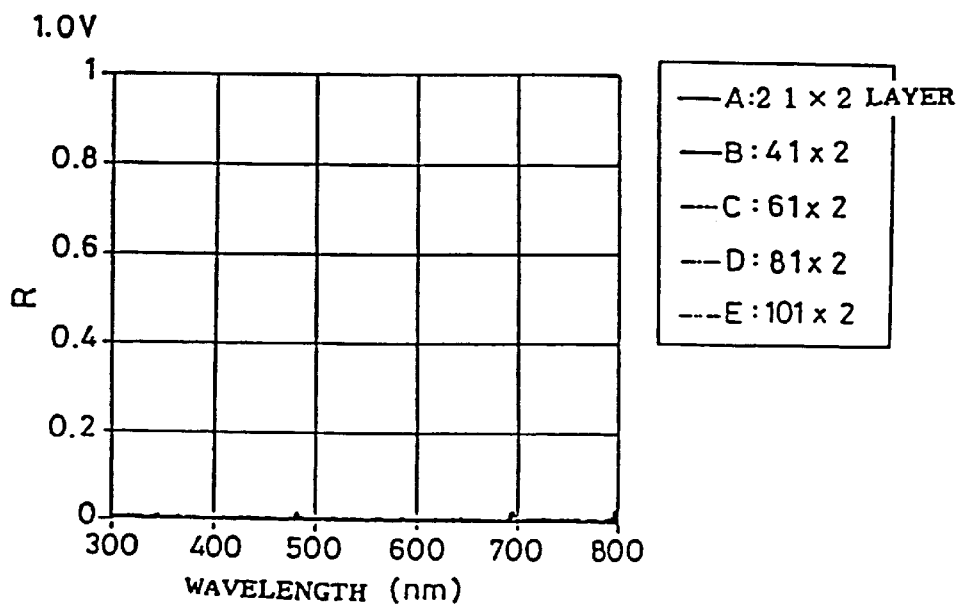
FIGS. 20A–20B are views for explaining the relationship between the number of layers of a composite multi-layer film and an interference reflectance in the display device according to the fourteenth embodiment of the present invention.
Figure 20B:
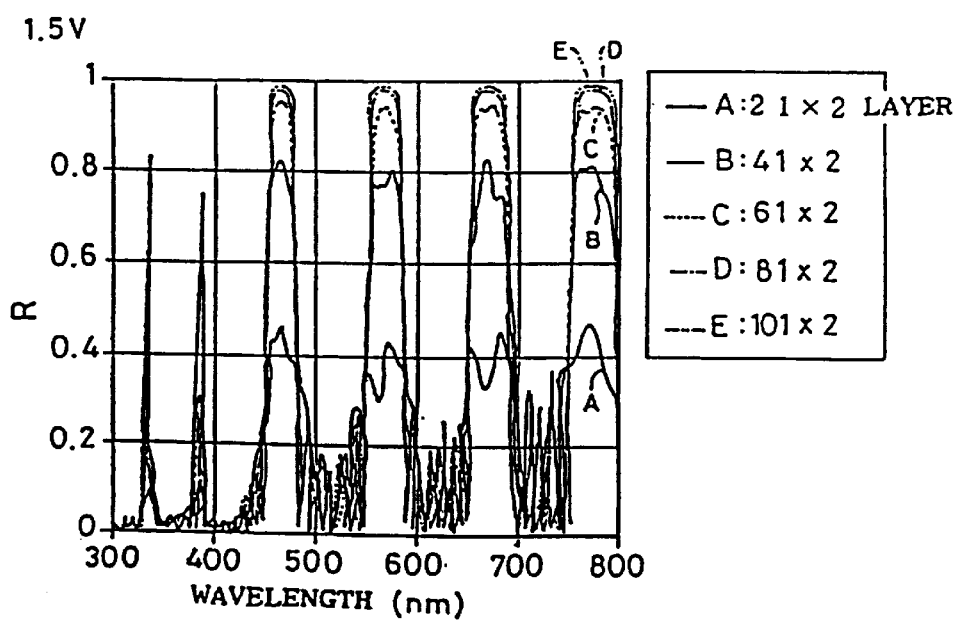
Figure 21A:
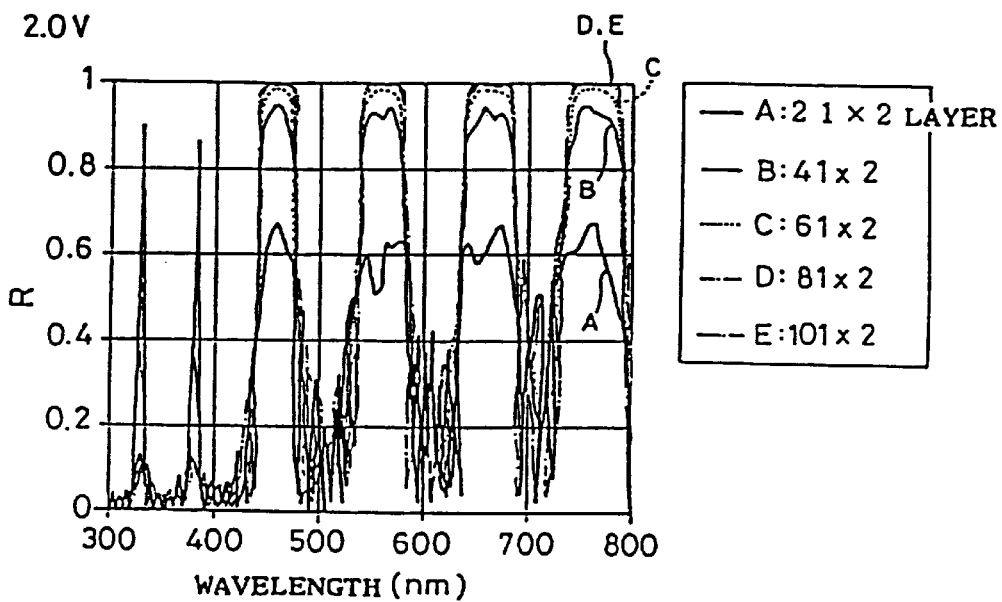
FIGS. 21A–21B are views for explaining the relationship between the number of layers of a composite multi-layer film and an interference reflectance in the display device according to the fourteenth embodiment of the present invention.
Figure 21B:
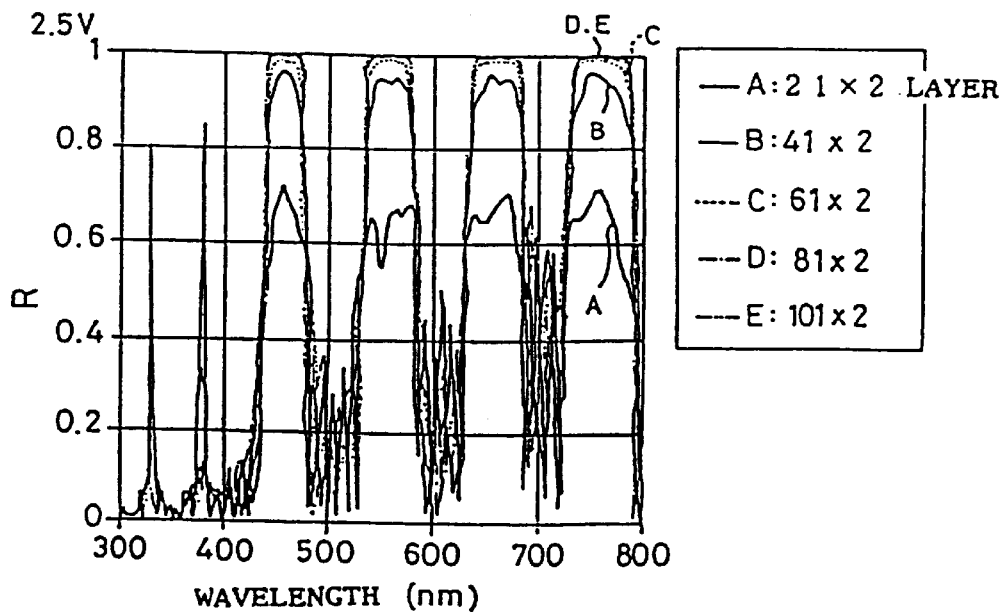

A refraction factor distribution in the direction of thickness in a cell in applying a voltage is given by FIG. 19A. The reflection factor of the display device was calculated on the assumption that the liquid crystal layer had such a refraction factor distribution. Reflection factors obtained with respect to applied voltages of 0.5 V, 1.0 V, 1.5 V, 2.0 V, and 2.5 V are shown in FIGS. 19B, 20A, 20B, 21A, and 21B.

In each of these drawings, the abscissa indicates a wavelength, and the ordinate indicates a refraction factor. In these drawings, reflection factors are calculated in the cases wherein the numbers of composite multi-layer films which interference-reflect lights having the respective wavelengths are 21×2 (A), 41×2 (B), 61×2 (C), 81×2 (D), and 101×2 (E). For example, in the case of A, 21×2 means that the number of layers of the composite multi-layer film for the P wave is 21 and the number of layers of the composite multi-layer film for the S wave is 21 in the composite multi-layer films which interference-reflect lights having the respective wavelengths. Therefore, in the case of A in this embodiment, the total number of layers is 21×2×4=168. In each of cases of B, C, D, and E, the total number of layers is equal to that in the case of A.

In the case of A, the number of layers of the composite multi-layer films for the P or S wave is 21. This means that the number of liquid crystal layers and the number of films are 11 and 10, respectively, in the composite multi-layer film for each of the P and S waves. In this manner, the sum of the number of liquid crystal layers and the number of films constituting the composite multi-layer film is 21 (odd number) because liquid crystal layers are arranged on both the sides of the composite multi-layer film and because the number of liquid crystal layers is larger than the number of films by one in the combination of liquid crystal layers and films. In each of the cases of B, C, D, and E, the number of liquid crystals and films is set in the same manner as in the case of A.

In applying no voltage, the liquid crystal molecules of the liquid crystal layer are almost horizontally aligned, and the refraction factor ($n_1$) of the liquid crystal layer and the refraction factor ($n_{F1}$) of the film in the X-axis direction are given by $n_1=n_{F1}=1.7$, so that the composite multi-layer film is set in a transmission state. Similarly, the refraction factor ($n_2$) of the liquid crystal layer and the refraction factor ($n_{F2}$) of the film in the Y-axis direction are given by $n_2=n_{F2}=1.5$, so that the composite multi-layer film is set in a transmission state. All the incident lights (P wave and S wave) are transmitted through the composite multi-layer film. When a voltage is gradually applied, as shown in FIG. 19A, the refraction factor decreases to a value smaller than 1.7. For this reason, the composite multi-layer films can selectively interference-reflect lights having the respective wavelengths.

When the number of layers is increased, the reflection factor increases. However, since the reflection factors of plain paper and high-quality paper are about 70% and about 80%, respectively, if the number of the composite multi-layer film for the P or S wave in the composite multi-layer films which interference-reflect lights having the respective wavelengths is 21, it is understood that a sufficiently practical reflection factor can be obtained.

(Fifteenth Embodiment)

Figure 22:
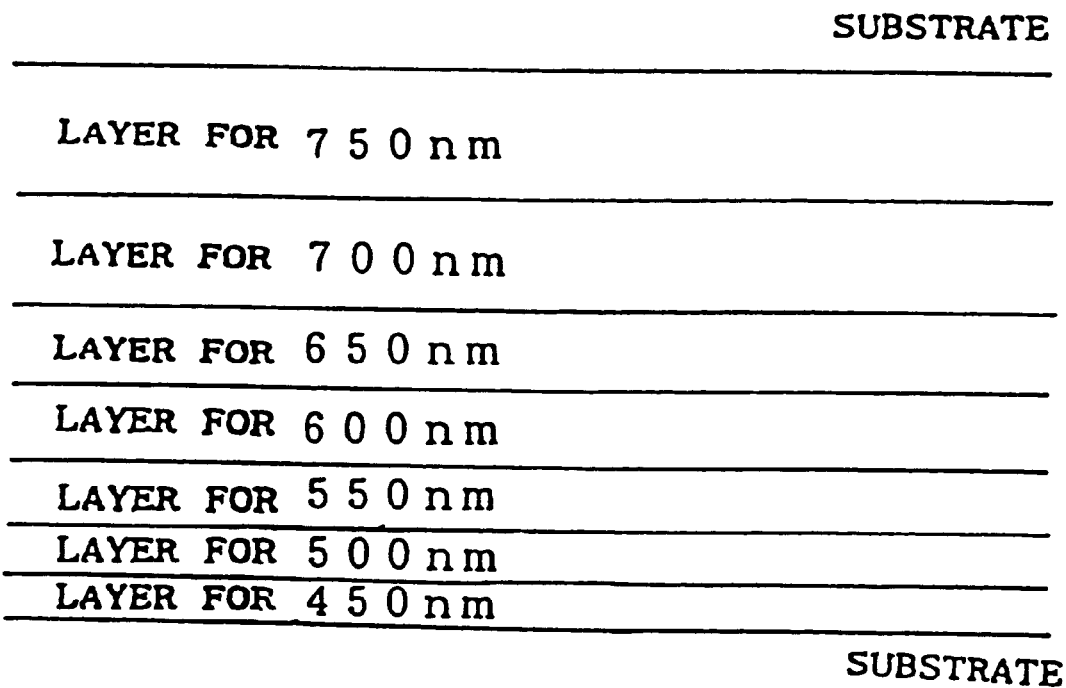
FIG. 22 is a view for explaining the structure of a display device according to the fifteenth embodiment of the present invention.

FIG. 22 is a view for explaining the structure of the display device according to the fifteenth embodiment of the present invention. In the display device according to the fifteenth embodiment, seven composite multi-layer films which interference-reflect incident lights having wavelengths of 450 nm, 500 nm, 550 nm, 600 nm, 650 nm, 700 nm, and 750 nm are laminated. The structure of each of the seven composite multi-layer films is the same as that in the case of the fourteenth embodiment described with reference to FIG. 18B.

In this embodiment, the refraction factor in the major axis direction of liquid crystal molecules was set to be $n_1=1.8$, and the refraction factor in the minor axis direction was set to be $n_2=1.52$. As the refraction factors of the film, $n_{F1}=1.8$ and $n_{F2}=1.52$ were set. In this case, the relationship between the alignment direction of the liquid crystal molecules and the arrangement of the film is the same as in the fourteenth embodiment. The thicknesses of the liquid crystal layers and films of the composite multi-layer films which interference-reflected lights having the seven wavelengths were set to satisfy equation (6) and (6)' with respect to the wavelength of 450 nm, the wavelength of 500 nm, the wavelength of 550 nm, the wavelength of 600 nm, the wavelength of 650 nm, the wavelength of 700and the wavelength of 750 nm.

Figure 23A:
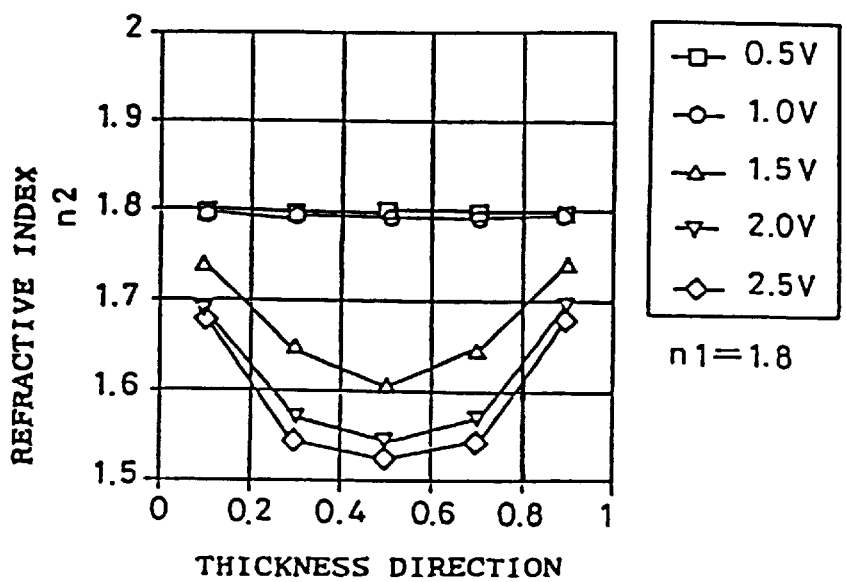
FIG. 23A is a graph for explaining the relationship between the direction of cell thickness and the refraction factor of a liquid crystal in the display device according to the fifteenth embodiment by using an applied voltage as a parameter.
Figure 23B:
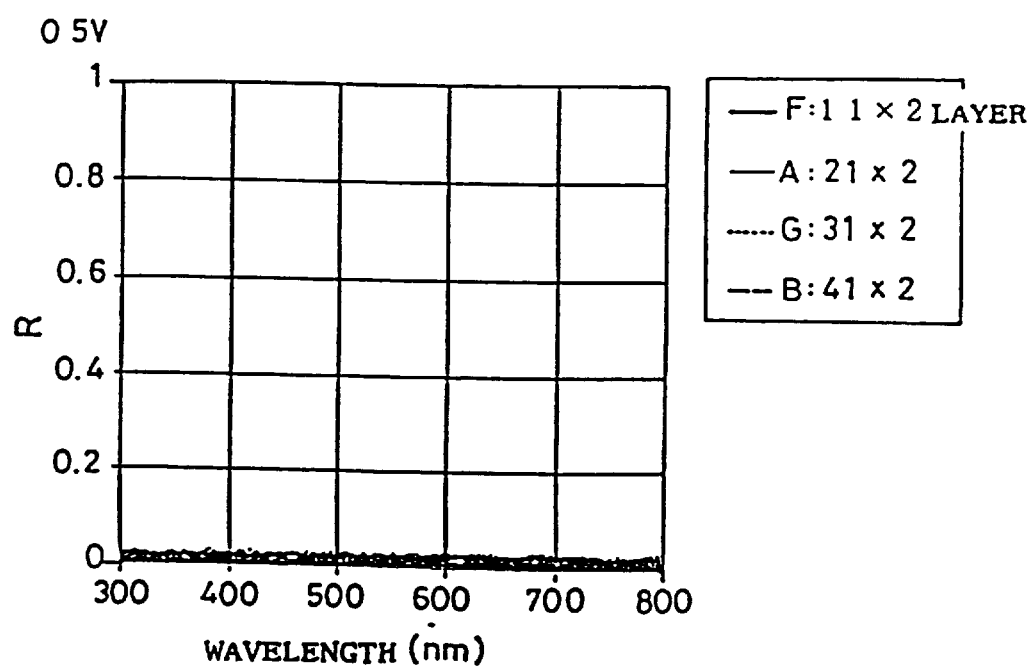
FIG. 23B is a graph for explaining the relationship between the number of layers of a composite multi-layer film and an interference reflectance in the display device according to the fifteenth embodiment.
Figure 24A:
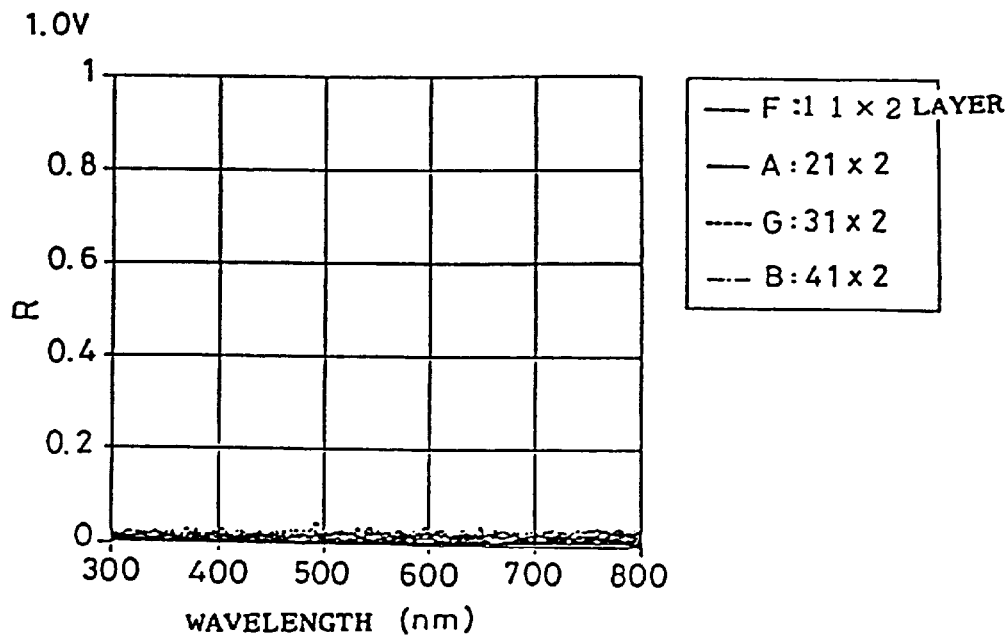
FIGS. 24A–24B are views for explaining the relationship between the number of layers of a composite multi-layer film and an interference reflectance in the display device according to the fifteenth embodiment of the present invention.
Figure 24B:
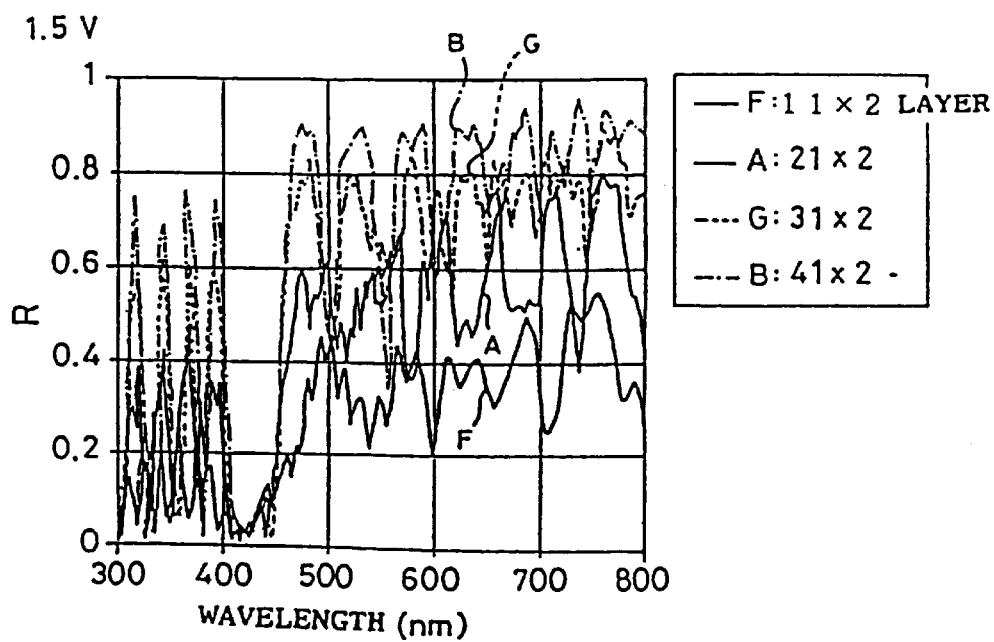
Figure 25A:
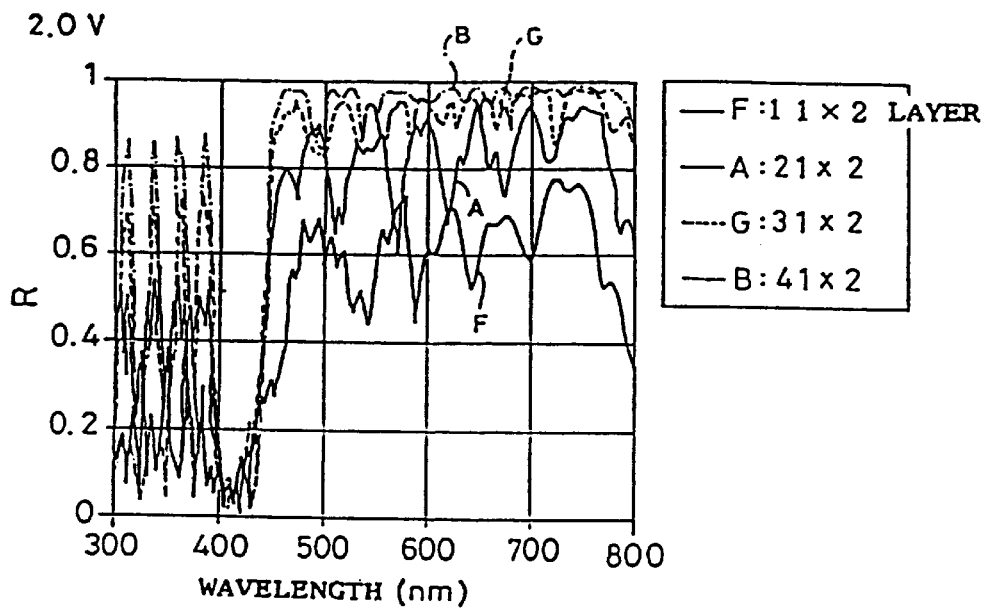
FIGS. 25A–25B are views for explaining the relationship between the number of layers of a composite multi-layer film and an interference reflectance in the display device according to the fifteenth embodiment of the present invention.
Figure 25B:
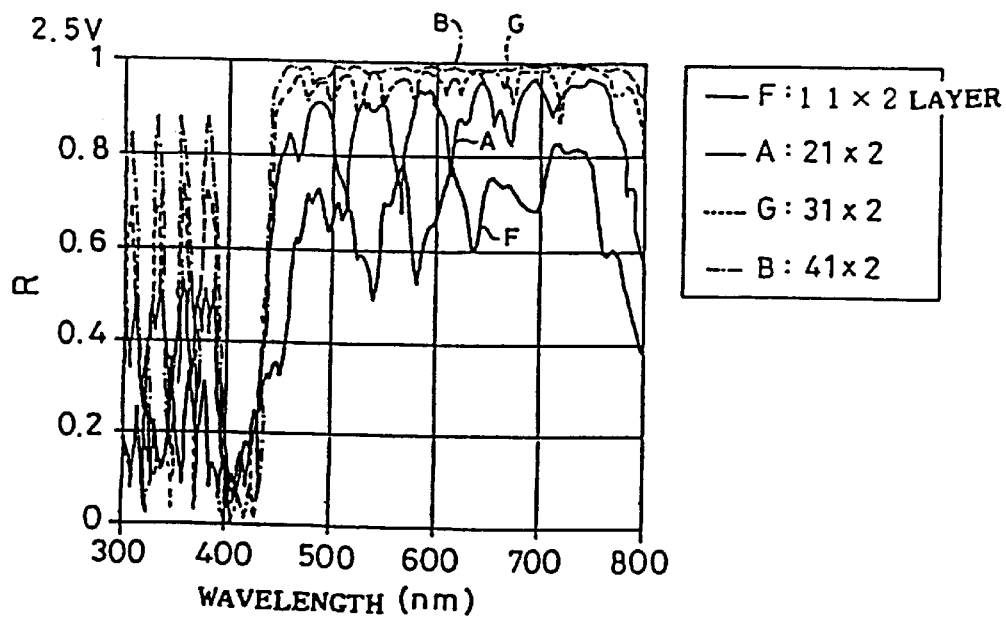

A refraction factor distribution in the direction of thickness in a cell in applying a voltage is given by FIG. 23A. The reflection factor of the display device was calculated on the assumption that the liquid crystal layer had such a refraction factor distribution. Reflection factors obtained with respect to applied voltages of 0.5 V, 1.0 V, 1.5 V, 2.0 V, and 2.5 V are shown in FIGS. 23B, 24A, 24B, 25A, and 25B.

In each of these drawings, the abscissa indicates a wavelength, and the ordinate indicates a refraction factor. In these drawings, reflection factors in the cases wherein the numbers of layers of the composite multi-layer films which interference-reflect lights having the respective wavelengths are 11×2 ($_F$), 21×2 (A), 31×2 (G), and 41×2 (B) are calculated. Here, the contents of the numbers of layers in these cases are the same as those in the fourteenth embodiment.

In applying no voltage, the liquid crystal molecules of the liquid crystal layer are almost horizontally aligned, and the relationship between the refraction factors ($n_1$, $n_2$) of the liquid crystal layer and the refraction factors ($n_{F1}$, $n_{F2}$) of the film satisfies $n_1=n_{F1}=1.8$ and $n_2=n_{F2}=1.52$. The refraction factors of the display device with respect to the P and S waves are equal to each other, and the display device is set in a transmission state. When a voltage is gradually applied, as shown in FIG. 23A, the refraction factor decreases to a value smaller than 1.8. For this reason, the composite multi-layer films can selectively interference-reflect lights having the respective wavelengths.

In this embodiment, the refraction factor of the liquid crystal in the major axis direction is 1.8, the refraction factor in the minor axis direction is 1.52, and birefringence higher than that in the fourteenth embodiment can be obtained. For this reason, a high reflection factor can be obtained by small number of layers. In the composite multi-layer films which interference-reflect light having the respective wavelengths, even if the number of layers constituting the composite multi-layer film for the P or S wave is 11, a sufficiently practical reflection factor can be obtained. It is understood that a reflection factor of 80% or more which is higher than that of high-quality paper can be obtained when 21 layers are used.

(Sixteenth Embodiment)

Figure 26:
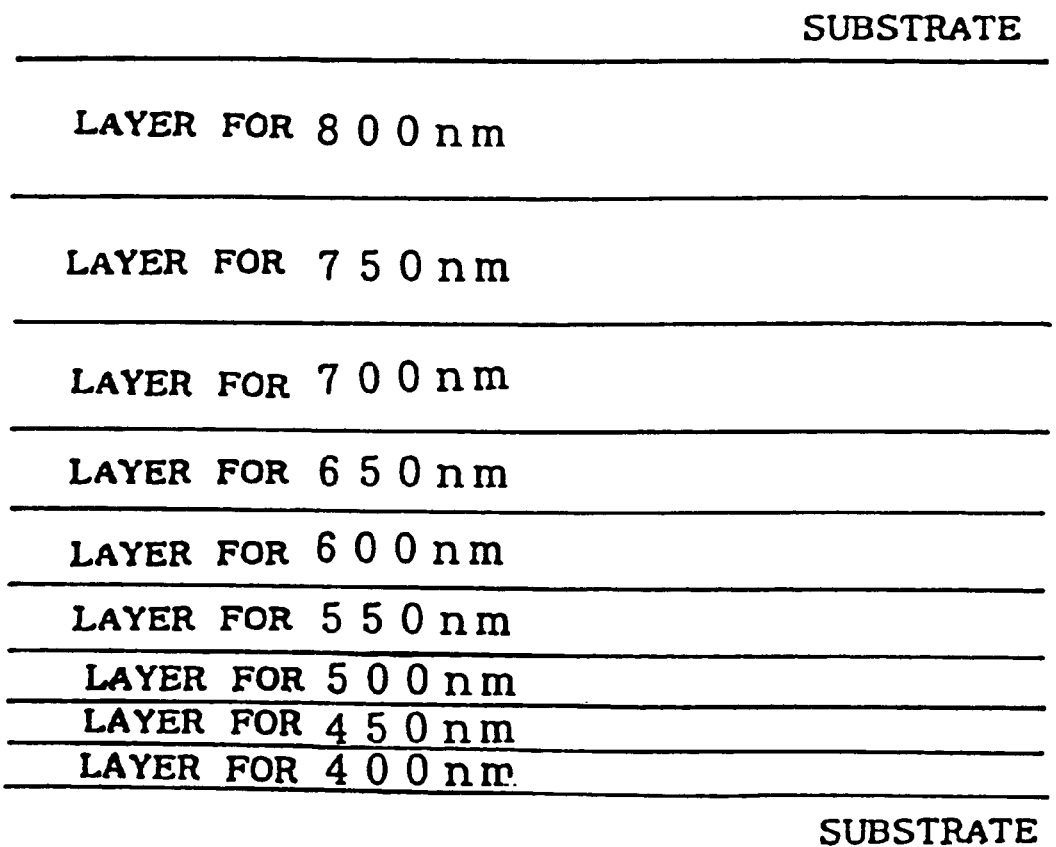
FIG. 26 is a view for explaining the structure of a display device according to the sixteenth embodiment of the present invention.

FIG. 26 is a view for explaining the structure of the display device according to the sixteenth embodiment of the present invention. In the display device according to the sixteenth embodiment, nine composite multi-layer films which interference-reflect incident lights having wavelengths of 400 nm, 450 nm, 500 nm, 550 nm, 600 nm, 650 nm, 700 nm, 750 nm, and 800 nm are laminated. The structure of each of the nine composite multi-layer films is the same as that in the case of the fourteenth embodiment described with reference to FIG. 18B.

In this embodiment, the refraction factor in the major axis direction of liquid crystal molecules was set to be $n_1=1.8$, and the refraction factor in the minor axis direction was set to be $n_2=1.52$. As the refraction factors of the film, $n_{F1}=1.8$ and $n_{F2}=1.52$ were set. In this case, the relationship between the alignment direction of the liquid crystal molecules and the arrangement of the film is the same as in the fourteenth embodiment. The thicknesses of the liquid crystal layers and films of the composite multi-layer films which interference-reflected lights having the nine wavelengths were set to satisfy equation (3) and (4) with respect to the wavelength of 400 nm, the wavelength of 450 nm, the wavelength of 500 nm, the wavelength of 550 nm, the wavelength of 600 nm, the wavelength of 650 nm, the wavelength of 700 nm, the wavelength of 750 nm, and the wavelength of 800 nm.

Figure 27A:
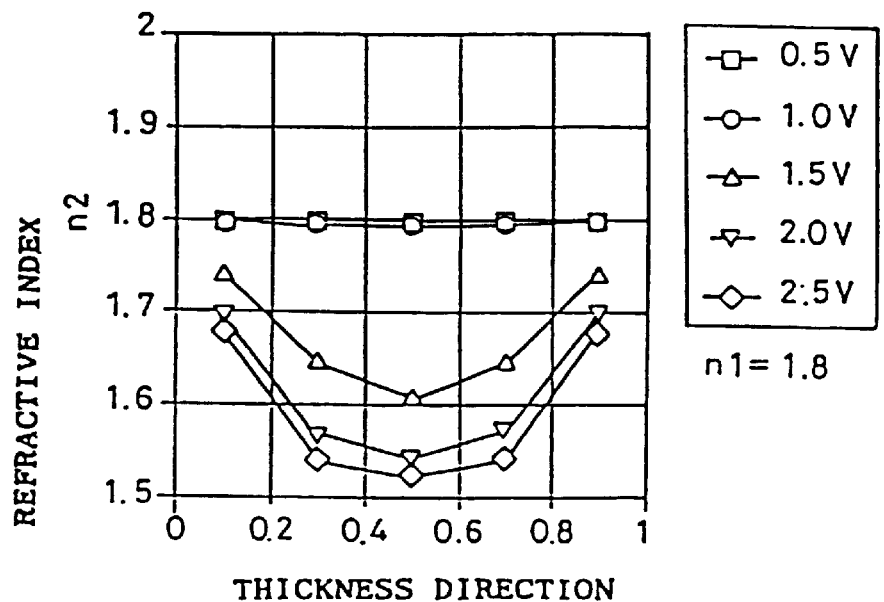
FIG. 27A is a graph for explaining the relationship between the direction of cell thickness and the refraction factor of a liquid crystal in the display device according to the sixteenth embodiment by using an applied voltage as a parameter.
Figure 27B:
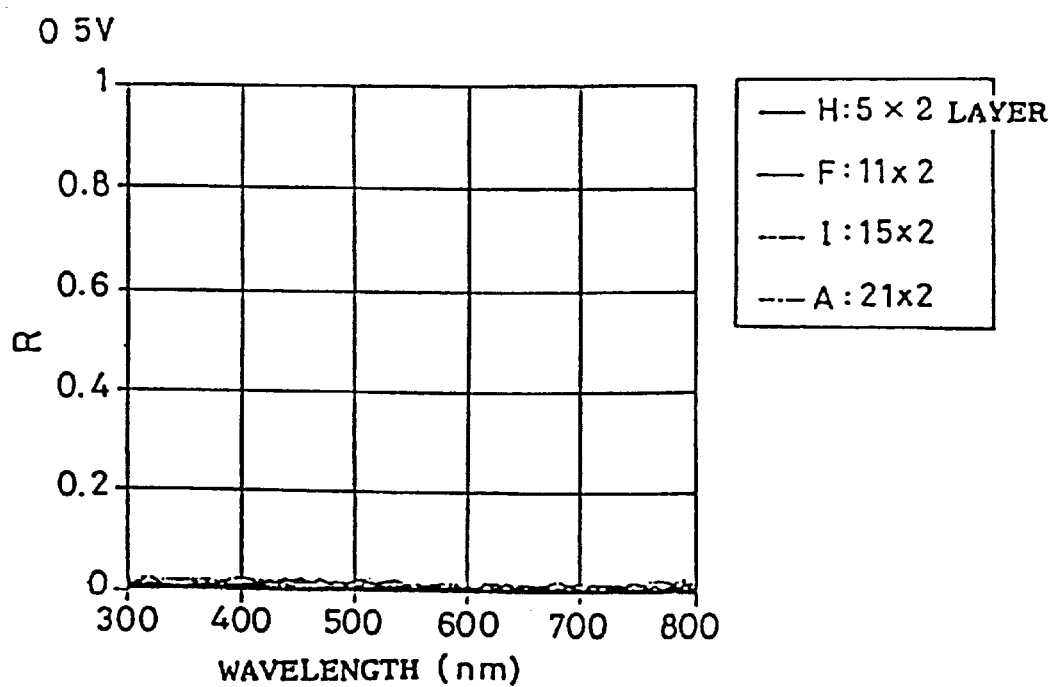
FIG. 27B is a graph for explaining the relationship between the number of layers of a composite multi-layer film and an interference reflectance in the display device according to the sixteenth embodiment.
Figure 28A:
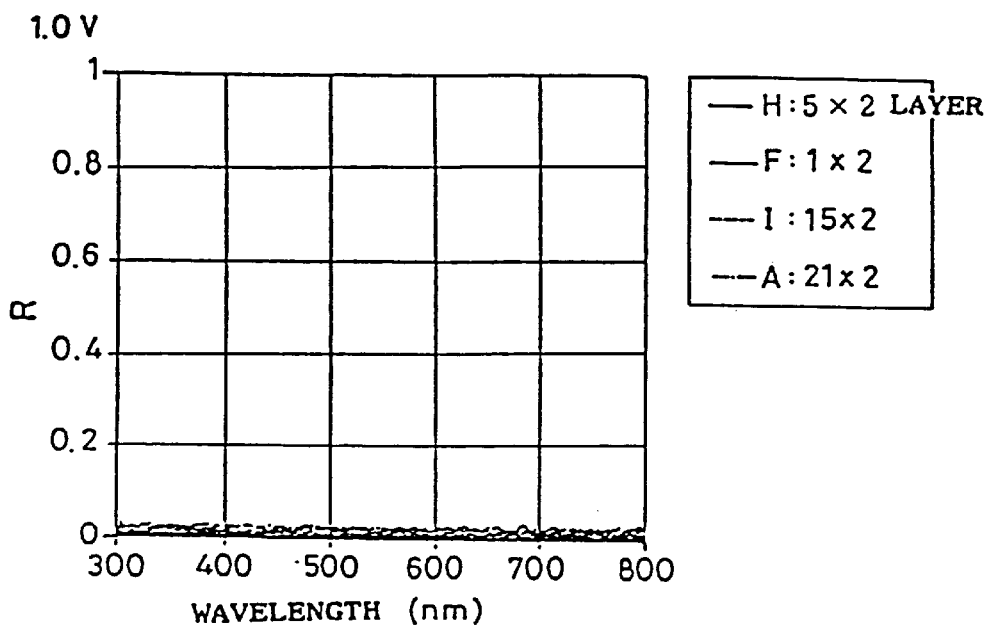
FIGS. 28A–28B are views for explaining the relationship between the number of layers of a composite multi-layer film and an interference reflection factor in the display device according to the sixteenth embodiment of the present invention.
Figure 28B:
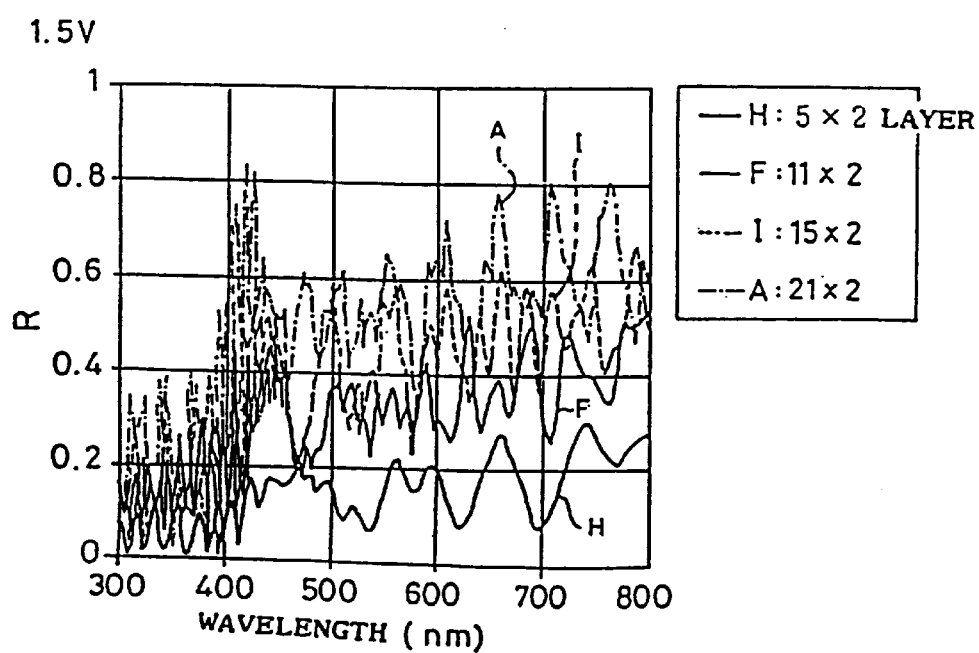
Figure 29A:
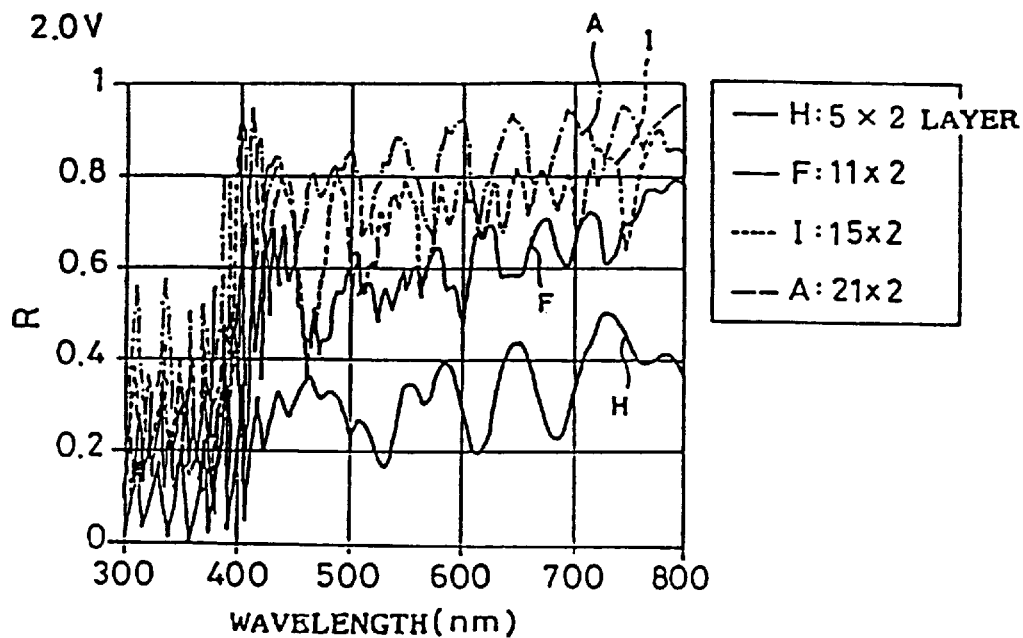
FIGS. 29A–29B are views for explaining the relationship between the number of layers of a composite multi-layer film and an interference reflection factor in the display device according to the sixteenth embodiment of the present invention.
Figure 29B:
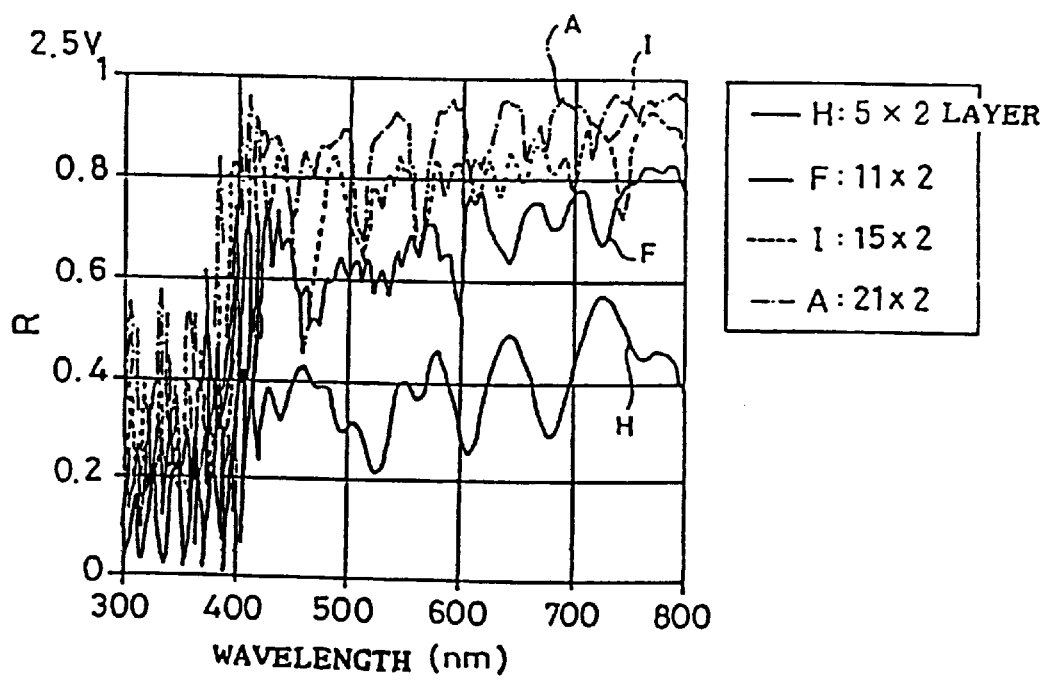

A refraction factor distribution in the direction of thickness in a cell in applying a voltage is given by FIG. 27A. The reflection factor of the display device was calculated on the assumption that the liquid crystal layer had such a refraction factor distribution. Reflection factors obtained with respect to applied voltages of 0.5 V, 1.0 V, 1.5 V, 2.0 V, and 2.5 V are shown in FIGS. 27B, 28A, 28B, 29A, and 29B.

In each of these drawings, the abscissa indicates a wavelength, and the ordinate indicates a refraction factor. In these drawings, reflection factors in the cases wherein the numbers of layers of composite multi-layer films which interference-reflect lights having the respective wavelengths are 5×2 (H), 11×2 ($_F$), 15×2 (I), and 21×2 (A) are calculated. Here, the contents of the numbers of layers in these cases are the same as those in the fourteenth embodiment.

In applying no voltage, the relationship between the refraction factors ($n_1$, $n_2$) of the liquid crystal layer and the refraction factors ($n_{F1}$, $n_{F2}$) of the film satisfies $n_1=n_{F1}=1.8$ and $n_2=n_{F2}=1.52$. The refraction factors of the display device with respect to the P and S waves are equal to each other, and the display device is set in a transmission state. When a voltage is gradually applied, as shown in FIG. 27A, the refraction factor decreases to a value smaller than 1.8. For this reason, the composite multi-layer films can selectively interference-reflect lights having the respective wavelengths.

(Seventeenth Embodiment)

Figure 30:
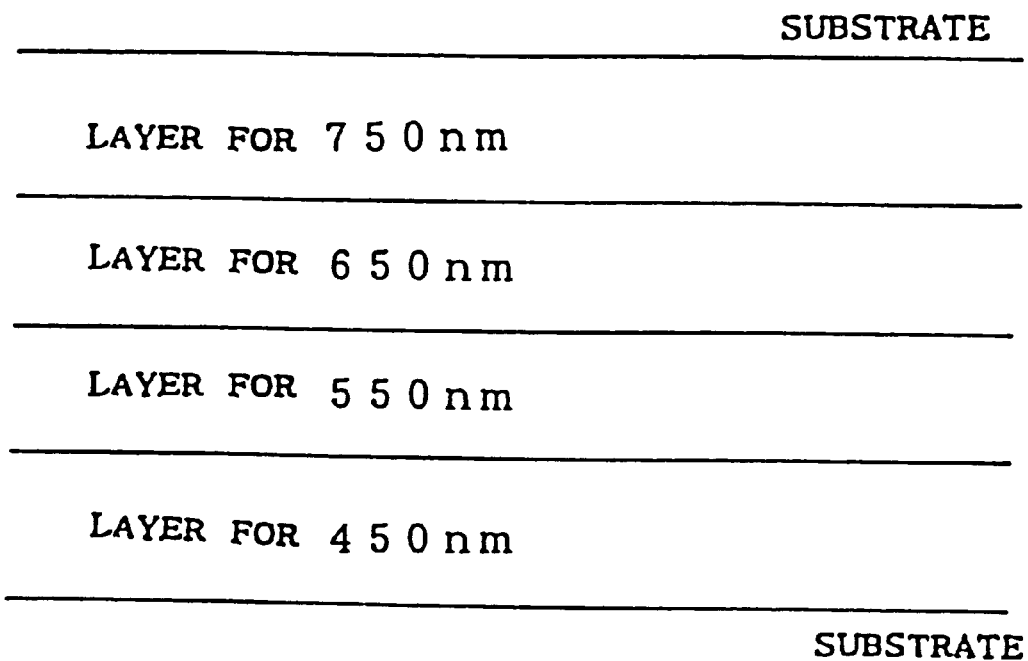
FIG. 30 is a view for explaining the structure of a display device according to the seventeenth embodiment of the present invention.

FIG. 30 is a view for explaining the structure of the display device according to the seventeenth embodiment of the present invention. In the display device according to the seventeenth embodiment, four composite multi-layer films which interference-reflect incident lights having wavelengths of 450 nm, 550 nm, 650 nm, and 750 nm are laminated. The structure of each of the four composite multi-layer films is the same as that in the case of the fourteenth embodiment described with reference to FIG. 18B.

In this embodiment, the refraction factor in the major axis direction of liquid crystal molecules was set to be $n_1=1.8$, and the refraction factor in the minor axis direction was set to be $n_2=1.52$. As the refraction factors of the film, $n_1=1.8$ and $n_{F2}=1.52$ were set. In this case, the relationship between the alignment direction of the liquid crystal molecules and the arrangement of the film is the same as in the fourteenth embodiment. The thicknesses of the liquid crystal layers and films of the composite multi-layer films which interference-reflected lights having the four wavelengths were set to satisfy equation (3) and (4) with respect to the wavelength of 450 nm, the wavelength of 550 nm, the wavelength of 650 nm, and the wavelength of 750 nm.

Figure 31A:
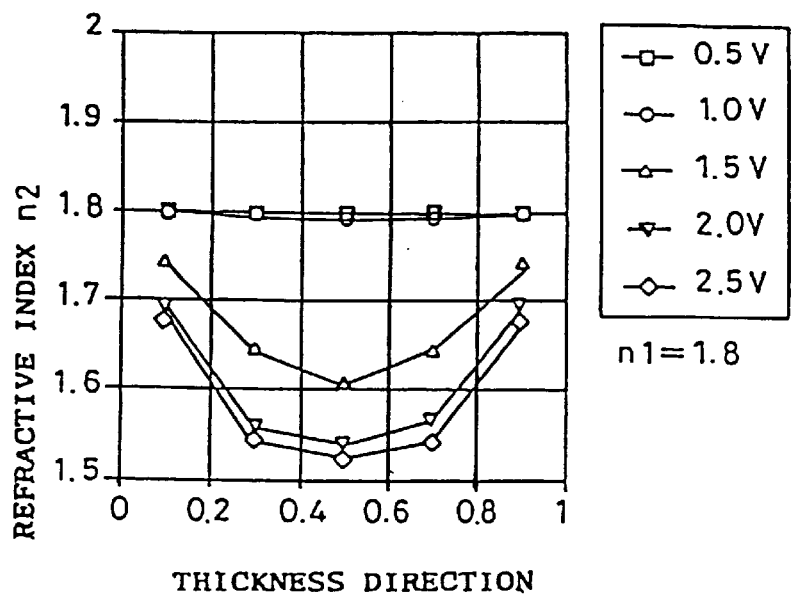
FIG. 31A is a graph for explaining the relationship between the direction of cell thickness and the refraction factor of a liquid crystal in the display device according to the seventeenth embodiment by using an applied voltage as a parameter.
Figure 31B:
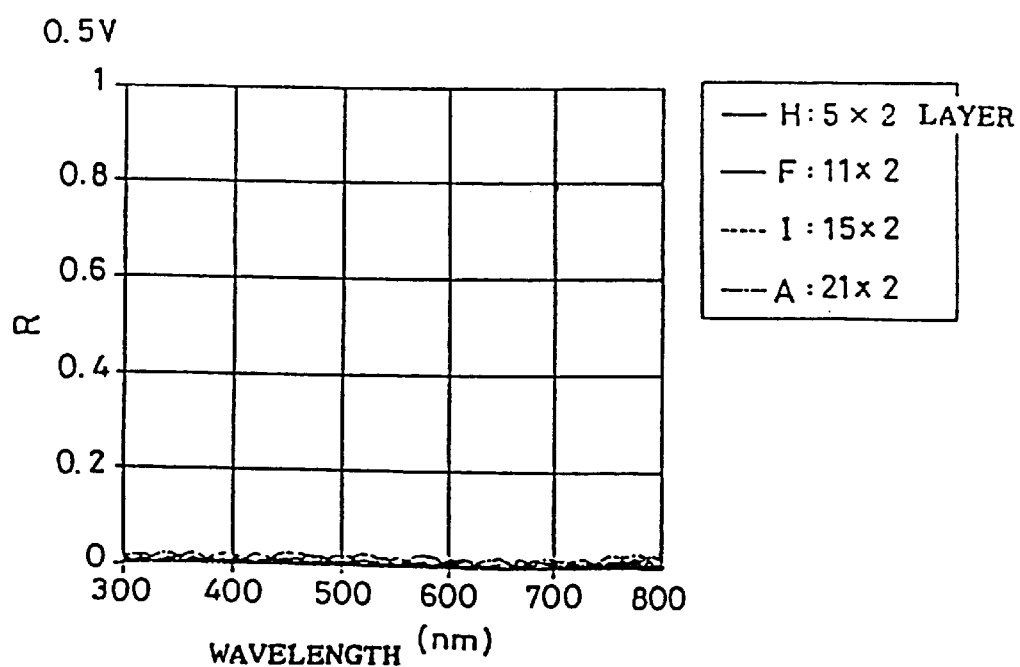
FIG. 31B is a graph for explaining the relationship between the number of layers of a composite multi-layer film and an interference reflectance in the display device according to the seventeenth embodiment.
Figure 32A:
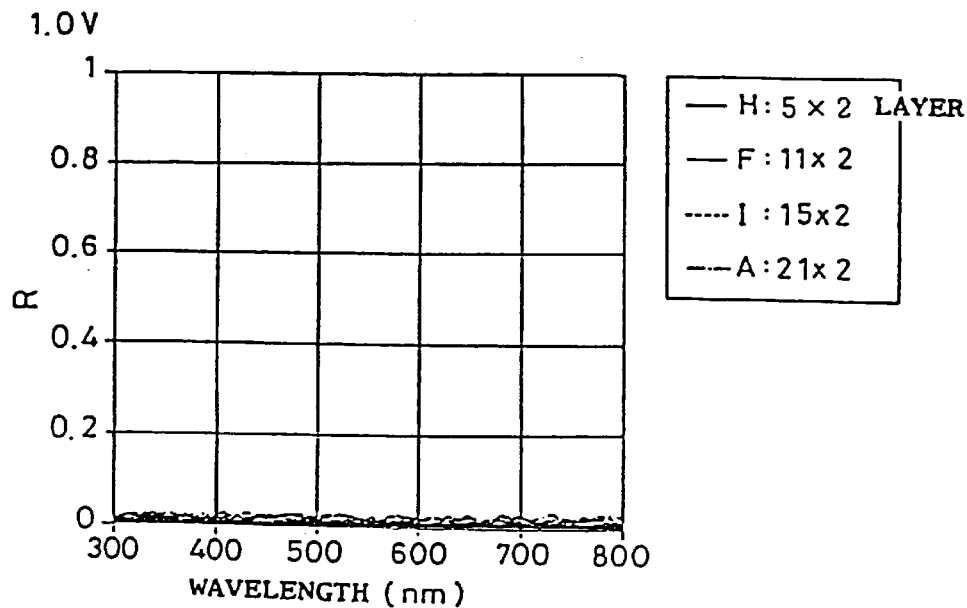
FIGS. 32A–32B are views for explaining the relationship between the number of layers of a composite multi-layer film and an interference reflection factor in the display device according to the seventeenth embodiment of the present invention.
Figure 32B:
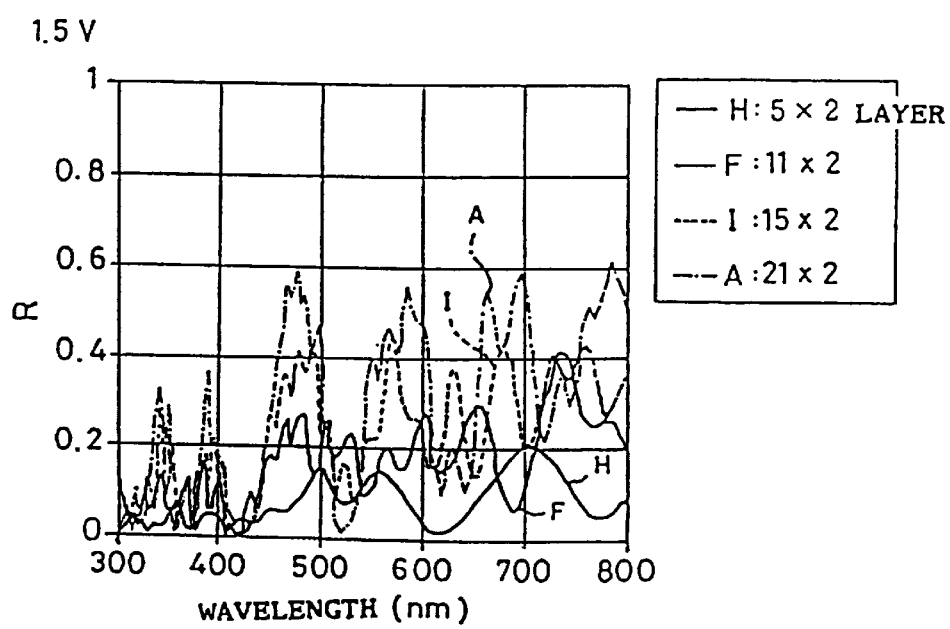
Figure 33A:
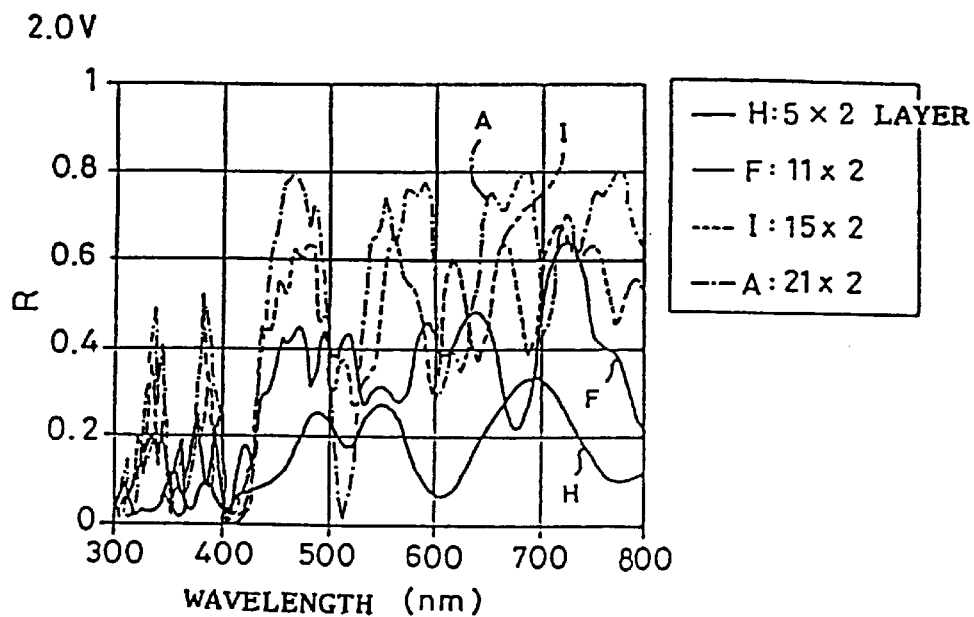
FIGS. 33A–33B are views for explaining the relationship between the number of layers of a composite multi-layer film and an interference reflection factor in the display device according to the seventeenth embodiment of the present invention.
Figure 33B:
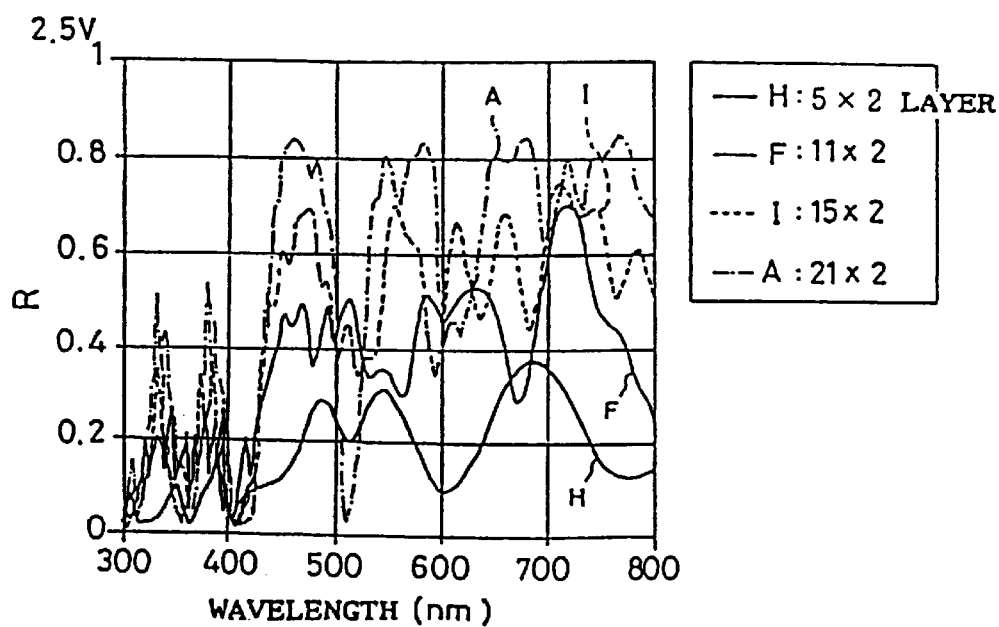

A refraction factor distribution in the direction of thickness in a cell in applying a voltage is given by FIG. 31A. The reflection factor of the display device was calculated on the assumption that the liquid crystal layer had such a refraction factor distribution. Reflection factors obtained with respect to applied voltages of 0.5 V, 1.0 V, 1.5 V, 2.0 V, and 2.5 V are shown in FIGS. 31B, 32A, 32B, 33A, and 33B.

In each of these drawings, the abscissa indicates a wavelength, and the ordinate indicates a refraction factor. In these drawings, reflection factors in the cases wherein the numbers of layers of the composite multi-layer films which interference-reflect lights having the respective wavelengths are 5>2 (H), 11×2 ($_F$), 15×2 (I), and 21×2 (A) are calculated. Here, the contents of the numbers of layers in these cases are the same as those in the fourteenth embodiment.

In applying no voltage, the relationship between the refraction factors ($n_1$, $n_2$) of the liquid crystal layer and the refraction factors ($n_{F1}$, $n_{F2}$) of the film satisfies $n_1=n_{F1}=1.8$ and $n_2=n_{F2}=1.52$. The refraction factors of the display device with respect to the P and S waves are equal to each other, and the display device is set in a transmission state. When a voltage is gradually applied, as shown in FIG. 31A, the refraction factor decreases to a value smaller than 1.8. For this reason, the composite multi-layer films can selectively interference-reflect lights having the respective wavelengths.

(Eighteenth Embodiment)

Figure 34:
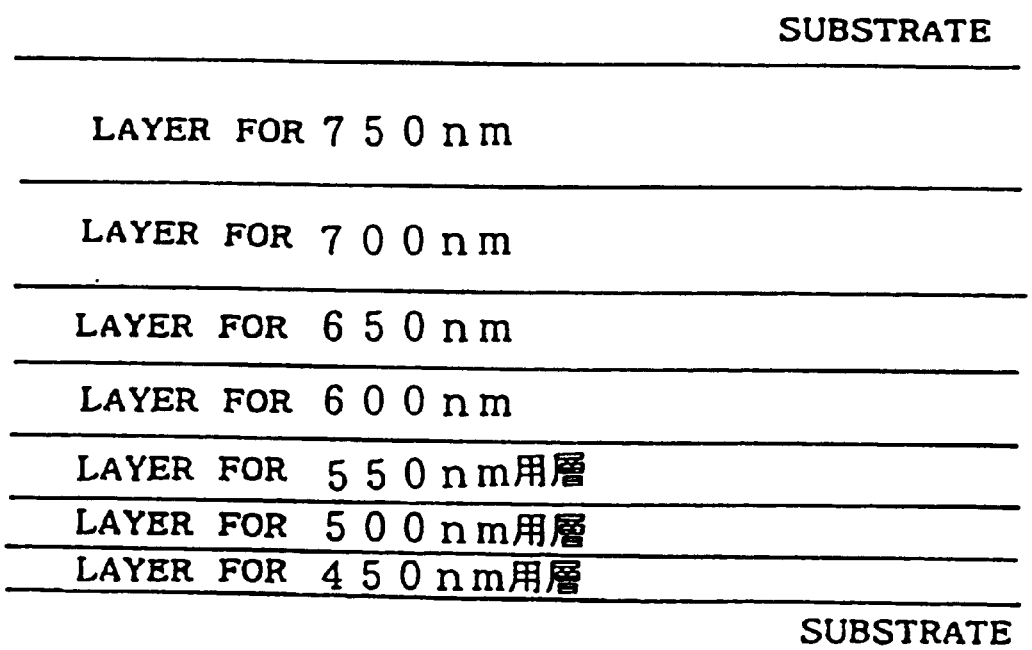
FIG. 34 is a view for explaining the structure of a display device according to the eighteenth embodiment of the present invention.

FIG. 34 is a view for explaining the structure of the display device according to the eighteenth embodiment of the present invention. In the display device according to the eighteenth embodiment, seven composite multi-layer films which interference-reflect incident lights having wavelengths of 450 nm, 500 nm, 550 nm, 600 nm, 650 nm, 700 nm, and 750 nm are laminated. The structure of each of the seven composite multi-layer films is the same as that in the case of the fourteenth embodiment described with reference to FIG. 18B.

In this embodiment, the refraction factor in the major axis direction of liquid crystal molecules was set to be $n_1=1.8$, and the refraction factor in the minor axis direction was set to be $n_2=1.52$. The refraction factors of the film were given by $n_{F1}=n_{F2}=1.52$. The thicknesses of the liquid crystal layers and films of the composite multi-layer films which interference-reflected lights having the seven wavelengths were set to satisfy equation (3) and (4) with respect to the wavelength of 450 nm, the wavelength of 500 nm, the wavelength of 550 nm, the wavelength of 600 nm, the wavelength of 650 nm, the wavelength of 700 nm, and the wavelength of 750 nm. There are many types of films each having a refraction factor of about 1.5. For example, polyethylene, polyester, polycarbonate, and the like are preferably used as the materials of the films.

Figure 35A:
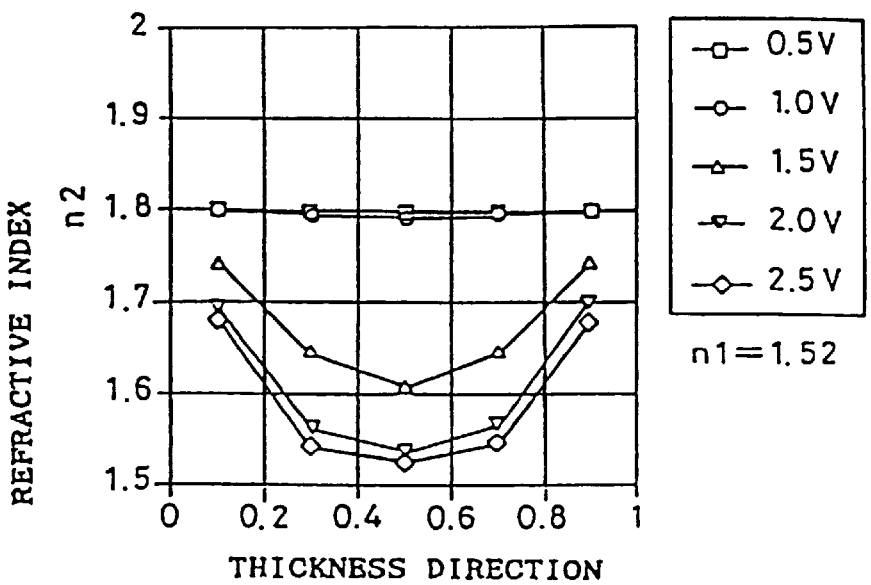
FIG. 35A is a graph for explaining the relationship between the direction of cell thickness and the refraction factor of a liquid crystal in the display device according to the eighteenth embodiment by using an applied voltage as a parameter.
Figure 35B:
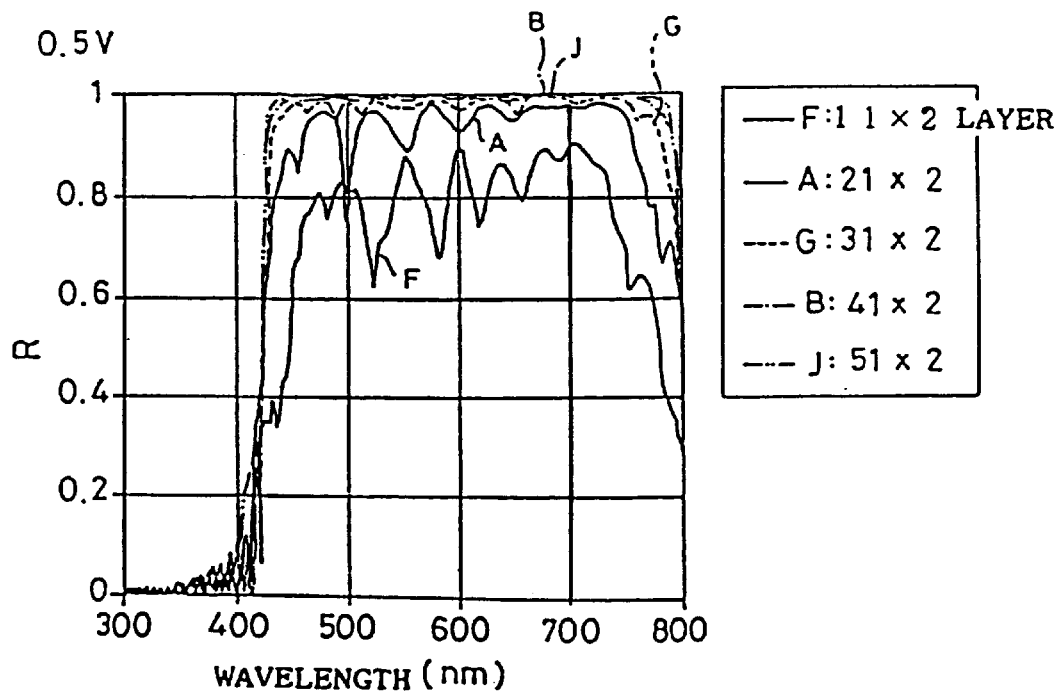
FIG. 35B is a graph for explaining the relationship between the number of layers of a composite multi-layer film and an interference reflectance in the display device according to the eighteenth embodiment.
Figure 36A:
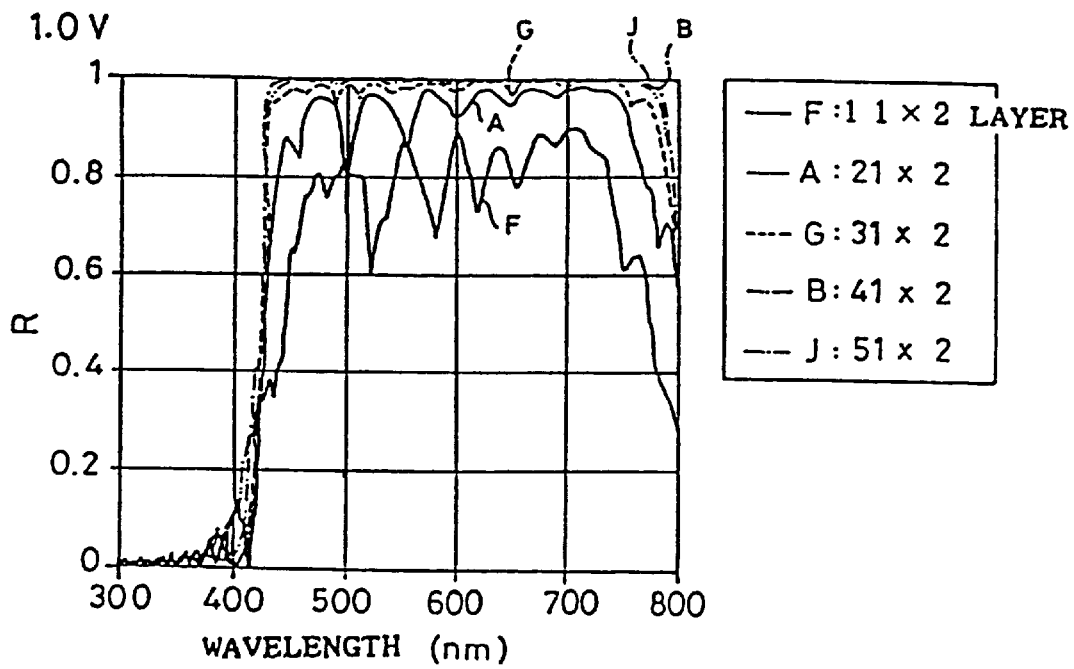
FIGS. 36A–36B are views for explaining the relationship between the number of layers of a composite multi-layer film and an interference reflection factor in the display device according to the eighteenth embodiment of the present invention.
Figure 36B:
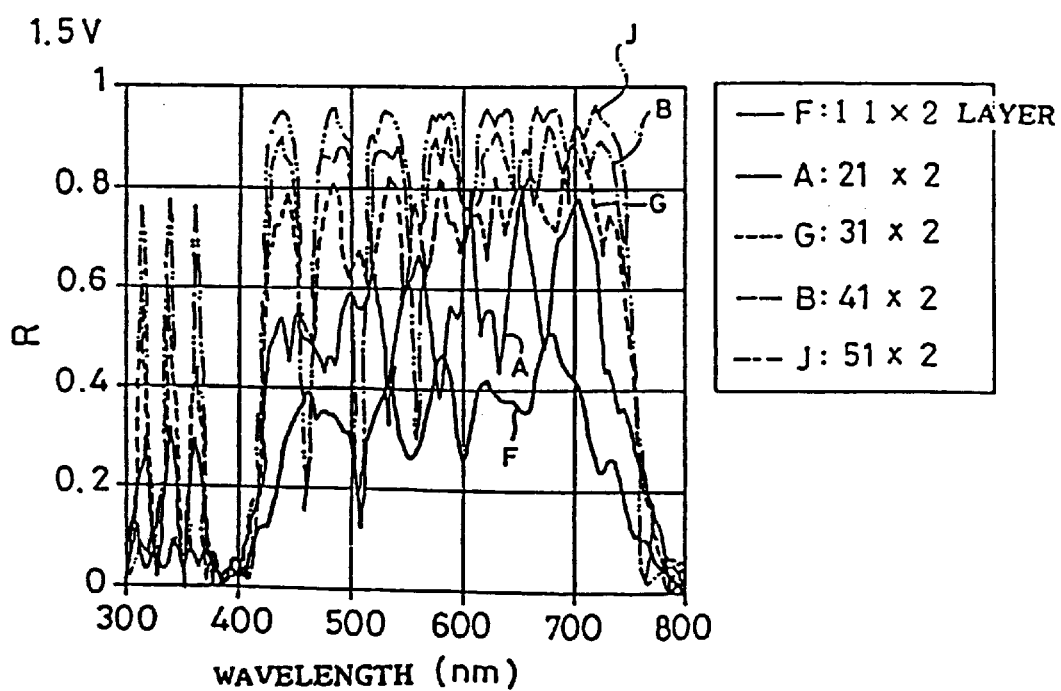
Figure 37A:
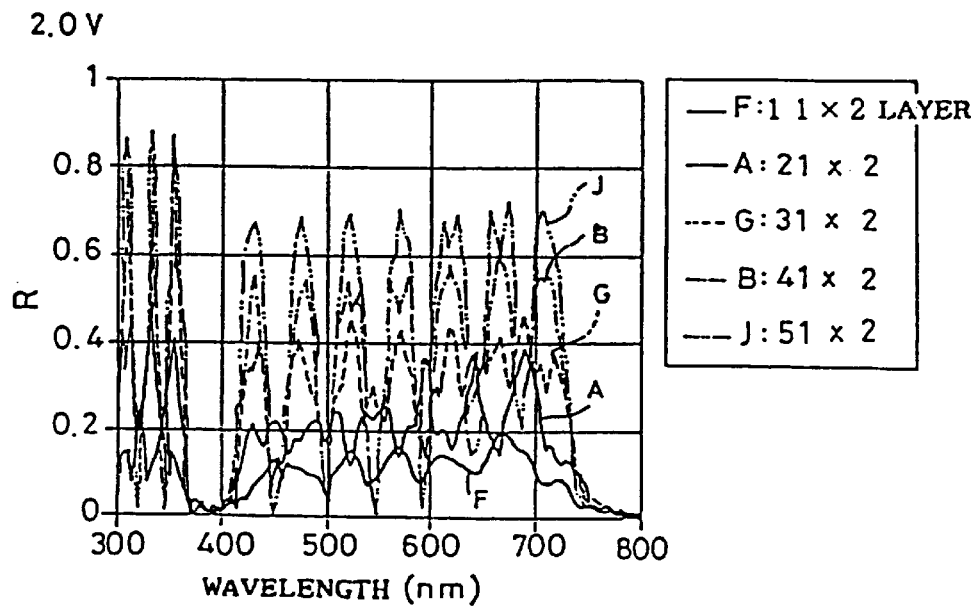
FIGS. 37A–37B are views for explaining the relationship between the number of layers of a composite multi-layer film and an interference reflection factor in the display device according to the eighteenth embodiment of the present invention.
Figure 37B:
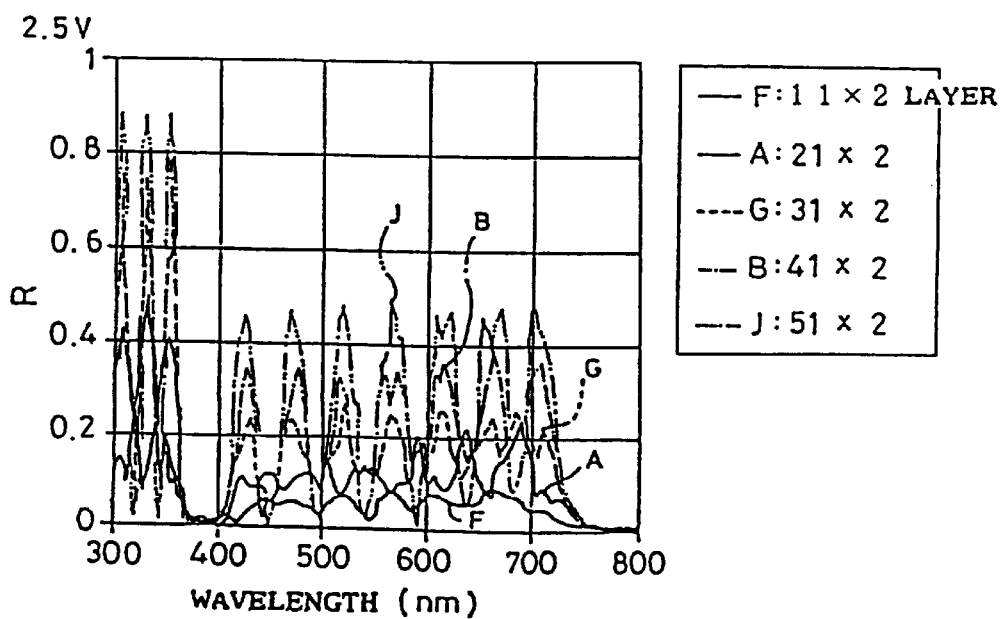

A refraction factor distribution in the direction of thickness in a cell in applying a voltage is given by FIG. 35A. The reflection factor of the display device was calculated on the assumption that the liquid crystal layer had such a refraction factor distribution. Reflection factors obtained with respect to applied voltages of 0.5 V, 1.0 V, 1.5 V, 2.0 V, and 2.5 V are shown in FIGS. 35B, 36A, 36B, 37A, and 37B.

In each of these drawings, the abscissa indicates a wavelength, and the ordinate indicates a refraction factor. In these drawings, reflection factors in the cases wherein the numbers of layers of the composite multi-layer films which interference-reflect lights having the respective wavelengths are 11×2 ($_F$), 21×2 (A), 31×2 (G), 41×2 (B), and 51×2 (J) are calculated. Here, the contents of the numbers of layers in these cases are the same as those in the fourteenth embodiment.

In applying no voltage, the liquid crystal molecules of the liquid crystal layer are almost horizontally aligned, and the refraction factor of the liquid crystal layer is n1=1.8. However, since the refraction factor of the film is 1.52, lights having the respective wavelengths are interference-reflected. When a voltage is gradually applied, as shown in FIG. 35A, the refraction factor decreases to a value smaller than 1.8. For this reason, the degree of interference reflection of each wavelength gradually decreases, and a transmission factor increases. However, even if the voltage is gradually increased to 2.0 V and 2.5 V, the reflection factor does not become 0. This is because, as shown in FIG. 35A, the refraction factor of the liquid crystal in applying a voltage is not equal to the refraction factor of the liquid crystal in the minor axis direction.

(Nineteenth Embodiment)

Figure 38:
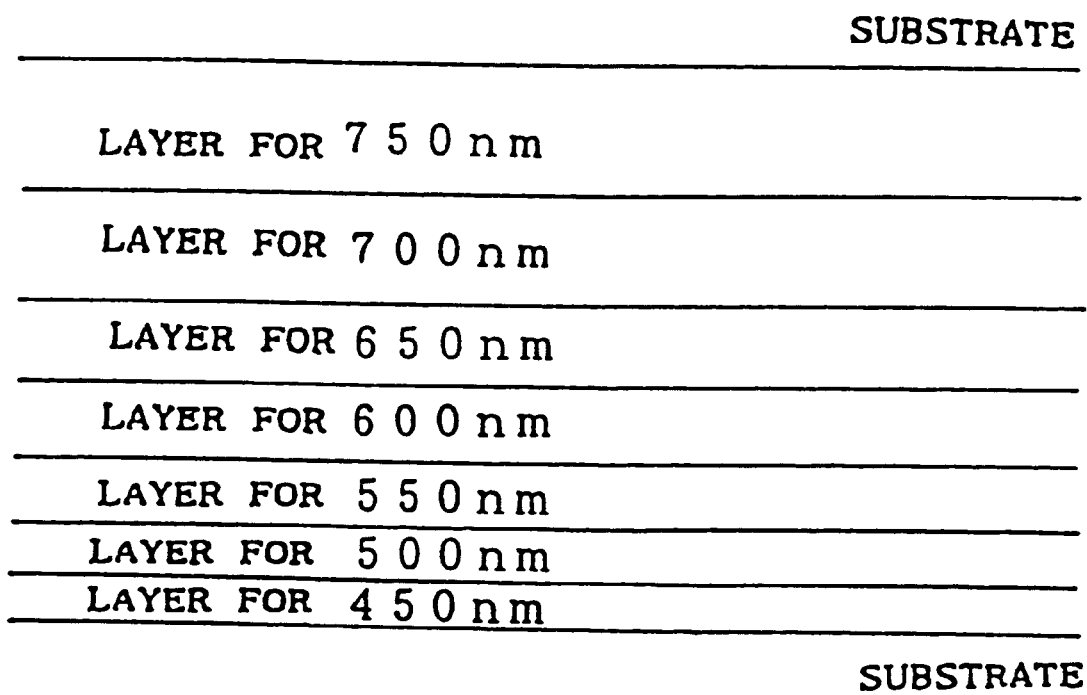
FIG. 38 is a view for explaining the structure of a display device according to the nineteenth embodiment of the present invention.

FIG. 38 is a view for explaining the structure of the display device according to the nineteenth embodiment of the present invention. In the display device according to the nineteenth embodiment, seven composite multi-layer films which interference-reflect incident lights having wavelengths of 450 nm, 500 nm, 550 nm, 600 nm, 650 um, 700 nm, and 750 nm are laminated. The structure of each of the seven composite multi-layer films is the same as that in the case of the fourteenth embodiment described with reference to FIG. 18B.

In this embodiment, the refraction factor in the major axis direction of liquid crystal molecules was set to be $n_1=1.8$, and the refraction factor in the minor axis direction was set to be $n_2=1.52$. The refraction factors of the film were given by $n_{F1}=n_{F2}=1.58$.

The thicknesses of the liquid crystal layers and films of the composite multi-layer films which interference-reflected lights having the seven wavelengths were set to satisfy equation (3) and (4) with respect to the wavelength of 450 nm, the wavelength of 500 nm, the wavelength of 550 nm, the wavelength of 600 nm, the wavelength of 650 nm, the wavelength of 700 nm, and the wavelength of 750 nm.

Figure 39A:
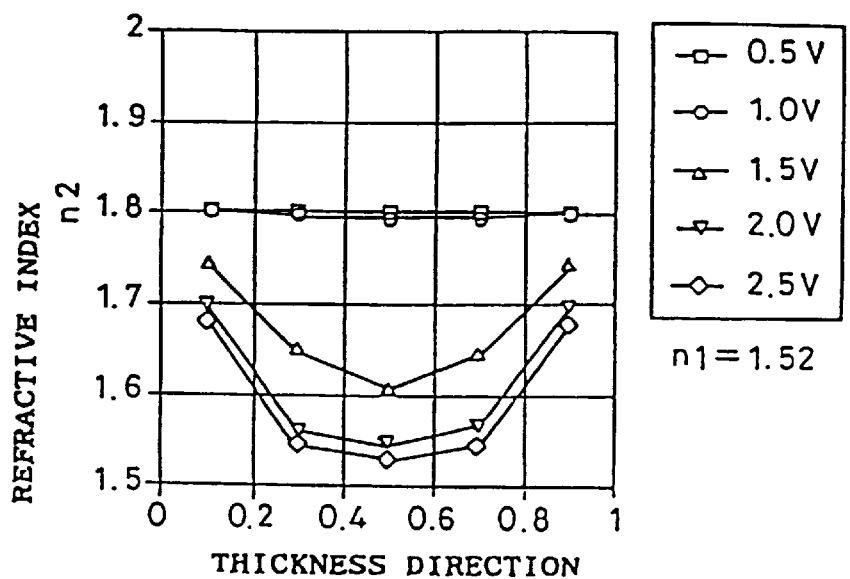
FIG. 39A is a graph for explaining the relationship between the direction of cell thickness and the refraction factor of a liquid crystal in the display device according to the nineteenth embodiment by using an applied voltage as a parameter.
Figure 39B:
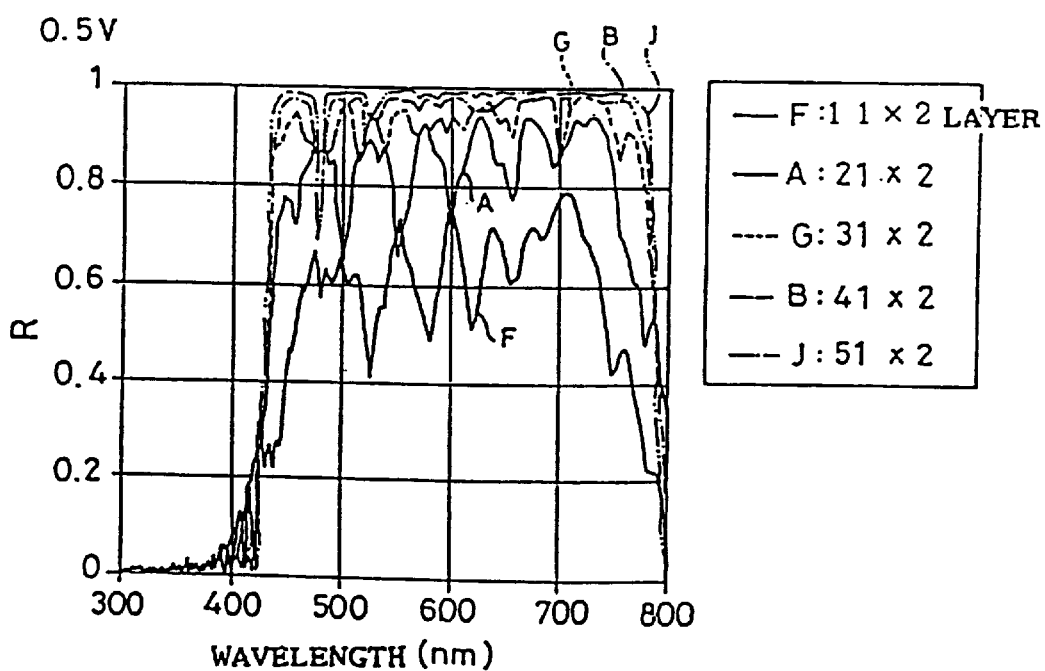
FIG. 39B is a graph for explaining the relationship between the number of layers of a composite multi-layer film and an interference reflectance in the display device according to the nineteenth embodiment.
Figure 40A:
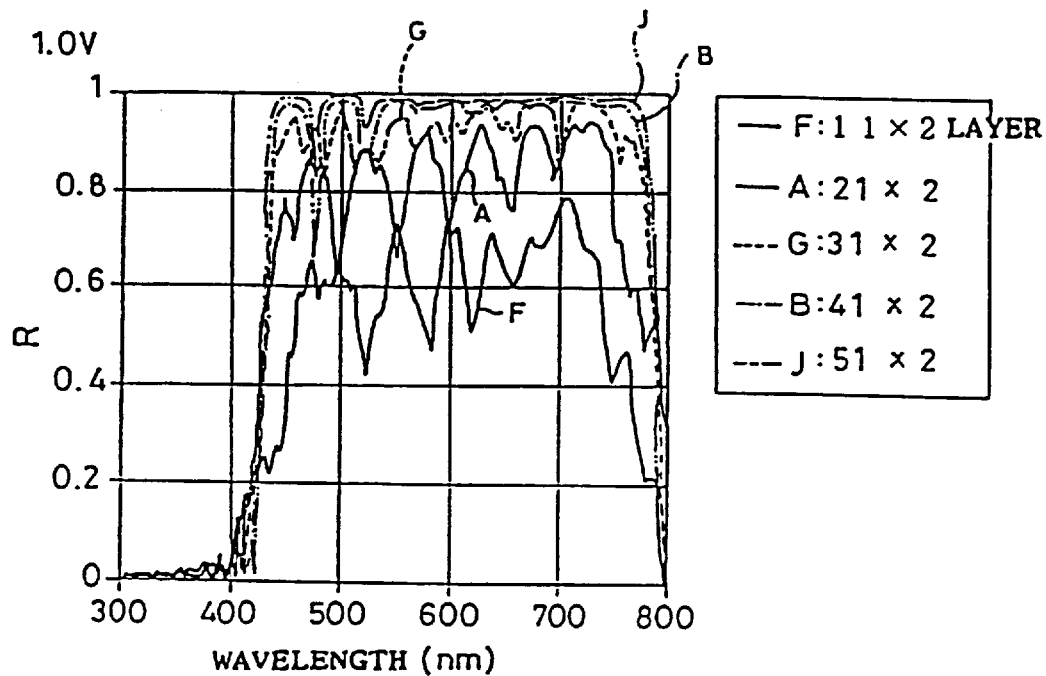
FIGS. 40A–40B are views for explaining the relationship between the number of layers of a composite multi-layer film and an interference reflection factor in the display device according to the nineteenth embodiment of the present invention.
Figure 40B:
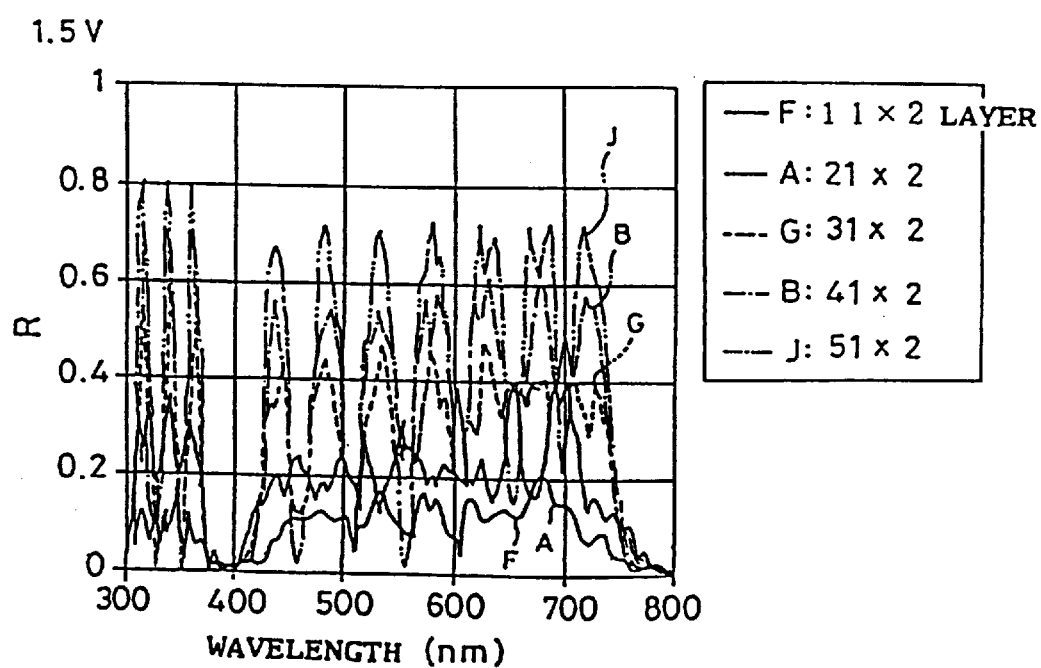
Figure 41A:
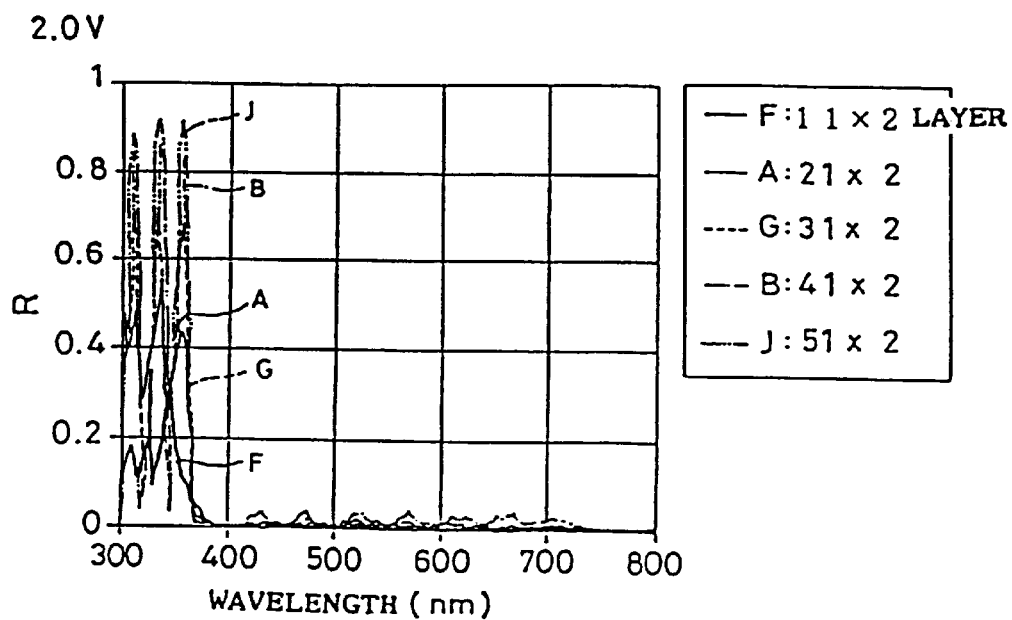
FIGS. 41A–41B are views for explaining the relationship between the number of layers of a composite multi-layer film and an interference reflection factor in the display device according to the nineteenth embodiment of the present invention.
Figure 41B:
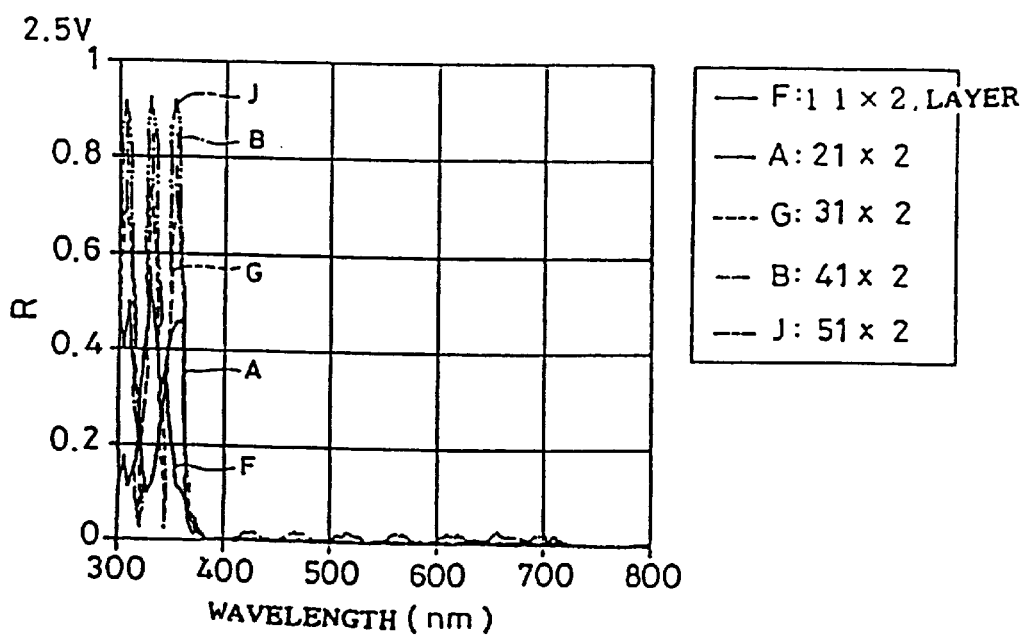

A refraction factor distribution in the direction of thickness in a cell in applying a voltage is given by FIG. 39A. The reflection factor of the display device was calculated on the assumption that the liquid crystal layer had such a refraction factor distribution. Reflection factors obtained with respect to applied voltages of 0.5 V, 1.0 V, 1.5 V, 2.0 V, and 2.5 V are shown in FIGS. 39B, 40A, 40B, 41A, and 41B.

In each of these drawings, the abscissa indicates a wavelength, and the ordinate indicates a refraction factor. In these drawings, reflection factors in the cases wherein the numbers of layers of the composite multi-layer films which interference-reflect lights having the respective wavelengths are 11×2 ($_F$), 21×2 (A), 31×2 (G), 41×2 (B), and 51×2 (J) are calculated. Here, the contents of the numbers of layers in these cases are the same as those in the fourteenth embodiment.

In applying no voltage, the liquid crystal molecules of the liquid crystal layer are almost horizontally aligned, and the refraction factor of the liquid crystal layer is $n_1=1.8$. However, since the refraction factor of the film is 1.58, lights having the respective wavelengths are interference-reflected. When a voltage is gradually applied, as shown in FIG. 39A, the refraction factor decreases to a value smaller than 1.8. For this reason, the degree of interference reflection of each wavelength gradually decreases, and a transmission factor increases. When the voltage of 2.5 V is applied, the reflection factor becomes almost −0. This is because, as shown in FIG. 39A, when the voltage of 2.5 V is applied, the average refraction factor of the liquid crystal layer is almost equal to the refraction factor of the film, i.e., 1.58.

(Twentieth Embodiment)

Figure 42:
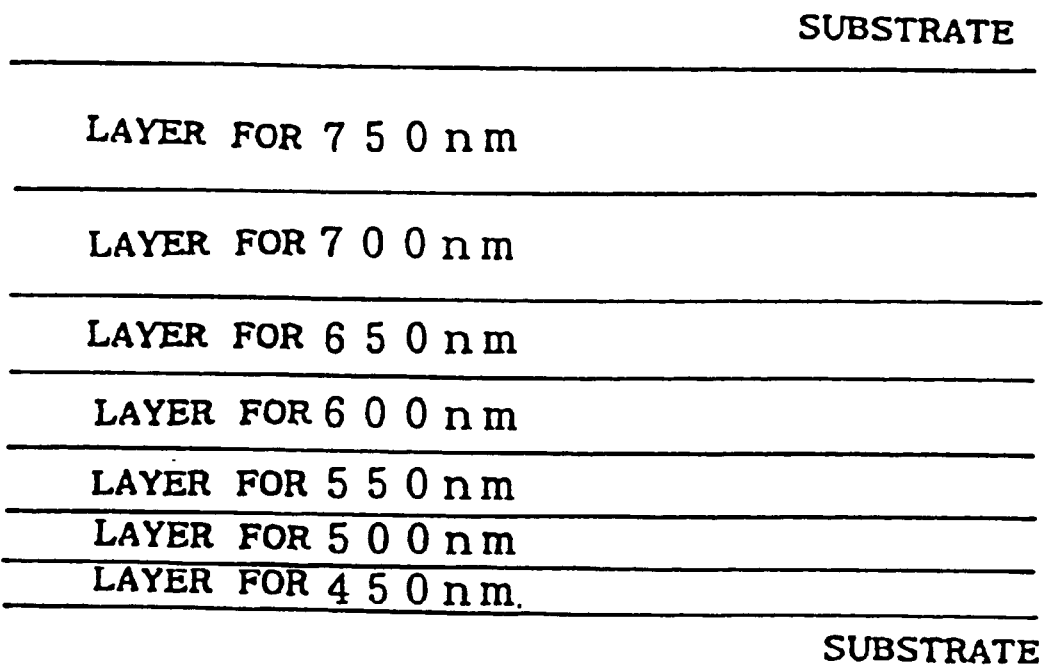
FIG. 42 is a view for explaining the structure of a display device according to the nineteenth embodiment of the present invention.

FIG. 42 is a view for explaining the structure of the display device according to the twentieth embodiment of the present invention. In the display device according to the twentieth embodiment, seven composite multi-layer films which interference-reflect incident lights having wavelengths of 450 um, 500 nm, 550 nm, 600 nm, 650 nm, 700 nm, and 750 nm are laminated. The structure of each of the seven composite multi-layer films is the same as that in the case of the twentieth embodiment described with reference to FIG. 18B.

In this embodiment, the refraction factor in the major axis direction of liquid crystal molecules was set to be $n_1=1.8$, and the refraction factor in the minor axis direction was set to be $n_2=1.52$. The refraction factors of the film were given by $n_{F1}=n_{F2}=1.6$. The thicknesses of the liquid crystal layers and films of the composite multi-layer films which interference-reflected lights having the seven wavelengths were set to satisfy equation (3) and (4) with respect to the wavelength of 450 nm, the wavelength of 500 nm, the wavelength of 550 nm, the wavelength of 600 nm, the wavelength of 650 um, the wavelength of 700 nm, and the wavelength of 750 nm.

Figure 43A:
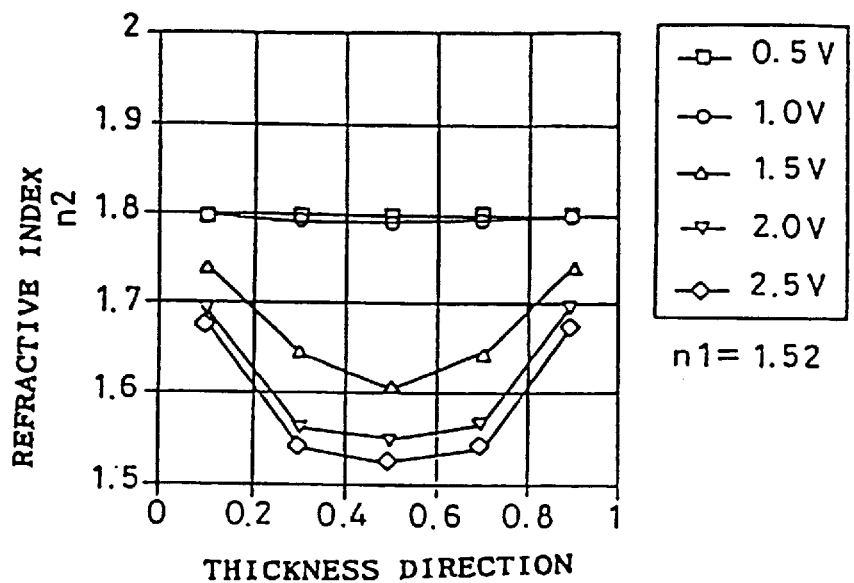
FIG. 43A is a graph for explaining the relationship between the direction of cell thickness and the refraction factor of a liquid crystal in the display device according to the twentieth embodiment by using an applied voltage as a parameter.
Figure 43B:
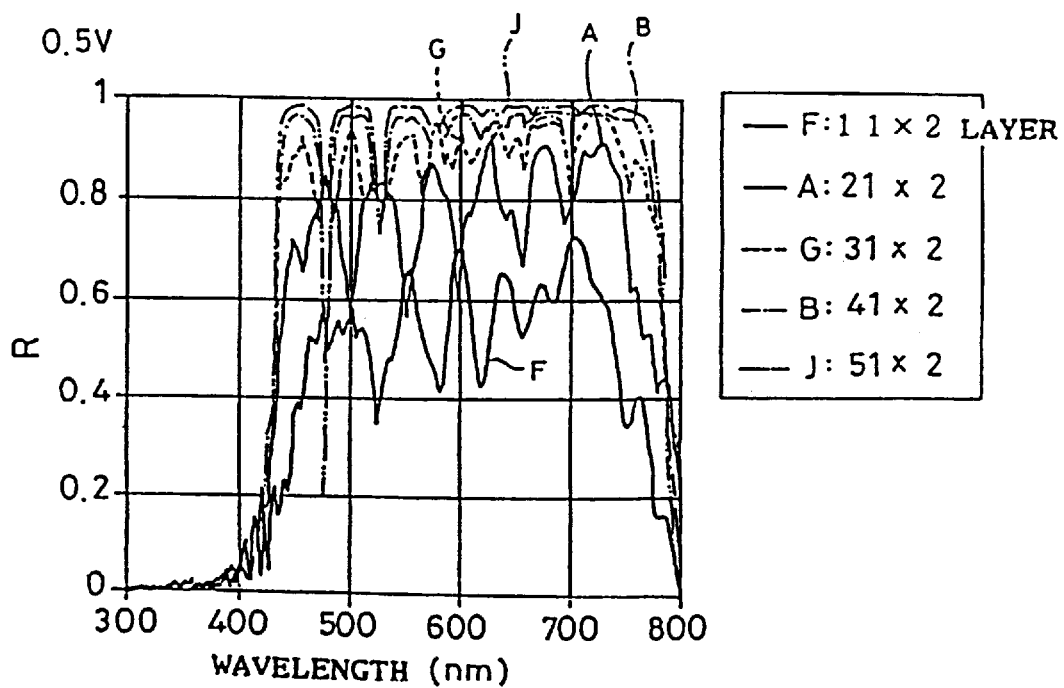
FIG. 43B is a graph for explaining the relationship between the number of layers of a composite multi-layer film and an interference reflectance in the display device according to the twentieth embodiment.
Figure 44A:
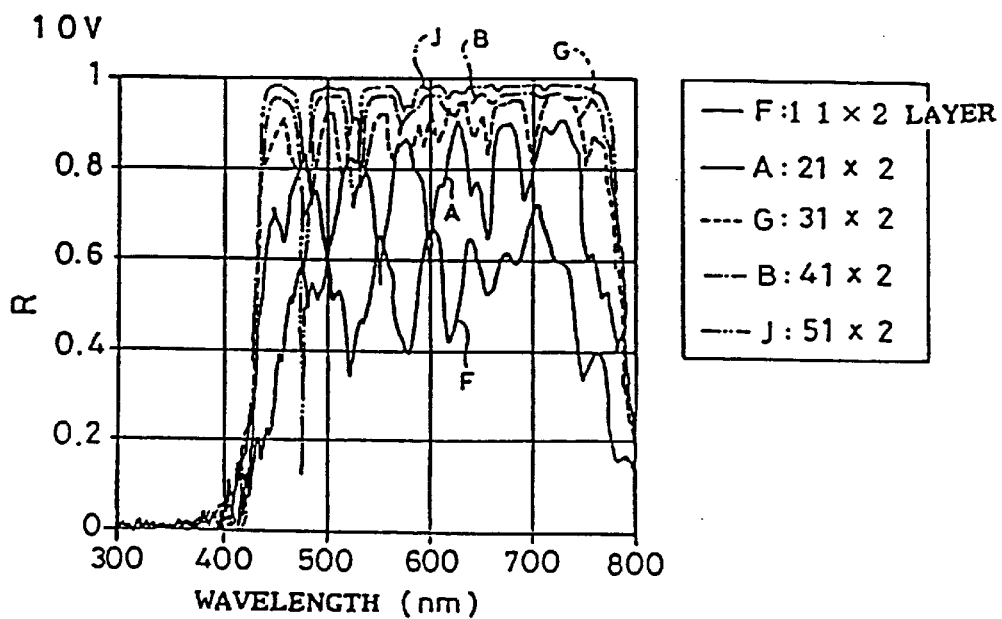
FIGS. 44A–44B are views for explaining the relationship between the number of layers of a composite multi-layer film and an interference reflection factor in the display device according to the twentieth embodiment of the present invention.
Figure 44B:
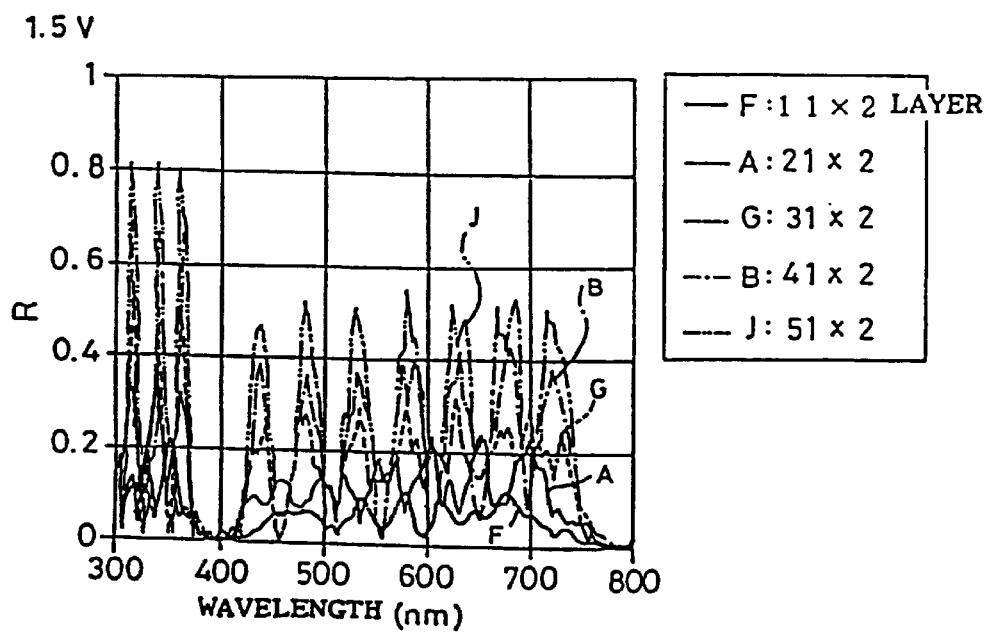
Figure 45A:
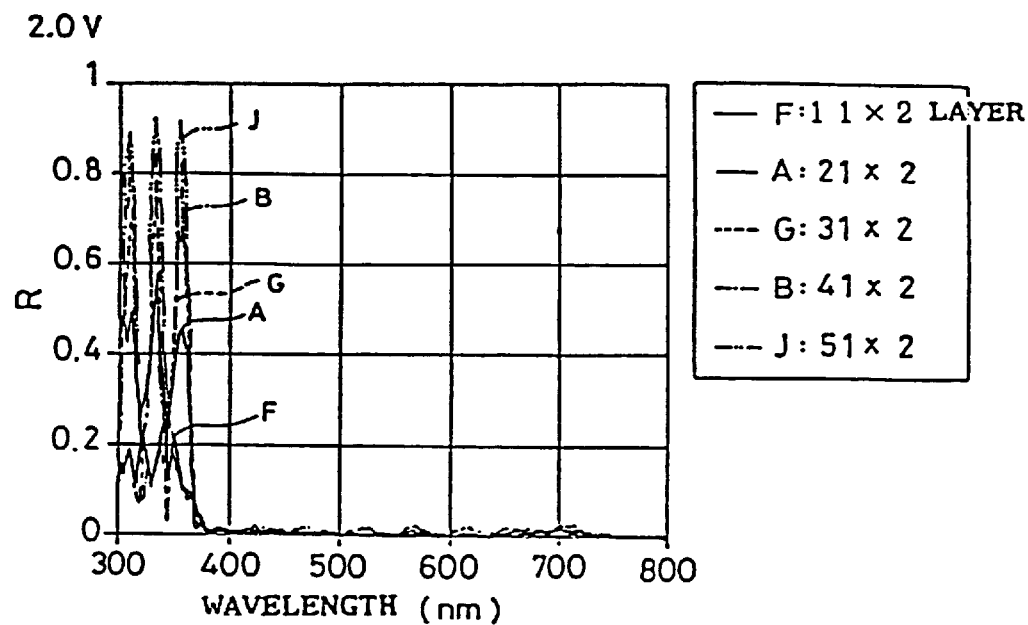
FIGS. 45A–45B are views for explaining the relationship between the number of layers of a composite multi-layer film and an interference reflection factor in the display device according to the twentieth embodiment of the present invention.
Figure 45B:
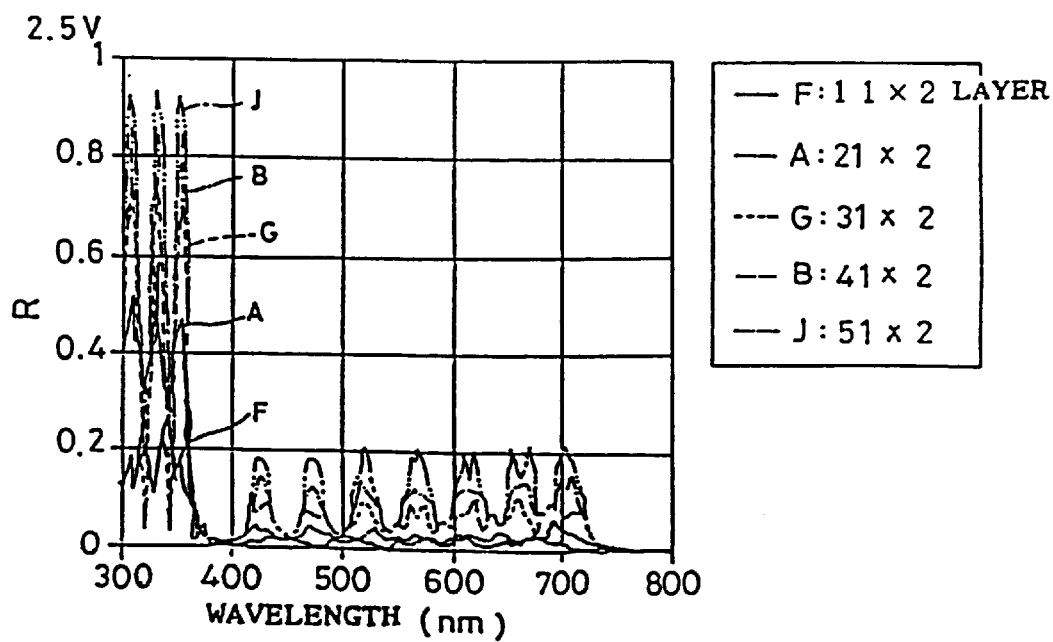

A refraction factor distribution in the direction of thickness in a cell in applying a voltage is given by FIG. 43A. The reflection factor of the display device was calculated on the assumption that the liquid crystal layer had such a refraction factor distribution. Reflection factors obtained with respect to applied voltages of 0.5 V, 1.0 V, 1.5 V, 2.0 V, and 2.5 V are shown in FIGS. 43B, 44A, 44B, 45A, and 45B.

In each of these drawings, the abscissa indicates a wavelength, and the ordinate indicates a refraction factor. In these drawings, reflection factors in the cases wherein the numbers of layers of the composite multi-layer films which interference-reflect lights having the respective wavelengths are 11×2 ($_F$), 21×2 (A), 31×2 (G), 41×2 (B), and 51×2 (J) are calculated. Here, the contents of the numbers of layers in these cases are the same as those in the fourteenth embodiment.

In applying no voltage, the liquid crystal molecules of the liquid crystal layer are almost horizontally aligned, and the refraction factor of the liquid crystal layer is $n_1$=1.8. However, since the refraction factor of the film is 1.6, lights having the respective wavelengths are interference-reflected. When a voltage is gradually applied, as shown in FIG. 43A, the refraction factor decreases to a value smaller than 1.8. For this reason, the degree of interference reflection of each wavelength gradually decreases, and a transmission factor increases. When the voltage of 2.0 V is applied, the reflection factor becomes almost 0. When the applied voltage is increased to 2.5 V, the reflection factor increases. As shown in FIG. 43A, when the voltage of 2.0 V is applied, the reflection factor becomes almost 0 because the average refraction factor of the liquid crystal layer is almost equal to the refraction factor of the film, i.e., 1.6. When the voltage of 2.5 V is applied, the reflection factor increases because the average refraction factor of the liquid crystal layer is smaller than the refraction factor of the film, i.e., 1.6. Since the refraction factor of the film is closer to the refraction factor of the liquid crystal in the major axis direction in this embodiment than in the nineteenth embodiment, the drive voltage can be decreased.

As described above, when the refraction factor of the film can be made almost equal to the average refraction factor of the liquid crystal depending on an applied voltage, a reflection factor at the applied voltage can be decreased.

(Twenty-first Embodiment)

Figure 46:
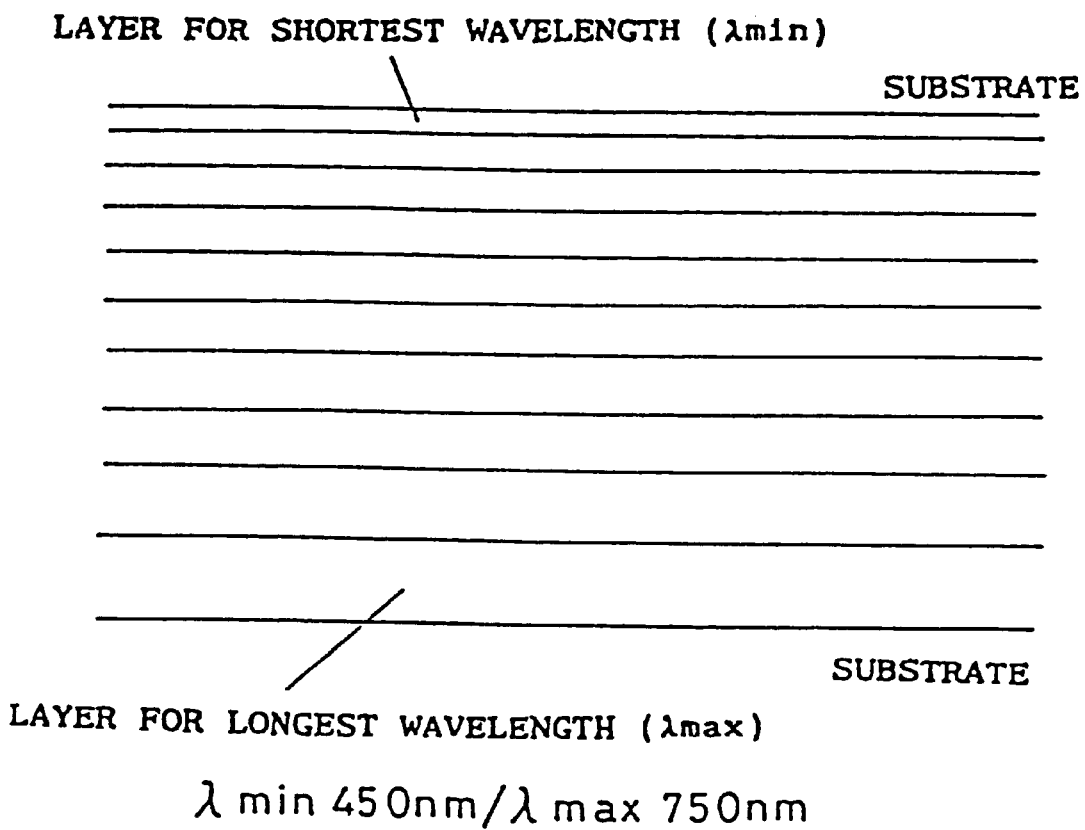
FIG. 46 is a view for explaining the structure of a display device according to the twenty-first embodiment of the present invention.
Figure 47A:
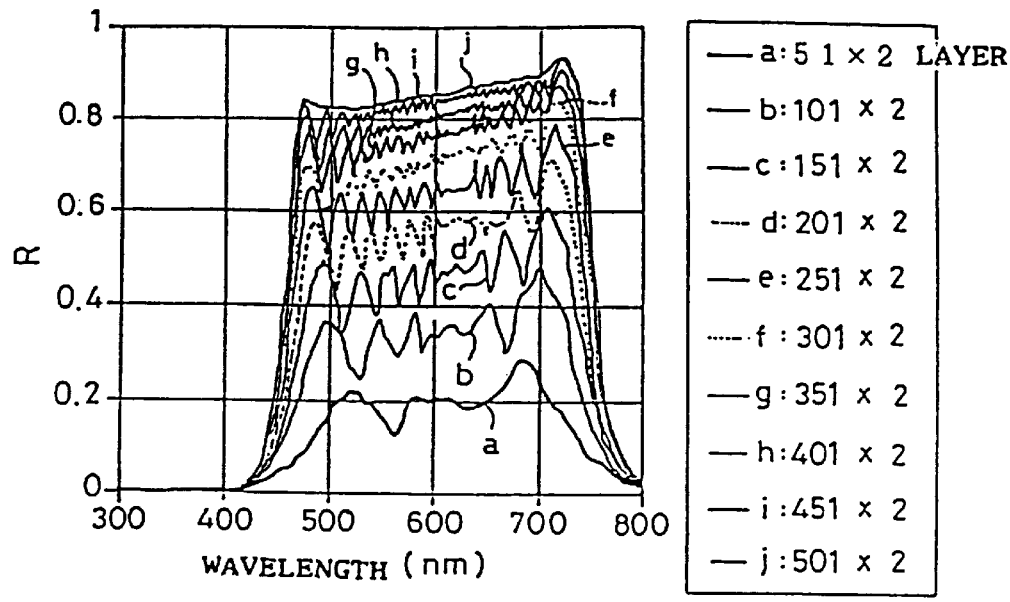
FIGS. 47A–47B are views for explaining the relationship between the number of layers of a composite multi-layer film and an interference reflection factor in the display device according to the twenty-first embodiment of the present invention.
Figure 47B:
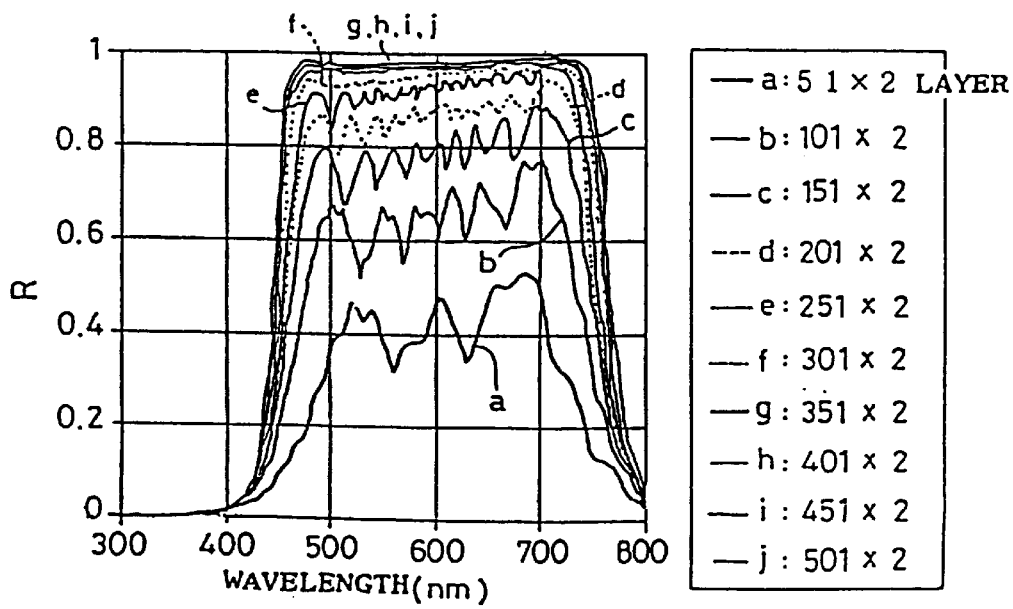
Figure 48A:
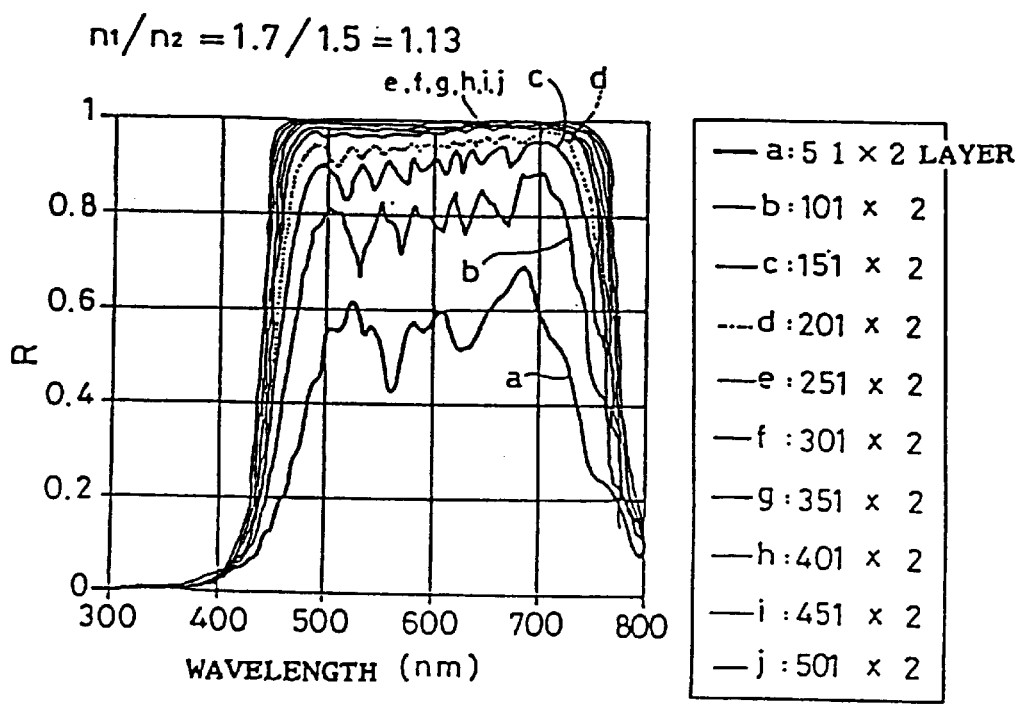
FIGS. 48A–48B are views for explaining the relationship between the number of layers of a composite multi-layer film and an interference reflection factor in the display device according to the twenty-first embodiment of the present invention.
Figure 48B:
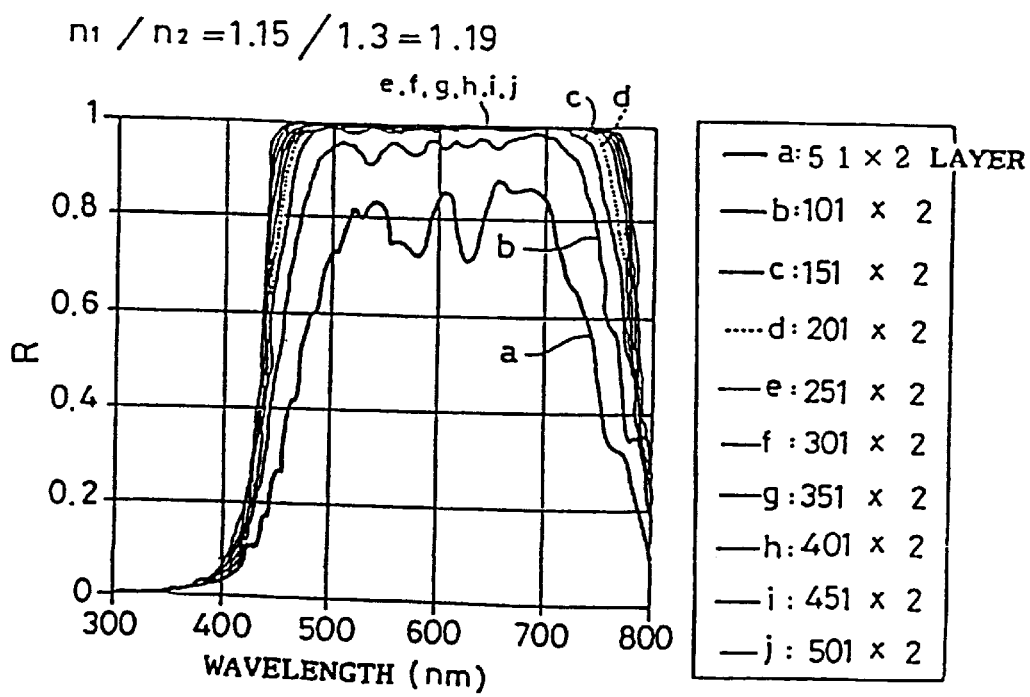

FIG. 46 is a view for explaining the structure of the display device according to the twenty-first embodiment of the present invention. In the display device according to the twenty-first embodiment, composite multi-layer films constituted by liquid crystal layers and films formed a display device while the liquid crystal layers and the films which were adjacent to each other almost satisfied equation (3) and (4) and while a wavelength to be interference-reflected was continuously changed from 450 nm to 750 nm. The composite multi-layer films which interference-reflect lights having respective wavelengths comprise a composite multi-layer film for the P wave and a composite multi-layer film for the S wave. In the liquid crystal layer of the composite multi-layer film for the P wave, the alignment direction of the major axis of liquid crystal molecules in applying no voltage was set to be almost horizontal with respect to the film and parallel to the drawing surface. In the liquid crystal layer of the composite multi-layer film for the S wave, the alignment direction of the major axis of liquid crystal molecules in applying no voltage was set to be almost horizontal with respect to the film and perpendicular to the drawing surface. In the composite multi-layer films which interference-reflect lights having the respective wavelengths, the number of films and the number of liquid crystal layers of the composite multi-layer film for the P wave and the number of films and the number of liquid crystal layers of the composite multi-layer film for the S wave were set to be equal to each other.

In this embodiment, the refraction factor $n_1$ in the major axis direction of liquid crystal molecules and the refraction factor $n_2$ in the minor axis direction were given by $n_1/n_2$= 1.6/1.5, 1.55/1.4, 1.7/1.5, and 1.15/1.3. The reflection factor distributions of the respective display devices in applying a voltage are shown in FIGS. 47A, 47B, 48A, and 48B, respectively. As all the films, films having birefringence are used. The refraction factor of the film in the X-axis direction is set to be equal to the refraction factor in the major axis direction of liquid crystal molecules adjacent to the film, and the refraction factor in the Y-axis direction is set to be equal to the refraction factor in the minor axis direction of the liquid crystal molecules adjacent to the film. In each of these drawings, the abscissa indicates a wavelength, and the ordinate indicates a refraction factor. In these drawings, reflection factors in the cases wherein the numbers of liquid crystal layers and films constituting the composite multi-layer films which interference-reflect lights having wavelengths of 450 nm to 750 nm are 51×2($a$), 101×2($b$), 151×2($c$), 201×2($d$), 251×2($e$), 301×2($f$), 351×2($g$), 401×2 ($h$), 451×2($i$), and 501×2($j$) are calculated. Here, in the case of a, 51×2 means that the number of layers of the composite multi-layer film for the P wave is 51 and the number of layers of the composite multi-layer film for the S wave is 51. Therefore, in this embodiment, the total number of layers is 51×2=102. In the cases of b to j, the numbers of layers are determined in the same manner as in the case of a.

The larger the birefringence factor (=refraction factor ($n_1$, $n_{LC1}$) in major axis direction/refraction factor ($n_2$, $n_{LC2}$) in minor axis direction), and the larger the number of layers, the higher the reflection factor.

Figure 49:
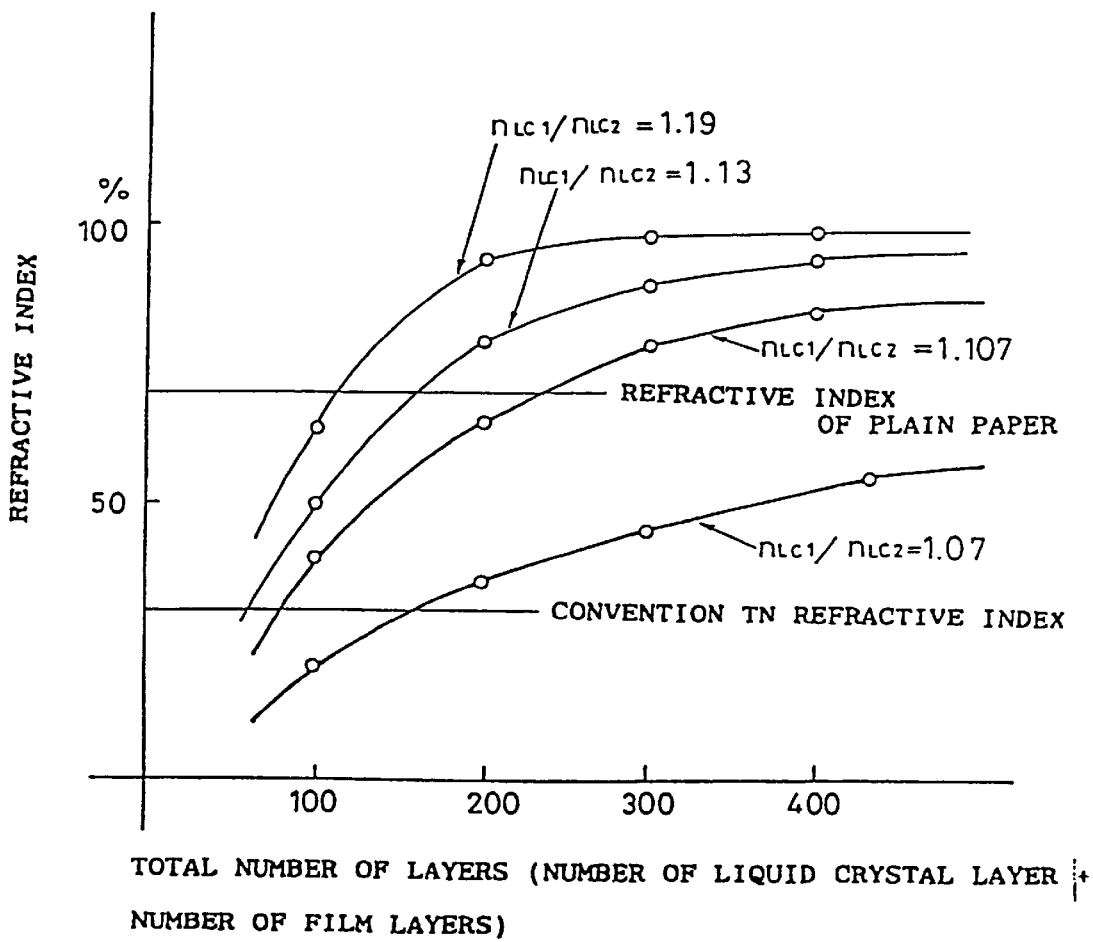
FIG. 49 is a view for explaining the relationship between the total number of layers of a composite multi-layer film and an interference reflection factor in the display device according to the twenty-first embodiment of the present invention.

FIG. 49 shows the relationship between the total number of layers and a reflection factor by using the birefringence as a parameter. According to this relationship, it is understood that, when the birefringence factor is 1.1 or more, and the total number of layers is 100 or more, a reflection factor higher than that of a conventional TN liquid crystal can be obtained.

In the fourteenth to twenty-first embodiments, simulation is performed by using a structure in which a liquid crystal is aligned (homogeneous alignment) in a direction horizontal with respect to a film or a substrate in applying no voltage. Even if a structure in which a liquid crystal is aligned (homeotropic alignment) in a direction almost perpendicular to a film or a substrate is used, the same principle as that in the above simulation can be used. However, in this case, when the refraction factor of the film is close to the refraction factor in the major axis direction of the liquid crystal, reflection occurs in applying no voltage, and transmission occurs in applying a voltage. When the refraction factor of the film is close to the refraction factor in the minor axis direction of the liquid crystal, transmission occurs in applying no voltage, and reflection occurs in applying a voltage.

As has been described above, in the display device according to the present invention, a bright display device can be achieved without using a polarizing plate. In particular, a bright white/black display which cannot be obtained in a conventional liquid crystal display device of a reflection type can be achieved, and a bright reflective color display device can be achieved. Furthermore, a large number of film layers on which a liquid crystal is coated are laminated and then subjected to a drawing process. For this reason, a composite multi-layer film having a desired thickness can be easily formed, and the bright reflective display device can be relatively easily obtained.

Industrial Applicability

According to the present invention, a reflective display device which can achieve a bright display without using a polarizing plate can be realized, and, as the display color, a white/black display and a color display can be achieved. The display devices according to the present invention can be used, as display devices which is operated by feeble power, in watches, calculators, cellulars, compact portable apparatuses, or information transmission media for various home electric products.

What is claimed is:

1. A display device characterized in that a composite multi-layer film obtained by alternately laminating films and liquid crystal layers a plurality of times is held between one pair of substrates, and a voltage is applied to said composite multi-layer film to control the reflection factor of said composite multi-layer film, wherein the material of said liquid crystal layer is coated on at least one surface of the film surfaces, a plurality of films on which the liquid crystal material is coated are laminated by a roller to be integrated with each other, and a drawing process is performed to the resultant structure by a rolling roller to make the thickness of said film and the thickness of said liquid crystal layer equal to predetermined values, thereby forming said composite multi-layer film.

2. A display device according to claim 1, characterized in that light-diffusing means is arranged outside one of said substrates, and light-absorbing means is arranged outside the other of said substrates.

3. A display device according to claim 2, characterized in that said light-absorbing means absorbs light which is transmitted through said composite multi-layer film and which is in an arbitrary wavelength range or a wavelength range in a visible region.

4. A display device according to claim 1 wherein said one pair of substrates has electrodes formed on an inner surface of said substrates, at least one intermediate substrate having electrodes formed on both the surfaces of said intermediate substrate is interposed in an intermediate portion of said composite multi-layer film, and light-diffusing means and light-absorbing means are arranged outside one of said substrates and outside the other of said substrates, respectively.

5. A display device according to claim 1, characterized in that the thicknesses of said liquid crystal layers and said films are set such that said composite multi-layer film reflects lights having at least one part of wavelengths in the region of incident visible light in applying no voltage.

6. A display device according to claim 5, characterized in that said composite multi-layer film includes a first composite multi-layer film in which the layer thicknesses of said films and the thicknesses of said liquid crystal layers are equal to each other and a second composite multi-layer film in which the thicknesses of said films and the thicknesses of said liquid crystal layers are different from each other, the first composite multi-layer film being laminated to the second composite multi-layer film so that incident lights having a plurality of wavelengths are reflected.

7. A display device according to claim 5, characterized in that said composite multi-layer film includes a first composite multi-layer film in which the layer thicknesses of said films and the thicknesses of said liquid crystal layers are equal to each other and a second composite multi-layer film in which the thicknesses of said films and the thicknesses of said liquid crystal layers are different from each other, the first composite multi-layer film being laminated to the second composite multi-layer film so that the layer thicknesses of said liquid crystal layers and said films are set such that said composite multi-layer film reflect red light, green light, and blue light.

8. A display device according to claim 5, characterized in that electrodes for independently applying a voltage are arranged on said composite multi-layer films, respectively.

9. A display device according to claim 1 characterized in that the thicknesses of said liquid crystal layers and said films are set such that said composite multi-layer film reflects lights having at least one part of wavelengths in the region of incident visible light in applying a voltage.

10. A display device according to claim 1, characterized in that at least one refractive factor of the refractive factors of liquid crystal molecules of said liquid crystal layer in the major and minor axis directions is made equal to the refractive factor of said film.

11. A display device according to claim 1, characterized in that said liquid crystal layer consists of nematic liquid crystal molecules, and at least a composite multi-layer film which is set to reflect light of a polarized component in an almost major axis direction of the nematic molecules or in a direction almost perpendicular to the major axis direction is included.

12. A display device according to claim 11, characterized by including at least a composite multi-layer film obtained by laminating a first composite multi-layer film to a second composite multi-layer film such that said composite multi-layer film is divided into two, the liquid crystal molecular major axis direction of the liquid crystal layer of the first composite multi-layer film being almost perpendicular to the liquid crystal molecular major axis of the liquid crystal layer of the second composite multi-layer film.

13. A method of manufacturing a display device, characterized in that, in said display device according to claim 1, the material of said liquid crystal layer is coated on at least one surface of the film surfaces, a plurality of films on which the liquid crystal material is coated are laminated by a roller to be integrated with each other to form said composite multi-layer film.

14. A display device according to claim 13, characterized in that a uniaxial drawing process is performed to said films in advance to obtain alignment function for aligning liquid crystal molecules.

15. A display device according to claim 1, characterized in that said composite multi-layer film is constituted by laminating at least 10 layers constituted by said liquid crystal layers and said films.

16. A display device according to claim 1, characterized in that said composite multi-layer film is constituted by laminating at least 21 layers constituted by said liquid crystal layers and said films.

17. A display device comprising a composite multi-layer film in which films and liquid crystal layers are alternately laminated, a voltage being applied to said composite multi-layer film to control the reflection factor of said composite multi-layer film, characterized in that a refractive factor $n_{LC1(\lambda n)}$, in a major axis direction, and a refractive factor $n_{LC2(\lambda n)}$, in a minor axis direction, of a liquid crystal used in said liquid crystal layers with respect to light having a predetermined wavelength ($\lambda n$) and a refractive factor $n_{F1(\lambda n)}$ and a refractive factor $n_{F2(\lambda n)}$, in X- and Y-axis directions which are perpendicular to each other in the film surface, of said films with respect to light having the predetermined wavelength ($\lambda n$) are set in at least one of combinations of films and liquid crystal layers, which are adjacent to each other, of said films and said liquid crystal layers of said composite multi-layer film, to satisfy the following conditions [1] and [2]:

[1] $n_{LC1(\lambda n)} \geq n_{F1(\lambda n)}$, or $n_{LC1(\lambda n)} \approx n_{F1(\lambda n)}$, and

[2] $n_{LC2(\lambda n)} \approx n_{F2(\lambda n)}$, or $n_{LC1(\lambda n)} > n_{LC2(\lambda n)}$, $n_{F1(\lambda n)} > n_{F2(\lambda n)}$ wherein the $n_{F1(\lambda n)}$, $n_{LC2(\lambda n)}$, a thickness $d_{LC}$ of said liquid crystal layer, and a thickness $d_F$ of said film are set in at least one of the combinations of films and liquid crystal layers, which are adjacent to each other, to satisfy at least one of the following conditions [3] and [4]:

[3] $n_{F1(\lambda n)} \cdot d_F \approx (\frac{1}{4}+k/2) \cdot \lambda n$, and

[4] $n_{LC2(\lambda n)} \cdot d_{LC} \leq (\frac{1}{4}+m/2) \cdot \lambda n$, or $n_{LC2(\lambda n)} \cdot d_{LC} \approx (\frac{1}{4}+m/2) \cdot \lambda n$ (where k and m are 0 or integers).

18. A display device according to claim 17, characterized in that the major axis of the liquid crystal molecules used in said liquid crystal layer is aligned in a direction horizontal with respect to said film and in the X-axis direction, at least, near said film in applying no voltage, and said composite multi-layer film is set in a light transmission state in applying no voltage and set in a light reflection state in applying a voltage.

19. A display device according to claim 18, characterized in that the $n_{F1(\lambda n)}$ is made almost equal to an average refractive factor, in the X-axis direction, of said liquid crystal layer with respect to light having the predetermined wavelength ($\lambda n$) in applying no voltage, and the $n_{F2(\lambda n)}$ is made almost equal to an average refractive factor, in the Y-axis direction, of said liquid crystal layer with respect to light having the predetermined wavelength ($\lambda n$) in applying no voltage.

20. A display device according to claim 18, characterized in that the $n_{F1(\lambda n)}$, $n_{LC1(\lambda n)}$, $n_{LC2(\lambda n)}$, the thickness $d_{LC}$ of said liquid crystal layer, and the thickness $d_F$ of said film are set in at least one of the combinations of films and liquid crystal layers, which are adjacent to each other, to satisfy at least one of the following conditions [8] and [9]:

[8] $n_{F1(\lambda n)} \cdot d_F \approx (\frac{1}{4}+k/2) \cdot \lambda n$, and

[9] $n_{LC2(\lambda n)} \cdot d_{LC} \leq (\frac{1}{4}+m/2) \cdot \lambda n \leq \{n_{LC2(\lambda n)}+0.6 \cdot (n_{LC1(\lambda n)}-n_{LC2(\lambda n)})\} \cdot d_{LC}$ (where k and m are 0 or integers).

21. A display device according to claim 17, characterized in that the $n_{LC1(\lambda n)}$, $n_{LC2(\lambda n)}$, $n_{F1(\lambda n)}$, and $n_{F2(\lambda n)}$ are set in at least one of the combinations of films and liquid crystal layers, which are adjacent to each other, to satisfy the following conditions [5] and [6]:

[5] $n_{LC1(\lambda n)} \approx n_{F1(\lambda n)}$, and

[6] $n_{LC2(\lambda n)} \approx n_{F2(\lambda n)}$.

22. A display device according to claim 17, characterized in that the $n_{LC1(\lambda n)}$ and $n_{F1(\lambda n)}$ are set in at least one of the combinations of films and liquid crystal layers, which are adjacent to each other, to satisfy the following condition [7]:

[7] $n_{LC1(\lambda n)} > n_{F1(\lambda n)} \geq 0.96 \cdot n_{LC1(\lambda n)}$.

23. A display device according to claim 17, characterized in that the major axis of the liquid crystal molecules used in said liquid crystal layer is aligned in a direction almost perpendicular to said film, at least, near the central portion of said liquid crystal layer in the direction of lamination in applying no voltage, and said composite multi-layer film is set in a light transmission state in applying a voltage and set in a light reflection state in applying no voltage.

24. A display device according to claim 23, characterized in that the $n_{LC1(\lambda n)}$, $n_{LC2(\lambda n)}$, and $n_{F1(\lambda n)}$ are set in at least one of the combinations of films and liquid crystal layers, which are adjacent to each other, to satisfy the following condition [10]:

[10] $n_{LC1(\lambda n)} > n_{F1(\lambda n)} \geq n_{LC1(\lambda n)} - 0.6 \cdot (n_{LC1(\lambda n)} - n_{LC2(\lambda n)})$.

25. A display device according to claim 23, characterized in that the $n_{LC2(\lambda n)}$ and $d_{LC}$ are set in at least one of the combinations of films and liquid crystal layers, which are adjacent to each other, to satisfy the following conditions [13] and [14]:

[13] $n_{F1(\lambda n)} \cdot d_F \approx (\frac{1}{4}+k/2) \cdot \lambda n$, and

[14] $n_{LC2(\lambda n)} \cdot d_{LC} < (\frac{1}{4}+m/2) \cdot \lambda n \leq 1.12 n_{LC2(\lambda n)} \cdot d_{LC}$ (where k and m are 0 or integers).

26. A display device according to claim 17, characterized in that the $n_{F1(\lambda n)}$, $d_F$, and $\lambda n$ are set to satisfy the following condition [28]:

[28] $(\frac{1}{8}+k/2) \cdot \lambda n \leq n_{F1(\lambda n)} \cdot d_F \leq (\frac{3}{8}+k/2) \cdot \lambda n$ (where k is 0 or an integer).

27. A display device according to claim 17, characterized in that the $n_{F2(\lambda n)}$, $d_F$, and $\lambda n$ are set to satisfy the following condition [29]:

[29] $(\frac{1}{8}+k/2) \cdot \lambda n \leq n_{F2(\lambda n)} \cdot d_F \leq (\frac{3}{8}+k/2) \cdot \lambda n$ (where k is 0 or an integer).

28. A display device according to claim 17, characterized in that the $\lambda n$, $n_{LC2(\lambda n)}$, and $d_{LC}$ are set to satisfy the following condition [30]:

[30] $(\frac{1}{8}+m/2) \cdot \lambda n \leq n_{LC2(\lambda n)} \cdot d_{LC} \leq (\frac{3}{8}+m/2) \cdot \lambda n$ (where m is 0 or an integer).

29. A display device according to claim 17, characterized in that the $\lambda n$, $n_{LC1(\lambda n)}$, and $d_{LC}$ are set to satisfy the following condition [31]:

[31] $(\frac{1}{8}+m/2) \cdot \lambda n \leq n_{LC1(\lambda n)} \cdot d_{LC} \leq (\frac{3}{8}+m/2) \cdot \lambda n$ (where m is 0 or an integer).

30. A display device according to claim 17, characterized in that the $n_{LC1(\lambda n)}$ and $n_{LC2(\lambda n)}$ are set with respect to the predetermined wavelength ($\lambda n$) to satisfy the following condition [32]:

[32] $n_{LC1(\lambda n)}/n_{LC2(\lambda n)} \geq 1.10$.

31. A display device comprising a composite multi-layer film in which films and liquid crystal layers are alternately laminated, a voltage being applied to said composite multi-layer film to control the reflection factor of said composite multi-layer film, characterized in that a refractive factor $n_{LC1(\lambda n)}$, in a major axis direction, and a refractive factor $n_{LC2(\lambda n)}$, in a minor axis direction, of a liquid crystal used in said liquid crystal layers with respect to light having a predetermined wavelength ($\lambda n$) and a refractive factor $n_{F1(\lambda n)}$ and a refractive factor $n_{F2(\lambda n)}$, in X- and Y-axis directions which are perpendicular to each other in the film surface, of said films with respect to light having the predetermined wavelength ($\lambda n$) are set in at least one of combinations of films and liquid crystal layers, which are adjacent to each other, of said films and said liquid crystal layers of said composite multi-layer film, to satisfy the following conditions [15] and [16]:

[15] $n_{F1(\lambda n)} \geq n_{LC2(\lambda n)}$, or $n_{F1(\lambda n)} \approx n_{LC2(\lambda n)}$, and

[16] $n_{LC2(\lambda n)} \approx n_{F2(\lambda n)}$, and $n_{LC1(\lambda n)} > n_{LC2(\lambda n)}$ wherein the $n_{F1(\lambda n)}$, $n_{LC1(\lambda n)}$, a thickness $d_{LC}$ of said liquid crystal layer, and a thickness $d_F$ of said film are set in at least one of the combinations of films and liquid crystal layers, which are adjacent to each other, to satisfy at least one of the following conditions [17] and [18]:

[17] $n_{F1(\lambda n)} \cdot d_F \approx (\frac{1}{4}+k/2) \cdot \lambda n$, and

[18] $n_{LC1(\lambda n)} \cdot d_{LC} \geq (\frac{1}{4}+m/2) \cdot \lambda n$, or $n_{LC1(\lambda n)} \cdot d_{LC} \approx (\frac{1}{4}+m/2) \cdot \lambda n$ (where m is 0 or an integer).

32. A display device according to claim 31, characterized in that the major axis of the liquid crystal molecules used in said liquid crystal layer is aligned in a direction almost horizontal with respect to said film and in the X-axis direction, at least, near said film in applying no voltage, and
said composite multi-layer film is set in a light transmission state in applying a voltage and set in a light reflection state in applying no voltage.

33. A display device according to claim 32, characterized in that the $n_{LC1(\lambda n)}$, $n_{LC2(\lambda n)}$, and $n_{F1(\lambda n)}$ are set in at least one of the combinations of films and liquid crystal layers, which are adjacent to each other, to satisfy the following condition [19]:

[19] $n_{LC2(\lambda n)} < n_{F1(\lambda n)} \leq n_{LC2(\lambda n)} + 0.6(n_{LC1(\lambda n)} - n_{LC2(\lambda n)})$.

34. A display device according to claim 32, characterized in that the $n_{F1(\lambda n)}$, $n_{LC1(\lambda n)}$, the thickness $d_{LC}$ of said liquid crystal layer, and the thickness $d_F$ of said film are set in at least one of the combinations of films and liquid crystal layers, which are adjacent to each other, to satisfy at least one of the following conditions [20] and [21]:

[20] $n_{F1(\lambda n)} \cdot d_F \approx (\frac{1}{4}+k/2) \cdot \lambda n$, and

[21] $n_{LC1(\lambda n)} \cdot d_{LC} \approx (\frac{1}{4}+m/2) \cdot \lambda n$ (where k and m are 0 or integers).

35. A display device according to claims 34, characterized in that the $n_{LC1(\lambda n)}$ and $d_{LC}$ are set in at least one of the combinations of films and liquid crystal layers, which are adjacent to each other, to satisfy the following conditions [22] and [23]:

[22] $n_{F1(\lambda n)} \cdot d_F \approx (\frac{1}{4}+k/2) \cdot \lambda n$, and

[23] $n_{LC1(\lambda n)} \cdot d_{LC} > (\frac{1}{4}+m/2) \cdot \lambda n \geq 0.96 n_{LC1(\lambda n)} \cdot d_{LC}$ (where k and m are 0 or integers).

36. A display device according to claim 31, characterized in that the $n_{LC1(\lambda n)}$, $n_{LC2(\lambda n)}$, $n_{F1(\lambda n)}$, and $n_{F2(\lambda n)}$ are set in at least one of the combinations of films and liquid crystal layers, which are adjacent to each other, to satisfy the following condition [24]:

[24] $n_{F1(\lambda n)} \approx n_{LC2(\lambda n)} \approx n_{F2(\lambda n)}$, and $n_{LC1(\lambda n)} > n_{LC2(\lambda n)}$.

37. A display device according to claim 31, characterized in that the $n_{LC2(\lambda n)}$ and $n_{F1(\lambda n)}$ are set in at least one of the combinations of films and liquid crystal layers, which are adjacent to each other, to satisfy the following condition [25]:

[25] $n_{LC2(\lambda n)} < n_{F1(\lambda n)} \leq 1.12 \cdot n_{LC2(\lambda n)}$.

38. A display device according to claim 36, characterized in that the $n_{F1(\lambda n)}$, $n_{LC1(\lambda n)}$, $n_{LC2(\lambda n)}$, the thickness $d_{LC}$ of said liquid crystal layer, and the thickness $d_F$ of said film are set in at least one of the combinations of films and liquid crystal layers, which are adjacent to each other, to satisfy at least one of the following conditions [26] and [27]:

[26] $n_{F1(\lambda n)} \cdot d_F \approx (\frac{1}{4}+k/2) \cdot \lambda n$, and

[27] $n_{LC1(\lambda n)} \cdot d_{LC} \geq (\frac{1}{4}+m/2) \cdot \lambda n \geq \{n_{LC1(\lambda n)} - 0.6 \cdot (n_{LC1(\lambda n)} - n_{LC2(\lambda n)})\} d_{LC}$ (where k and m are 0 or integers).

39. A display device according to claim 31, characterized in that the $n_{F2(\lambda n)}$, $d_F$, and $\lambda n$ are set to satisfy the following condition [29]:

[29] $(\frac{1}{8}+k/2) \cdot \lambda n \leq n_{F2(\lambda n)} \cdot d_F \leq (\frac{3}{8}+k/2) \cdot \lambda n$ (where k is 0 or an integer).

40. A display device according to claim 31, characterized in that the $\lambda n$, $n_{LC2(\lambda n)}$, and $d_{LC}$ are set to satisfy the following condition [30]:

[30] $(\frac{1}{8}+m/2) \cdot \lambda n \leq n_{LC2(\lambda n)} \cdot d_{LC} \leq (\frac{3}{8}+m/2) \cdot \lambda n$ (where m is 0 or an integer).

41. A display device according to claim 31, characterized in that the $\lambda n$, $n_{LC1(\lambda n)}$, and $d_{LC}$ are set to satisfy the following condition [31]:

[31] $(\frac{1}{8}+m/2) \cdot \lambda n \leq n_{LC1(\lambda n)} \cdot d_{LC} \leq (\frac{3}{8}+m/2) \cdot \lambda n$ (where m is 0 or an integer).

42. A display device according to claim 31, characterized in that the $n_{LC1(\lambda n)}$ and $n_{LC2(\lambda n)}$ are set with respect to the predetermined wavelength ($\lambda n$) to satisfy the following condition [32]:

[32] $n_{LC1(\lambda n)}/n_{LC2(\lambda n)} \geq 1.10$.

* * * * *